(12) United States Patent
Rodriguez et al.

(10) Patent No.: US 7,962,370 B2
(45) Date of Patent: Jun. 14, 2011

(54) METHODS IN A MEDIA SERVICE SYSTEM FOR TRANSACTION PROCESSING

(76) Inventors: Arturo A. Rodriguez, Norcross, GA (US); Robert O. Banker, Cumming, GA (US); John Eric West, Roswell, GA (US)

( * ) Notice: Subject to any disclaimer, the term of this patent is extended or adjusted under 35 U.S.C. 154(b) by 1404 days.

(21) Appl. No.: 09/894,508

(22) Filed: Jun. 28, 2001

(65) Prior Publication Data
US 2002/0049804 A1    Apr. 25, 2002

Related U.S. Application Data

(60) Provisional application No. 60/214,987, filed on Jun. 29, 2000.

(51) Int. Cl.
*G06Q 30/00* (2006.01)
(52) U.S. Cl. .................. 705/26.1; 705/27.1
(58) Field of Classification Search .......... 705/26, 705/27
See application file for complete search history.

(56) References Cited

U.S. PATENT DOCUMENTS

| | | |
|---|---|---|
| 3,676,580 A | 7/1972 | Beck |
| 4,586,158 A | 4/1986 | Brandle |
| 4,706,121 A | 11/1987 | Young |
| 4,751,578 A | 6/1988 | Reiter et al. |
| 4,821,097 A | 4/1989 | Robbins |
| 4,827,250 A | 5/1989 | Stallkamp |
| 4,885,775 A | 12/1989 | Lucas |
| 4,908,713 A | 3/1990 | Levine |
| 4,930,158 A | 5/1990 | Vogel |
| 4,949,187 A | 8/1990 | Cohen |
| 4,963,994 A | 10/1990 | Levine |
| 4,984,152 A | 1/1991 | Mueller |
| 4,991,011 A | 2/1991 | Johnson et al. |
| 5,038,211 A | 8/1991 | Hallenbeck |
| 5,172,413 A | 12/1992 | Bradley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |

(Continued)

FOREIGN PATENT DOCUMENTS

CA    2 363 052 A1    11/1995

(Continued)

OTHER PUBLICATIONS

"Industry Leading Software Vendors Endorse BroadVision's Next Generation of Retail and Business-To-Business E-Commerce Application Solutions" PR Newswire, Monday, Jun. 14, 1999. Retrieved via Dialog.*

(Continued)

*Primary Examiner* — Michael A. Misiaszek
(74) *Attorney, Agent, or Firm* — Merchant & Gould, P.C.

(57) ABSTRACT

In one embodiment of the present invention, a media service system provides at least one transaction configuration option that is enabled to be selected by a user. The media service system implements a transaction process in response to a user selection.

33 Claims, 16 Drawing Sheets

U.S. PATENT DOCUMENTS

| | | | |
|---|---|---|---|
| 5,410,326 A | 4/1995 | Goldstein | |
| 5,410,343 A | 4/1995 | Coddington et al. | |
| 5,410,344 A | 4/1995 | Graves et al. | |
| 5,414,455 A | 5/1995 | Hooper et al. | |
| 5,418,622 A | 5/1995 | Takeuchi | |
| 5,448,313 A | 9/1995 | Kim et al. | |
| 5,477,262 A | 12/1995 | Banker et al. | |
| 5,479,268 A | 12/1995 | Young et al. | |
| 5,481,542 A | 1/1996 | Logston et al. | |
| 5,483,277 A | 1/1996 | Granger | |
| 5,485,216 A | 1/1996 | Lee | |
| 5,493,638 A | 2/1996 | Hooper et al. | |
| 5,508,815 A | 4/1996 | Levine | |
| 5,512,958 A | 4/1996 | Rzeszewski | |
| 5,515,495 A | 5/1996 | Ikemoto | |
| 5,521,631 A | 5/1996 | Budow et al. | |
| 5,530,754 A | 6/1996 | Garfinkle | |
| 5,532,735 A | 7/1996 | Blahut et al. | |
| 5,532,754 A | 7/1996 | Young et al. | |
| 5,544,354 A | 8/1996 | May et al. | |
| 5,555,441 A | 9/1996 | Haddad | |
| 5,557,541 A | 9/1996 | Schulhof et al. | |
| 5,562,732 A | 10/1996 | Eisenberg | |
| 5,568,272 A | 10/1996 | Levine | |
| 5,583,560 A | 12/1996 | Florin et al. | |
| 5,583,995 A | 12/1996 | Gardner et al. | |
| 5,585,821 A | 12/1996 | Ishikura et al. | |
| 5,585,838 A | 12/1996 | Lawler et al. | |
| 5,589,892 A | 12/1996 | Knee et al. | |
| 5,592,551 A | 1/1997 | Lett et al. | |
| 5,594,509 A | 1/1997 | Florin et al. | |
| 5,598,524 A | 1/1997 | Johnston, Jr. et al. | |
| 5,600,364 A | 2/1997 | Hendricks et al. | |
| 5,600,573 A | 2/1997 | Hendricks et al. | |
| 5,614,940 A | 3/1997 | Cobbley et al. | |
| 5,619,247 A | 4/1997 | Russo | |
| 5,619,249 A | 4/1997 | Billock et al. | |
| 5,621,456 A | 4/1997 | Florin et al. | |
| 5,623,613 A | 4/1997 | Rowe et al. | |
| 5,625,405 A | 4/1997 | DuLac et al. | |
| 5,625,864 A | 4/1997 | Budow et al. | |
| 5,629,732 A | 5/1997 | Moskowitz et al. | |
| 5,631,693 A | 5/1997 | Wunderlich et al. | |
| 5,632,681 A | 5/1997 | Bakoglu et al. | |
| 5,635,979 A | 6/1997 | Kostreski et al. | |
| 5,635,980 A | 6/1997 | Lin et al. | |
| 5,635,989 A | 6/1997 | Rothmuller | |
| 5,650,831 A | 7/1997 | Farwell | |
| 5,659,350 A | 8/1997 | Hendricks et al. | |
| 5,664,133 A | 9/1997 | Malamud | |
| 5,666,293 A | 9/1997 | Metz et al. | |
| 5,671,411 A | 9/1997 | Watts et al. | |
| 5,675,752 A | 10/1997 | Scott et al. | |
| 5,682,206 A | 10/1997 | Wehmeyer et al. | |
| 5,682,597 A | 10/1997 | Ganek et al. | |
| 5,684,918 A | 11/1997 | Abecassis | |
| 5,686,954 A | 11/1997 | Yoshinobu et al. | |
| 5,687,331 A | 11/1997 | Volk et al. | |
| 5,689,641 A | 11/1997 | Ludwig et al. | |
| 5,694,176 A | 12/1997 | Bruette et al. | |
| 5,694,546 A | 12/1997 | Reisman | |
| 5,699,107 A | 12/1997 | Lawler et al. | |
| 5,715,169 A | 2/1998 | Noguchi | |
| 5,715,515 A | 2/1998 | Akins, III et al. | |
| 5,721,827 A | 2/1998 | Logan et al. | |
| 5,721,829 A | 2/1998 | Dunn et al. | |
| 5,721,897 A | 2/1998 | Rubinstein | |
| 5,724,106 A | 3/1998 | Autry et al. | |
| 5,724,521 A | 3/1998 | Dedrick | |
| 5,724,646 A | 3/1998 | Ganek et al. | |
| 5,727,060 A | 3/1998 | Young | |
| 5,729,549 A | 3/1998 | Kostreski et al. | |
| 5,732,216 A | 3/1998 | Logan et al. | |
| 5,734,853 A | 3/1998 | Hendricks et al. | |
| 5,737,028 A | 4/1998 | Bertram et al. | |
| 5,740,304 A | 4/1998 | Katsuyama et al. | |
| 5,740,549 A | 4/1998 | Reilly et al. | |
| 5,745,837 A | 4/1998 | Fuhrmann | |
| 5,748,493 A | 5/1998 | Lightfoot et al. | |
| 5,751,282 A | 5/1998 | Girard et al. | |
| 5,752,160 A | 5/1998 | Dunn | |
| 5,754,773 A | 5/1998 | Ozden et al. | |
| 5,764,873 A | 6/1998 | Magid et al. | |
| 5,764,899 A | 6/1998 | Eggleston et al. | |
| 5,771,435 A | 6/1998 | Brown | |
| 5,774,170 A | 6/1998 | Hite et al. | |
| 5,778,077 A | 7/1998 | Davidson | |
| 5,790,170 A | 8/1998 | Suzuki | |
| 5,790,176 A | 8/1998 | Craig | |
| 5,790,935 A | 8/1998 | Payton | |
| 5,790,940 A | 8/1998 | Laborde et al. | |
| 5,796,828 A | 8/1998 | Tsukamoto et al. | |
| 5,798,785 A | 8/1998 | Hendricks et al. | |
| 5,799,063 A | 8/1998 | Krane | |
| 5,801,747 A | 9/1998 | Bedard | |
| 5,801,787 A | 9/1998 | Schein et al. | |
| 5,802,502 A | 9/1998 | Gell et al. | |
| 5,808,608 A | 9/1998 | Young et al. | |
| 5,808,611 A | 9/1998 | Johnson et al. | |
| 5,809,204 A | 9/1998 | Young et al. | |
| 5,812,123 A | 9/1998 | Rowe et al. | |
| 5,812,124 A | 9/1998 | Eick et al. | |
| 5,812,786 A | 9/1998 | Seazholtz et al. | |
| 5,822,123 A | 10/1998 | Davis et al. | |
| 5,826,110 A | 10/1998 | Ozden et al. | |
| 5,828,419 A | 10/1998 | Bruette et al. | |
| 5,828,845 A | 10/1998 | Jagadish et al. | |
| 5,835,843 A | 11/1998 | Haddad | |
| 5,838,314 A | 11/1998 | Neel et al. | |
| 5,844,620 A | 12/1998 | Coleman et al. | |
| 5,848,352 A | 12/1998 | Dougherty et al. | |
| 5,850,218 A | 12/1998 | LaJoie et al. | |
| 5,856,975 A | 1/1999 | Rostoker et al. | |
| 5,859,641 A | 1/1999 | Cave | |
| 5,861,906 A | 1/1999 | Dunn et al. | |
| 5,877,756 A | 3/1999 | Um | |
| 5,880,768 A | 3/1999 | Lemmons et al. | |
| 5,886,690 A | 3/1999 | Pond et al. | |
| 5,886,732 A | 3/1999 | Humpleman | |
| 5,895,454 A | 4/1999 | Harrington | |
| 5,898,456 A | 4/1999 | Wahl | |
| 5,900,905 A | 5/1999 | Shoff et al. | |
| 5,905,522 A | 5/1999 | Lawler | |
| 5,905,942 A | 5/1999 | Stoel et al. | |
| 5,907,323 A | 5/1999 | Lawler et al. | |
| 5,913,040 A | 6/1999 | Rakavy et al. | |
| 5,914,712 A | 6/1999 | Sartain et al. | |
| 5,914,746 A | 6/1999 | Matthews, III et al. | |
| 5,915,068 A | 6/1999 | Levine | |
| 5,917,822 A | 6/1999 | Lyles et al. | |
| 5,929,849 A | 7/1999 | Kikinis | |
| 5,930,493 A | 7/1999 | Ottesen et al. | |
| 5,935,206 A | 8/1999 | Dixon et al. | |
| 5,936,659 A | 8/1999 | Viswanathan | |
| 5,940,073 A | 8/1999 | Klosterman et al. | |
| 5,943,047 A | 8/1999 | Suzuki | |
| 5,956,024 A | 9/1999 | Strickland et al. | |
| 5,956,716 A | 9/1999 | Kenner et al. | |
| 5,960,411 A * | 9/1999 | Hartman et al. | 705/26 |
| 5,961,603 A | 10/1999 | Kunkel et al. | |
| 5,969,748 A | 10/1999 | Casement et al. | |
| 5,978,043 A | 11/1999 | Blonstein et al. | |
| 5,983,273 A | 11/1999 | White et al. | |
| 5,986,650 A | 11/1999 | Ellis et al. | |
| 5,987,256 A | 11/1999 | Wu et al. | |
| 5,990,881 A | 11/1999 | Inoue et al. | |
| 5,990,890 A | 11/1999 | Etheredge | |
| 5,990,927 A | 11/1999 | Hendricks et al. | |
| 5,995,134 A | 11/1999 | Hayashi | |
| 6,002,401 A | 12/1999 | Baker | |
| 6,005,565 A | 12/1999 | Legall et al. | |
| 6,005,631 A | 12/1999 | Anderson et al. | |
| 6,006,257 A | 12/1999 | Slezak | |
| 6,008,803 A | 12/1999 | Rowe et al. | |
| 6,008,836 A | 12/1999 | Bruck et al. | |
| 6,014,184 A | 1/2000 | Knee et al. | |
| 6,014,694 A | 1/2000 | Aharoni et al. | |

| | | | |
|---|---|---|---|
| 6,016,348 A | 1/2000 | Blatter et al. | |
| 6,018,359 A | 1/2000 | Kermode | |
| 6,018,372 A | 1/2000 | Etheredge | |
| 6,020,912 A | 2/2000 | De Lang | |
| 6,023,267 A | 2/2000 | Chapuis et al. | |
| 6,025,837 A | 2/2000 | Matthews, III et al. | |
| 6,025,868 A | 2/2000 | Russo | |
| 6,025,869 A | 2/2000 | Stas et al. | |
| 6,026,376 A | 2/2000 | Kenney | |
| 6,035,281 A | 3/2000 | Crosskey et al. | |
| 6,037,933 A | 3/2000 | Blonstein et al. | |
| 6,049,831 A | 4/2000 | Gardell et al. | |
| 6,057,872 A | 5/2000 | Candelore | |
| 6,061,097 A | 5/2000 | Satterfield | |
| 6,064,380 A | 5/2000 | Swenson et al. | |
| 6,064,980 A * | 5/2000 | Jacobi et al. | 705/26 |
| 6,070,186 A | 5/2000 | Nishio | |
| 6,072,982 A | 6/2000 | Haddad | |
| 6,073,105 A | 6/2000 | Sutcliffe et al. | |
| 6,075,575 A | 6/2000 | Schein et al. | |
| 6,081,263 A | 6/2000 | LeGall et al. | |
| 6,085,185 A | 7/2000 | Matsuzawa et al. | |
| 6,094,680 A | 7/2000 | Hokanson | |
| 6,097,383 A | 8/2000 | Gaughan et al. | |
| 6,098,082 A | 8/2000 | Gibbon et al. | |
| 6,101,512 A | 8/2000 | DeRose et al. | |
| 6,108,002 A | 8/2000 | Ishizaki | |
| 6,108,042 A | 8/2000 | Adams et al. | |
| 6,118,445 A | 9/2000 | Nonomura et al. | |
| 6,118,976 A | 9/2000 | Arias et al. | |
| 6,124,878 A | 9/2000 | Adams et al. | |
| 6,125,259 A | 9/2000 | Perlman | |
| 6,133,909 A | 10/2000 | Schein et al. | |
| 6,137,539 A | 10/2000 | Lownes et al. | |
| 6,138,139 A * | 10/2000 | Beck et al. | 709/202 |
| 6,141,003 A | 10/2000 | Chor et al. | |
| 6,141,488 A | 10/2000 | Knudson et al. | |
| 6,148,332 A | 11/2000 | Brewer et al. | |
| 6,151,059 A | 11/2000 | Schein et al. | |
| 6,157,377 A | 12/2000 | Shah-Nazaroff et al. | |
| 6,157,413 A | 12/2000 | Hanafee et al. | |
| 6,160,546 A | 12/2000 | Thompson et al. | |
| 6,160,989 A | 12/2000 | Hendricks et al. | |
| 6,163,272 A | 12/2000 | Goode et al. | |
| 6,166,730 A | 12/2000 | Goode et al. | |
| 6,169,543 B1 | 1/2001 | Wehmeyer | |
| 6,172,674 B1 | 1/2001 | Etheredge | |
| 6,172,677 B1 | 1/2001 | Stautner et al. | |
| 6,177,931 B1 | 1/2001 | Alexander et al. | |
| 6,181,333 B1 | 1/2001 | Chaney et al. | |
| 6,181,693 B1 | 1/2001 | Maresca | |
| 6,182,287 B1 | 1/2001 | Schneidewend et al. | |
| 6,184,877 B1 | 2/2001 | Dodson et al. | |
| 6,188,684 B1 | 2/2001 | Setoyama et al. | |
| 6,195,689 B1 | 2/2001 | Bahlmann | |
| 6,201,540 B1 | 3/2001 | Gallup et al. | |
| 6,205,485 B1 | 3/2001 | Kikinis | |
| 6,208,335 B1 | 3/2001 | Gordon et al. | |
| 6,209,130 B1 | 3/2001 | Rector et al. | |
| 6,216,264 B1 | 4/2001 | Maze et al. | |
| 6,238,290 B1 | 5/2001 | Tarr et al. | |
| 6,239,845 B1 | 5/2001 | Itagaki et al. | |
| 6,240,555 B1 | 5/2001 | Shoff et al. | |
| 6,243,142 B1 | 6/2001 | Mugura et al. | |
| 6,249,532 B1 | 6/2001 | Yoshikawa et al. | |
| 6,253,375 B1 | 6/2001 | Gordon et al. | |
| 6,259,733 B1 | 7/2001 | Kaye et al. | |
| 6,266,814 B1 | 7/2001 | Lemmons et al. | |
| 6,268,849 B1 | 7/2001 | Boyer et al. | |
| 6,272,484 B1 | 8/2001 | Martin et al. | |
| 6,275,268 B1 * | 8/2001 | Ellis et al. | 348/564 |
| 6,282,713 B1 | 8/2001 | Kitsukawa et al. | |
| 6,289,346 B1 | 9/2001 | Milewski et al. | |
| 6,289,514 B1 | 9/2001 | Link et al. | |
| 6,292,624 B1 | 9/2001 | Saib et al. | |
| 6,305,019 B1 | 10/2001 | Dyer et al. | |
| 6,311,011 B1 | 10/2001 | Kuroda | |
| 6,314,572 B1 | 11/2001 | LaRocca et al. | |
| 6,314,573 B1 | 11/2001 | Gordon et al. | |
| 6,314,575 B1 | 11/2001 | Billock et al. | |
| 6,317,777 B1 | 11/2001 | Skarbo et al. | |
| 6,317,885 B1 | 11/2001 | Fries | |
| 6,323,911 B1 | 11/2001 | Schein et al. | |
| 6,327,628 B1 | 12/2001 | Anuff et al. | |
| 6,335,936 B1 | 1/2002 | Bossemeyer, Jr. et al. | |
| 6,347,400 B1 | 2/2002 | Ohkura et al. | |
| 6,349,410 B1 | 2/2002 | Lortz | |
| 6,353,448 B1 | 3/2002 | Scarborough et al. | |
| 6,357,046 B1 | 3/2002 | Thompson et al. | |
| 6,359,636 B1 | 3/2002 | Schindler et al. | |
| 6,360,367 B1 | 3/2002 | Yamamoto | |
| 6,362,841 B1 | 3/2002 | Nykanen | |
| 6,367,078 B1 | 4/2002 | Lasky | |
| 6,378,130 B1 | 4/2002 | Adams | |
| 6,381,332 B1 | 4/2002 | Glaab | |
| 6,385,614 B1 | 5/2002 | Vellandi | |
| 6,393,585 B1 | 5/2002 | Houha et al. | |
| 6,396,549 B1 | 5/2002 | Weber | |
| 6,400,280 B1 | 6/2002 | Osakabe | |
| 6,401,243 B1 | 6/2002 | Suzuki | |
| 6,405,239 B1 | 6/2002 | Addington et al. | |
| 6,421,067 B1 | 7/2002 | Kamen et al. | |
| 6,429,899 B1 | 8/2002 | Nio et al. | |
| 6,434,748 B1 | 8/2002 | Shen et al. | |
| 6,441,862 B1 | 8/2002 | Yuen et al. | |
| 6,442,332 B1 | 8/2002 | Knudson et al. | |
| 6,442,755 B1 | 8/2002 | Lemmons et al. | |
| 6,442,756 B1 | 8/2002 | Durden et al. | |
| 6,446,261 B1 | 9/2002 | Rosser | |
| 6,446,262 B1 | 9/2002 | Malaure et al. | |
| 6,460,181 B1 | 10/2002 | Donnelly | |
| 6,463,585 B1 | 10/2002 | Hendricks et al. | |
| 6,476,833 B1 | 11/2002 | Moshfeghi | |
| 6,480,669 B1 | 11/2002 | Tsumagari et al. | |
| 6,481,010 B2 | 11/2002 | Nishikawa et al. | |
| 6,481,011 B1 | 11/2002 | Lemmons | |
| 6,486,920 B2 | 11/2002 | Arai et al. | |
| 6,501,902 B1 | 12/2002 | Wang | |
| 6,505,348 B1 | 1/2003 | Knowles et al. | |
| 6,507,949 B1 | 1/2003 | Jonason et al. | |
| 6,510,556 B1 | 1/2003 | Kusaba et al. | |
| 6,515,680 B1 | 2/2003 | Hendricks et al. | |
| 6,515,710 B1 | 2/2003 | Koshimuta | |
| 6,519,770 B2 | 2/2003 | Ford | |
| 6,526,575 B1 | 2/2003 | McCoy et al. | |
| 6,526,577 B1 | 2/2003 | Knudson et al. | |
| 6,532,589 B1 | 3/2003 | Proehl et al. | |
| 6,536,041 B1 | 3/2003 | Knudson et al. | |
| 6,539,548 B1 | 3/2003 | Hendricks et al. | |
| 6,543,053 B1 | 4/2003 | Li et al. | |
| 6,545,669 B1 | 4/2003 | Kinawi et al. | |
| 6,557,030 B1 | 4/2003 | Hoang | |
| 6,563,515 B1 | 5/2003 | Reynolds et al. | |
| 6,564,378 B1 | 5/2003 | Satterfield et al. | |
| 6,564,379 B1 | 5/2003 | Knudson et al. | |
| 6,564,383 B1 | 5/2003 | Combs et al. | |
| 6,571,390 B1 | 5/2003 | Dunn et al. | |
| 6,574,793 B1 | 6/2003 | Ngo et al. | |
| 6,578,077 B1 | 6/2003 | Rakoshitz et al. | |
| 6,594,699 B1 | 7/2003 | Sahai et al. | |
| 6,594,825 B1 | 7/2003 | Goldschmidt Iki et al. | |
| 6,600,496 B1 | 7/2003 | Wagner et al. | |
| 6,604,240 B2 | 8/2003 | Ellis et al. | |
| 6,609,253 B1 | 8/2003 | Swix et al. | |
| 6,611,958 B1 | 8/2003 | Shintani et al. | |
| 6,614,440 B1 | 9/2003 | Bowen et al. | |
| 6,614,988 B1 | 9/2003 | Sampsell | |
| 6,628,302 B2 | 9/2003 | White et al. | |
| 6,631,413 B1 | 10/2003 | Aggarwal et al. | |
| 6,642,939 B1 | 11/2003 | Vallone et al. | |
| 6,647,548 B1 | 11/2003 | Lu et al. | |
| 6,651,044 B1 | 11/2003 | Stoneman | |
| 6,662,365 B1 | 12/2003 | Sullivan et al. | |
| 6,665,869 B1 | 12/2003 | Ellis et al. | |
| 6,671,328 B1 | 12/2003 | Poon et al. | |
| 6,675,384 B1 | 1/2004 | Block et al. | |
| 6,675,385 B1 | 1/2004 | Wang | |
| 6,678,891 B1 | 1/2004 | Wilcox et al. | |

| | | | | | | |
|---|---|---|---|---|---|---|
| 6,681,395 B1 | 1/2004 | Nishi | | 7,707,614 B2 | 4/2010 | Krikorian et al. |
| 6,681,396 B1 | 1/2004 | Bates et al. | | 2001/0003846 A1 | 6/2001 | Rowe et al. |
| 6,684,025 B1 | 1/2004 | Perlman | | 2001/0013125 A1 | 8/2001 | Kitsukawa et al. |
| 6,684,400 B1 | 1/2004 | Goode et al. | | 2001/0013127 A1 | 8/2001 | Tomita et al. |
| 6,697,376 B1 | 2/2004 | Son et al. | | 2001/0029523 A1 | 10/2001 | Mcternan et al. |
| 6,698,023 B2 | 2/2004 | Levitan | | 2001/0030667 A1 | 10/2001 | Kelts |
| 6,701,523 B1 | 3/2004 | Hancock et al. | | 2001/0032335 A1 | 10/2001 | Jones |
| 6,701,528 B1 | 3/2004 | Arsenault et al. | | 2001/0034763 A1 | 10/2001 | Jacobs et al. |
| 6,706,311 B2 | 3/2004 | Wong et al. | | 2001/0036271 A1 | 11/2001 | Javed |
| 6,708,336 B1 | 3/2004 | Bruette | | 2001/0044744 A1 | 11/2001 | Rhoads |
| 6,717,590 B1 | 4/2004 | Sullivan et al. | | 2002/0002642 A1 | 1/2002 | Tyson et al. |
| 6,718,552 B1 | 4/2004 | Goode | | 2002/0007485 A1 | 1/2002 | Rodriguez et al. |
| 6,725,461 B1 | 4/2004 | Dougherty et al. | | 2002/0013836 A1 | 1/2002 | Friedman et al. |
| 6,731,310 B2 | 5/2004 | Craycroft et al. | | 2002/0026496 A1 | 2/2002 | Boyer et al. |
| 6,732,367 B1 | 5/2004 | Ellis et al. | | 2002/0026638 A1 | 2/2002 | Eldering et al. |
| 6,732,369 B1 | 5/2004 | Schein et al. | | 2002/0032638 A1* | 3/2002 | Arora et al. .................. 705/37 |
| 6,732,372 B2 | 5/2004 | Tomita et al. | | 2002/0032728 A1 | 3/2002 | Sako et al. |
| 6,735,572 B2 | 5/2004 | Landesmann | | 2002/0032905 A1 | 3/2002 | Sherr et al. |
| 6,738,982 B1 | 5/2004 | Jerding | | 2002/0042913 A1 | 4/2002 | Ellis et al. |
| 6,757,909 B1 | 6/2004 | Maruo et al. | | 2002/0044762 A1 | 4/2002 | Wood et al. |
| 6,760,918 B2 | 7/2004 | Rodriguez et al. | | 2002/0049978 A1 | 4/2002 | Rodriguez et al. |
| 6,769,127 B1 | 7/2004 | Bonomi et al. | | 2002/0056098 A1 | 5/2002 | White |
| 6,771,290 B1 | 8/2004 | Hoyle | | 2002/0056118 A1 | 5/2002 | Hunter et al. |
| 6,772,209 B1 | 8/2004 | Chernock et al. | | 2002/0057336 A1 | 5/2002 | Gaul et al. |
| 6,772,433 B1 | 8/2004 | LaJoie et al. | | 2002/0062481 A1 | 5/2002 | Slaney et al. |
| 6,782,550 B1* | 8/2004 | Cao .................. 725/39 | | 2002/0069105 A1 | 6/2002 | do Rosario Botelho |
| 6,791,620 B1 | 9/2004 | Elswick et al. | | 2002/0069218 A1 | 6/2002 | Sull et al. |
| 6,792,615 B1 | 9/2004 | Rowe et al. | | 2002/0069412 A1 | 6/2002 | Philips |
| 6,801,533 B1 | 10/2004 | Barkley | | 2002/0078176 A1 | 6/2002 | Nomura et al. |
| 6,817,028 B1 | 11/2004 | Jerding et al. | | 2002/0083443 A1 | 6/2002 | Eldering et al. |
| 6,832,386 B1 | 12/2004 | Jerding et al. | | 2002/0101367 A1 | 8/2002 | Geiger et al. |
| 6,847,969 B1 | 1/2005 | Mathai et al. | | 2002/0104083 A1 | 8/2002 | Hendricks et al. |
| 6,876,628 B2 | 4/2005 | Howard et al. | | 2002/0108125 A1 | 8/2002 | Joao |
| 6,898,762 B2 | 5/2005 | Ellis et al. | | 2002/0124249 A1 | 9/2002 | Shintani et al. |
| 6,901,385 B2 | 5/2005 | Okamoto et al. | | 2002/0128908 A1 | 9/2002 | Levin et al. |
| 6,957,386 B2 | 10/2005 | Nishina et al. | | 2002/0129362 A1 | 9/2002 | Chang et al. |
| 6,968,372 B1 | 11/2005 | Thompson et al. | | 2003/0002862 A1 | 1/2003 | Rodriguez et al. |
| 6,978,310 B1 | 12/2005 | Rodriguez et al. | | 2003/0014753 A1 | 1/2003 | Beach et al. |
| 6,978,475 B1 | 12/2005 | Kunin et al. | | 2003/0030679 A1 | 2/2003 | Jain |
| 6,986,156 B1 | 1/2006 | Rodriguez et al. | | 2003/0031465 A1 | 2/2003 | Blake |
| 6,990,676 B1 | 1/2006 | Proehl et al. | | 2003/0037068 A1 | 2/2003 | Thomas et al. |
| 6,990,677 B1 | 1/2006 | Pietraszak et al. | | 2003/0061619 A1 | 3/2003 | Giammaressi |
| 6,993,782 B1 | 1/2006 | Newberry et al. | | 2003/0067554 A1 | 4/2003 | Klarfeld et al. |
| 7,010,801 B1 | 3/2006 | Jerding et al. | | 2003/0074214 A1 | 4/2003 | Kelliher |
| 7,024,681 B1 | 4/2006 | Fransman et al. | | 2003/0074257 A1 | 4/2003 | Saveliev et al. |
| 7,039,944 B1 | 5/2006 | Cho et al. | | 2003/0079227 A1 | 4/2003 | Knowles et al. |
| 7,062,466 B2 | 6/2006 | Wagner et al. | | 2003/0088872 A1 | 5/2003 | Maissel et al. |
| 7,076,734 B2 | 7/2006 | Wolff et al. | | 2003/0101451 A1 | 5/2003 | Bentolila et al. |
| 7,086,077 B2 | 8/2006 | Giammaressi | | 2003/0101454 A1 | 5/2003 | Ozer et al. |
| 7,103,903 B1 | 9/2006 | Kydd | | 2003/0126425 A1 | 7/2003 | Yang et al. |
| 7,110,714 B1 | 9/2006 | Kay et al. | | 2003/0131356 A1 | 7/2003 | Proehl et al. |
| 7,117,440 B2 | 10/2006 | Gordon et al. | | 2003/0135853 A1 | 7/2003 | Goldman et al. |
| 7,120,926 B1 | 10/2006 | Safadi et al. | | 2003/0154475 A1 | 8/2003 | Rodriguez et al. |
| 7,143,430 B1 | 11/2006 | Fingerman et al. | | 2003/0154486 A1 | 8/2003 | Dunn et al. |
| 7,150,031 B1 | 12/2006 | Rodriguez et al. | | 2003/0159147 A1 | 8/2003 | Young et al. |
| 7,155,733 B2 | 12/2006 | Rodriguez et al. | | 2003/0174243 A1 | 9/2003 | Arbeiter et al. |
| 7,180,422 B2 | 2/2007 | Milenkovic et al. | | 2003/0188313 A1 | 10/2003 | Ellis et al. |
| 7,185,355 B1 | 2/2007 | Ellis et al. | | 2003/0193486 A1 | 10/2003 | Estrop |
| 7,188,356 B1 | 3/2007 | Miura et al. | | 2003/0206553 A1 | 11/2003 | Surcouf et al. |
| 7,194,757 B1 | 3/2007 | Fish et al. | | 2003/0219228 A1 | 11/2003 | Thiagarajan et al. |
| 7,200,857 B1 | 4/2007 | Rodriguez et al. | | 2003/0221194 A1 | 11/2003 | Thiagarajan et al. |
| 7,237,251 B1 | 6/2007 | Oz et al. | | 2004/0034867 A1 | 2/2004 | Rashkovskiy et al. |
| 7,243,364 B2 | 7/2007 | Dunn et al. | | 2004/0049787 A1 | 3/2004 | Maissel et al. |
| 7,249,366 B1 | 7/2007 | Flavin | | 2004/0107436 A1 | 6/2004 | Ishizaki |
| 7,324,552 B1 | 1/2008 | Galand et al. | | 2004/0117831 A1 | 6/2004 | Ellis et al. |
| 7,324,553 B1 | 1/2008 | Varier et al. | | 2004/0128685 A1 | 7/2004 | Hassell et al. |
| 7,334,251 B2 | 2/2008 | Rodriguez et al. | | 2004/0133907 A1 | 7/2004 | Rodriguez et al. |
| 7,340,759 B1 | 3/2008 | Rodriguez | | 2004/0163117 A1 | 8/2004 | Rodriguez et al. |
| 7,343,614 B1 | 3/2008 | Hendricks et al. | | 2004/0168191 A1 | 8/2004 | Jerding et al. |
| 7,356,477 B1 | 4/2008 | Allan et al. | | 2004/0181801 A1 | 9/2004 | Hagen et al. |
| 7,404,200 B1 | 7/2008 | Hailey et al. | | 2004/0221310 A1 | 11/2004 | Herrington et al. |
| 7,496,943 B1 | 2/2009 | Goldberg et al. | | 2004/0261112 A1 | 12/2004 | Hicks et al. |
| 7,496,945 B2 | 2/2009 | Rodriguez | | 2004/0261125 A1 | 12/2004 | Ellis et al. |
| 7,509,267 B1 | 3/2009 | Yarmolich et al. | | 2005/0008074 A1 | 1/2005 | van Beek et al. |
| 7,512,964 B2 | 3/2009 | Rodriguez et al. | | 2005/0028190 A1 | 2/2005 | Rodriguez et al. |
| 7,526,788 B2 | 4/2009 | Rodriguez | | 2005/0044565 A1 | 2/2005 | Jerding et al. |
| 7,647,549 B2 | 1/2010 | Denoual et al. | | 2005/0044566 A1 | 2/2005 | Jerding et al. |
| 7,673,314 B2 | 3/2010 | Ellis et al. | | 2005/0044577 A1 | 2/2005 | Jerding et al. |
| 7,685,520 B2 | 3/2010 | Rashkovskiy et al. | | 2005/0071882 A1 | 3/2005 | Rodriguez et al. |

| | | | | | | |
|---|---|---|---|---|---|---|
| 2005/0076360 A1 | 4/2005 | Jerding et al. | EP | 0 891 084 A2 | 1/1999 |
| 2005/0091693 A1 | 4/2005 | Amine et al. | EP | 0 896 318 A2 | 2/1999 |
| 2005/0111046 A1 | 5/2005 | Kurumisawa et al. | EP | 0 909 095 A1 | 4/1999 |
| 2005/0138657 A1 | 6/2005 | Leftwich | EP | 0 701 756 B1 | 12/1999 |
| 2005/0155056 A1 | 7/2005 | Knee et al. | EP | 0 989 751 A2 | 3/2000 |
| 2005/0160468 A1 | 7/2005 | Rodriguez et al. | EP | 1 069 801 A1 | 1/2001 |
| 2005/0188415 A1 | 8/2005 | Riley | EP | 1 075 143 A1 | 2/2001 |
| 2005/0204387 A1 | 9/2005 | Knudson et al. | EP | 1 111 572 A2 | 6/2001 |
| 2005/0204388 A1 | 9/2005 | Knudson et al. | EP | 1 161 085 A1 | 12/2001 |
| 2005/0213506 A1 | 9/2005 | Wakumoto et al. | GB | 2 343 051 A | 4/2000 |
| 2005/0216936 A1 | 9/2005 | Knudson et al. | JP | 8-289219 | 11/1996 |
| 2005/0240961 A1 | 10/2005 | Jerding et al. | JP | 9-322022 | 12/1997 |
| 2005/0251822 A1 | 11/2005 | Knowles et al. | JP | 10-143734 | 5/1998 |
| 2005/0278741 A1 | 12/2005 | Robarts et al. | JP | 11-73361 | 3/1999 |
| 2005/0283797 A1 | 12/2005 | Eldering et al. | JP | 11-073394 | 3/1999 |
| 2005/0283810 A1 | 12/2005 | Ellis et al. | JP | 11-164284 | 6/1999 |
| 2005/0289618 A1 | 12/2005 | Hardin | JP | 2000-101941 | 4/2000 |
| 2006/0020982 A1 | 1/2006 | Jerding et al. | WO | WO 92/22983 | 12/1992 |
| 2006/0026080 A1 | 2/2006 | Rodriguez et al. | WO | WO 94/14284 | 6/1994 |
| 2006/0026665 A1 | 2/2006 | Rodriguez et al. | WO | WO 96/17467 | 6/1996 |
| 2006/0059525 A1 | 3/2006 | Jerding et al. | WO | WO 96/33579 | 10/1996 |
| 2006/0070107 A1 | 3/2006 | Renkis | WO | WO 96/34486 | 10/1996 |
| 2006/0088105 A1 | 4/2006 | Shen et al. | WO | WO 96/34491 | 10/1996 |
| 2006/0112434 A1 | 5/2006 | Banker et al. | WO | WO 96/41477 | 12/1996 |
| 2006/0206913 A1 | 9/2006 | Jerding et al. | WO | WO 96/41478 | 12/1996 |
| 2006/0271933 A1 | 11/2006 | Agassi et al. | WO | WO 97/34414 | 9/1997 |
| 2006/0271964 A1 | 11/2006 | Rodriguez et al. | WO | WO 98/03012 | 1/1998 |
| 2006/0271973 A1 | 11/2006 | Jerding et al. | WO | WO 98/26528 | 6/1998 |
| 2007/0019670 A1 | 1/2007 | Falardeau | WO | WO 98/31116 | 7/1998 |
| 2007/0053293 A1 | 3/2007 | McDonald et al. | WO | WO 98/37695 | 8/1998 |
| 2007/0094690 A1 | 4/2007 | Rodriguez et al. | WO | WO 98/39893 | 9/1998 |
| 2007/0136748 A1 | 6/2007 | Rodriguez et al. | WO | WO 98/47279 | 10/1998 |
| 2007/0186240 A1 | 8/2007 | Ward, III et al. | WO | WO 98/48566 | 10/1998 |
| 2008/0010658 A1 | 1/2008 | Abbott et al. | WO | WO 98/56172 | 12/1998 |
| 2008/0098421 A1 | 4/2008 | Rodriguez et al. | WO | WO 98/56173 | 12/1998 |
| 2008/0098422 A1 | 4/2008 | Rodriguez et al. | WO | WO 98/56188 | 12/1998 |
| 2008/0101460 A1 | 5/2008 | Rodriguez | WO | WO 99/01984 | 1/1999 |
| 2008/0104637 A1 | 5/2008 | Rodriguez et al. | WO | WO 99/04560 | 1/1999 |
| 2008/0137755 A1 | 6/2008 | Onur et al. | WO | WO 99/04561 | 1/1999 |
| 2008/0155631 A1 | 6/2008 | Liwerant et al. | WO | WO 99/12109 | 3/1999 |
| 2008/0229361 A1 | 9/2008 | Jerding et al. | WO | WO 99/14947 | 3/1999 |
| 2008/0279217 A1 | 11/2008 | McDonald et al. | WO | WO 99/35831 | 7/1999 |
| 2008/0281968 A1 | 11/2008 | Rodriguez | WO | WO 99/45701 | 9/1999 |
| 2008/0282307 A1 | 11/2008 | McDonald et al. | WO | WO 99/49717 | 10/1999 |
| 2008/0282308 A1 | 11/2008 | McDonald et al. | WO | WO 99/52285 | 10/1999 |
| 2009/0141794 A1 | 6/2009 | Rodriguez et al. | WO | WO 99/57903 | 11/1999 |
| 2009/0150958 A1 | 6/2009 | Jerding et al. | WO | WO 99/59903 | 11/1999 |
| 2009/0158306 A1 | 6/2009 | Rodriguez et al. | WO | WO 99/60790 | 11/1999 |
| 2009/0158324 A1 | 6/2009 | Rodriguez et al. | WO | WO 99/66719 | 12/1999 |
| 2009/0158329 A1 | 6/2009 | Rodriguez et al. | WO | WO 00/02385 | 1/2000 |
| 2009/0158331 A1 | 6/2009 | Rodriguez et al. | WO | WO 00/04726 | 1/2000 |
| 2009/0158332 A1 | 6/2009 | Rodriguez et al. | WO | WO 00/05889 | 2/2000 |
| 2009/0158335 A1 | 6/2009 | Rodriguez et al. | WO | WO 00/30354 | 5/2000 |
| 2009/0158339 A1 | 6/2009 | Rodriguez et al. | WO | WO 00/40017 | 7/2000 |
| 2009/0158352 A1 | 6/2009 | Rodriguez et al. | WO | WO 00/46988 | 8/2000 |
| 2009/0158354 A1 | 6/2009 | Rodriguez et al. | WO | WO 00/49801 | 8/2000 |
| 2009/0158355 A1 | 6/2009 | Rodriguez et al. | WO | WO 00/59202 | 10/2000 |
| 2009/0158363 A1 | 6/2009 | Rodriguez et al. | WO | WO 00/60482 | 10/2000 |
| 2009/0183081 A1 | 7/2009 | Rodriguez et al. | WO | WO 00/78031 A2 | 12/2000 |
| 2009/0190028 A1 | 7/2009 | Rodriguez et al. | WO | WO 00/78045 A1 | 12/2000 |
| 2009/0193468 A1 | 7/2009 | Rodriguez | WO | WO 00/78047 A1 | 12/2000 |
| 2009/0193471 A1 | 7/2009 | Rodriguez | WO | WO 00/78048 A1 | 12/2000 |
| 2009/0276808 A1 | 11/2009 | Jerding et al. | WO | WO 01/06788 A1 | 1/2001 |
| 2009/0282372 A1 | 11/2009 | Jerding et al. | WO | WO 01/20907 A1 | 3/2001 |
| 2009/0282440 A1 | 11/2009 | Rodriguez | WO | WO 01/24067 A1 | 4/2001 |
| 2010/0242063 A1 | 9/2010 | Slaney et al. | WO | WO 01/56273 A1 | 8/2001 |
| | | | WO | WO 01/67736 A1 | 9/2001 |
| FOREIGN PATENT DOCUMENTS | | | WO | WO 01/72042 A1 | 9/2001 |
| CA | 2 223 025 C | 11/2001 | WO | WO 01/76245 A2 | 10/2001 |
| CA | 2 475 723 C | 1/2011 | WO | WO 01/77888 A2 | 10/2001 |
| EP | 0 572 090 A2 | 12/1993 | WO | WO 01/84831 A2 | 11/2001 |
| EP | 0 673 159 A1 | 9/1995 | WO | WO 02/097584 A2 | 12/2002 |
| EP | 0 680 214 A2 | 11/1995 | WO | WO 03/003164 A2 | 1/2003 |
| EP | 0 725 538 A2 | 8/1996 | WO | WO 03/003709 A2 | 1/2003 |
| EP | 0 763 936 A2 | 3/1997 | WO | WO 03/014873 A2 | 2/2003 |
| EP | 0 811 939 A2 | 12/1997 | WO | WO 03/024084 A2 | 3/2003 |
| EP | 0 838 915 A2 | 4/1998 | WO | WO 03/042787 A2 | 5/2003 |
| EP | 0 849 948 A2 | 6/1998 | WO | WO 03/069898 A1 | 8/2003 |
| EP | 0 854 645 A2 | 7/1998 | WO | WO 2004/091219 A1 | 10/2004 |

| | | | |
|---|---|---|---|
| WO | WO 2004/100500 A2 | 11/2004 | |
| WO | WO 2005/059202 A1 | 6/2005 | |
| WO | WO 2005/071658 A1 | 8/2005 | |
| WO | WO 2007/030370 A1 | 3/2007 | |

OTHER PUBLICATIONS

"A Brief History of the Trailer," http://www.movietrailertrash.com/views/history.html, 11 pages (Publicly known at least as early as Dec. 20, 2003).

"Client User Interface Specification (Phase I) for Video-On-Demand Application Development on the Explorer 2000™ Digital Home Communications Terminal", Revision 1.10 (Aug. 31, 1998).

"Evidence of illustrative movie release years," Retrieved from the Internet Movie Database using Internet, http://www.imdb.com, 19 pages (Retrieved on Jun. 6, 2005).

"ISO/IEC 13818-6 Information technology—Generic coding of moving pictures and associated audio information—Part 6: Extensions for DSM-CC," Chapter 4, 113 pages (Sep. 1, 1998).

"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).

"Netscape Navigator Help," Netscape Navigator Software User Documentation, Netscape Communications Corporation, http://home.netscape.com, XP-002166369, pp. 1-63 (Aug. 10, 1997).

"Sez You . . . origin of word daemon," *Take Our Word for It*, Issue 146, p. 4, http://www.takeourword.com/TOW146/page4.html (retrieved on Apr. 4, 2006).

Addington, Timothy H., "System Architecture Specification for Video-On-Demand Application Development on the Explorer 2000™ Digital Home Communications Terminal", Revision 1.10r Review Copy (Mar. 4, 1999).

ATI Multimedia Center 7.9, User's Guide, ATI Technologies Inc., pp. i-vi and 1-96 (Copyright 2002).

Barth et al., "10 Fernsehen am PC", Suse GMBH, XP-002324319, pp. 143-149 (2001).

BPAI Decision for U.S. Appl. No. 09/692,995, mailed Aug. 20, 2008.

BPAI Decision for U.S. Appl. No. 09/693,288, mailed Nov. 28, 2007.

Canadian Office Action cited in Application No. 2,376,556 mailed Sep. 30, 2008.

Canadian Office Action cited in Application No. 2,376,556 mailed Nov. 23, 2007.

Canadian Office Action cited in Application No. 2,376,556 mailed Dec. 6, 2005.

Canadian Office Action cited in Application No. 2,402,088 mailed May 30, 2006.

Canadian Office Action cited in Application No. 2,405,491 mailed Apr. 3, 2009.

Canadian Office Action cited in Application No. 2,405,491 mailed May 22, 2008.

Canadian Office Action cited in Application No. 2,405,491 mailed Jun. 20, 2007.

Canadian Office Action cited in Application No. 2,405,491 mailed Jan. 20, 2006.

Canadian Office Action cited in Application No. 2,408,289 mailed Aug. 27, 2008.

Canadian Office Action cited in Application No. 2,408,289 mailed May 30, 2006.

Canadian Office Action cited in Application No. 2,451,477 mailed Nov. 3, 2009.

Canadian Office Action cited in Application No. 2,456,318 mailed May 5, 2008.

Canadian Office Action cited in Application No. 2,456,318 mailed Mar. 27, 2007.

Canadian Office Action cited in Application No. 2,459,334 mailed Apr. 16, 2009.

Canadian Office Action cited in Application No. 2,466,667 mailed Apr. 15, 2009.

Canadian Office Action cited in Application No. 2,475,723 mailed Jul. 7, 2009.

Canadian Office Action cited in Application No. 2,621,605 mailed Dec. 15, 2009.

Cunningham et al., "5 Das X Window System"., Suse GMBH, XP-002324320, pp. 129-180 (2001).

Decision on Appeal affirmed cited in U.S. Appl. No. 09/590,434 mailed May 28, 2008.

Definition of "flag", *Microsoft Press: Computer User's Dictionary*, 3 pages (1998).

Definition of "renting", Webster's II: New College Dictionary, 1995, Houghton Mifflin Company, p. 939.

European Examination Report cited in Application No. 00 938 251.6 mailed Nov. 2, 2007.

European Examination Report cited in Application No. 00 939 759.7 mailed May 10, 2007.

European Examination Report cited in Application No. 01 905 058.2 mailed Dec. 19, 2006.

European Examination Report cited in Application No. 01 922 261.1 mailed Jul. 18, 2008.

European Examination Report cited in Application No. 01 922 261.1 mailed Nov. 2, 2007.

European Examination Report cited in Application No. 01 922 261.1 mailed Jan. 24, 2007.

European Examination Report cited in Application No. 01 922 261.1 mailed May 26, 2006.

European Examination Report cited in Application No. 01 923 092.9 mailed Jul. 20, 2009.

European Examination Report cited in Application No. 01 923 092.9 mailed Nov. 27, 2008.

European Examination Report cited in Application No. 01 937 209.3 mailed Jun. 23, 2008.

European Examination Report cited in Application No. 02 737 593.0 mailed May 6, 2009.

European Examination Report cited in Application No. 02 750 416.6 mailed Aug. 4, 2008.

European Examination Report cited in Application No. 02 750 416.6 mailed Aug. 28, 2007.

European Examination Report cited in Application No. 02 761 572.3 mailed Apr. 20, 2009.

European Examination Report cited in Application No. 02 761 572.3 mailed Sep. 22, 2008.

European Examination Report cited in Application No. 02 761 572.3 mailed Jan. 22, 2008.

European Examination Report cited in Application No. 02 761 572.3 mailed Aug. 29, 2007.

European Examination Report cited in Application No. 06 802 683.0 mailed Jun. 26, 2008.

Examiner's Answer to Appeal Brief Cited in U.S. Appl. No. 09/590,488 mailed Jan. 11, 2008.

Japanese Office Action cited in Application No. 2001-581527 mailed Sep. 8, 2009.

Kevin, "Change Screen Resolution in Windows (Tips, Tricks, Tweaks, and Setting)," http://www.tacktech.com/display.cfm?t-tid=207, pp. 1-3 (Oct. 26, 2002).

Leftwitch et al., "StarSight Interactive Television Program Guide—Functional/Interational Architecture Specification Document, Interaction Analysis and Design Project—Phase III," 36 pages.

McFedries, "The Complete Idiot's Guide to Windows 95," Que, 2nd Edition, p. 49 (1997).

PCT Search Report cited in International Application No. PCT/US00/15952 mailed Jan. 16, 2001.

PCT Search Report cited in International Application No. PCT/US00/15963 mailed Sep. 1, 2000.

PCT Search Report cited in International Application No. PCT/US00/16000 mailed Oct. 2, 2000.

PCT Search Report cited in International Application No. PCT/US01/02490 mailed May 18, 2001.

PCT Search Report cited in International Application No. PCT/US01/06663 mailed Oct. 18, 2001.

PCT Search Report cited in International Application No. PCT/US01/10874 mailed Nov. 29, 2001.

PCT Search Report cited in International Application No. PCT/US01/14150 mailed Apr. 29, 2002.

PCT Search Report cited in International Application No. PCT/US02/20307 mailed Jan. 3, 2003.

PCT Search Report cited in International Application No. PCT/US02/20519 mailed Apr. 7, 2003.
PCT Search Report cited in International Application No. PCT/US02/24704 mailed Mar. 5, 2003.
PCT Search Report cited in International Application No. PCT/US02/28212 mailed Jan. 23, 2003.
PCT Search Report cited in International Application No. PCT/US02/36291 mailed May 23, 2003.
PCT Search Report cited in International Application No. PCT/US03/03391 mailed Jul. 14, 2003.
PCT Search Report and Written Opinion cited in International Application No. PCT/US2005/001812 mailed May 2, 2005.
PCT Search Report and Written Opinion cited in International Application No. PCT/US2006/033965 mailed Feb. 9, 2007.
PCT Search Report and Written Opinion cited in International Application No. PCT/US2006/033965 Feb. 19, 2007.
PCT Written Opinion cited in International Application No. PCT/US00/15952 mailed Jul. 25, 2001.
PCT Written Opinion cited in International Application No. PCT/US00/15963 mailed Jun. 22, 2001.
PCT Written Opinion cited in International Application No. PCT/US00/16000 mailed Oct. 25, 2001.
PCT Written Opinion cited in International Application No. PCT/US01/02490 mailed Oct. 23, 2001.
PCT Written Opinion cited in International Application No. PCT/US01/06663 mailed Jan. 3, 2002.
PCT Written Opinion cited in International Application No. PCT/US01/10874 mailed Jun. 4, 2002.
PCT Written Opinion cited in International Application No. PCT/US01/14150 mailed Sep. 30, 2004.
PCT Written Opinion cited in International Application No. PCT/US02/20307 mailed Aug. 8, 2003.
PCT Written Opinion cited in International Application No. PCT/US02/20519 mailed Apr. 6, 2004.
PCT Written Opinion cited in International Application No. PCT/US02/24704 mailed Nov. 20, 2003.
PCT Written Opinion cited in International Application No. PCT/US02/28212 mailed Dec. 4, 2003.
Reid, Dixie, "Coming attractions before they hit the big screen, most films begin life as a trailer," *The Sacramento Bee*, Sacramento, California, p. E.1 (Jul. 18, 1996).
Remote Wonder, ATI, Tweak 3D, pp. 1-5 (Sep. 30, 2002).
Reply Brief in U.S. Appl. No. 09/565,931 mailed on Sep. 17, 2007.
Supplementary European Search Report cited in European Application No. 02737593.0 mailed Mar. 3, 2009.
Supplementary European Search Report cited in European Application No. 02750416.6 mailed Jan. 2, 2007.
Supplementary European Search Report cited in European Application No. 02761572.3 mailed Mar. 20, 2007.
Supplementary European Search Report cited in European Application No. 02797096.1 mailed Oct. 14, 2005.
Supplementary European Search Report cited in European Application No. 03713364.2 mailed Jul. 6, 2005.
U.S. Final Office Action cited in U.S. Appl. No. 09/518,041 mailed Jul. 7, 2008.
U.S. Non-Final Office Action cited in U.S. Appl. No. 09/518,041 mailed Jan. 10, 2008.
U.S. Final Office Action cited in U.S. Appl. No. 09/518,041 mailed Aug. 24, 2007.
U.S. Non-Final Office Action cited in U.S. Appl. No. 09/518,041 mailed Feb. 6, 2007.
U.S. Final Office Action cited in U.S. Appl. No. 09/518,041 mailed Aug. 28, 2006.
U.S. Non-Final Office Action cited in U.S. Appl. No. 09/518,041 mailed Apr. 4, 2006.
U.S. Final Office Action cited in U.S. Appl. No. 09/518,041 mailed Sep. 15, 2005.
U.S. Non-Final Office Action cited in U.S. Appl. No. 09/518,041 mailed Apr. 22, 2005.
U.S. Final Office Action cited in U.S. Appl. No. 09/518,041 mailed Oct. 20, 2004.
U.S. Non-Final Office Action cited in U.S. Appl. No. 09/518,041 mailed Feb. 11, 2004.
U.S. Final Office Action cited in U.S. Appl. No. 09/518,041 mailed Aug. 27, 2003.
U.S. Non-Final Office Action cited in U.S. Appl. No. 09/518,041 mailed Mar. 18, 2003.
U.S. Final Office Action cited in U.S. Appl. No. 09/542,484 mailed Jun. 17, 2008.
U.S. Non-Final Office Action cited in U.S. Appl. No. 09/542,484 mailed Dec. 7, 2007.
U.S. Non-Final Office Action cited in U.S. Appl. No. 09/542,484 mailed Mar. 12, 2007.
U.S. Non-Final Office Action cited in U.S. Appl. No. 09/542,484 mailed Sep. 7, 2006.
U.S. Final Office Action cited in U.S. Appl. No. 09/542,484 mailed Mar. 21, 2006.
U.S. Non-Final Office Action cited in U.S. Appl. No. 09/542,484 mailed Jul. 28, 2005.
U.S. Final Office Action cited in U.S. Appl. No. 09/542,484 mailed Mar. 22, 2005.
U.S. Non-Final Office Action cited in U.S. Appl. No. 09/542,484 mailed Apr. 1, 2004.
U.S. Non-Final Office Action cited in U.S. Appl. No. 09/565,931 mailed Oct. 28, 2009.
U.S. Final Office Action cited in U.S. Appl. No. 09/565,931 mailed Jul. 14, 2009.
U.S. Non-Final Office Action cited in U.S. Appl. No. 09/565,931 mailed Feb. 13, 2009.
U.S. Final Office Action cited in U.S. Appl. No. 09/565,931 mailed Jun. 15, 2006.
U.S. Non-Final Office Action cited in U.S. Appl. No. 09/565,931 mailed Jan. 11, 2006.
U.S. Final Office Action cited in U.S. Appl. No. 09/565,931 mailed Jul. 1, 2005.
U.S. Non-Final Office Action cited in U.S. Appl. No. 09/565,931 mailed Sep. 10, 2004.
U.S. Final Office Action cited in U.S. Appl. No. 09/590,434 mailed May 11, 2006.
U.S. Non-Final Office Action cited in U.S. Appl. No. 09/590,434 mailed Nov. 21, 2005.
U.S. Final Office Action cited in U.S. Appl. No. 09/590,434 mailed Dec. 1, 2004.
U.S. Non-Final Office Action cited in U.S. Appl. No. 09/590,434 mailed Apr. 22, 2004.
U.S. Final Office Action cited in U.S. Appl. No. 09/590,434 mailed Dec. 18, 2003.
U.S. Non-Final Office Action cited in U.S. Appl. No. 09/590,434 mailed May 23, 2003.
U.S. Final Office Action cited in U.S. Appl. No. 09/590,488 mailed Feb. 27, 2007.
U.S. Non-Final Office Action cited in U.S. Appl. No. 09/590,488 mailed Oct. 26, 2006.
U.S. Final Office Action cited in U.S. Appl. No. 09/590,488 mailed Jul. 10, 2006.
U.S. Non-Final Office Action cited in U.S. Appl. No. 09/590,488 mailed Dec. 20, 2005.
U.S. Final Office Action cited in U.S. Appl. No. 09/590,488 mailed Jun. 30, 2005.
U.S. Non-Final Office Action cited in U.S. Appl. No. 09/590,488 mailed Nov. 16, 2004.
U.S. Final Office Action cited in U.S. Appl. No. 09/590,488 mailed Jun. 7, 2004.
U.S. Final Office Action cited in U.S. Appl. No. 09/590,488 mailed Dec. 16, 2003.
U.S. Non-Final Office Action cited in U.S. Appl. No. 09/590,488 mailed Jun. 10, 2003.
U.S. Non-Final Office Action cited in U.S. Appl. No. 09/590,904 mailed Sep. 13, 2007.
U.S. Non-Final Office Action cited in U.S. Appl. No. 09/590,904 mailed Mar. 26, 2007.
U.S. Final Office Action cited in U.S. Appl. No. 09/590,904 mailed Nov. 15, 2006.
U.S. Non-Final Office Action cited in U.S. Appl. No. 09/590,904 mailed May 31, 2006.

U.S. Final Office Action cited in U.S. Appl. No. 09/590,904 mailed Jan. 24, 2006.
U.S. Non-Final Office Action cited in U.S. Appl. No. 09/590,904 mailed Jul. 13, 2005.
U.S. Final Office Action cited in U.S. Appl. No. 09/590,904 mailed Jan. 11, 2005.
U.S. Non-Final Office Action cited in U.S. Appl. No. 09/590,904 mailed Jun. 4, 2004.
U.S. Final Office Action cited in U.S. Appl. No. 09/591,356 mailed Apr. 13, 2006.
U.S. Non-Final Office Action cited in U.S. Appl. No. 09/591,356 mailed Dec. 20, 2005.
U.S. Final Office Action cited in U.S. Appl. No. 09/591,356 mailed Jun. 30, 2005.
U.S. Final Office Action cited in U.S. Appl. No. 09/591,356 mailed May 10, 2004.
U.S. Non-Final Office Action cited in U.S. Appl. No. 09/591,356 mailed Jan. 14, 2004.
U.S. Final Office Action cited in U.S. Appl. No. 09/591,356 mailed Sep. 26, 2003.
U.S. Non-Final Office Action cited in U.S. Appl. No. 09/591,356 mailed May 21, 2003.
U.S. Final Office Action cited in U.S. Appl. No. 09/692,920 mailed Jul. 22, 2008.
U.S. Non-Final Office Action cited in U.S. Appl. No. 09/692,920 mailed Jan. 17, 2008.
U.S. Final Office Action cited in U.S. Appl. No. 09/692,920 mailed Jun. 14, 2007.
U.S. Non-Final Office Action cited in U.S. Appl. No. 09/692,920 mailed Nov. 24, 2006.
U.S. Final Office Action cited in U.S. Appl. No. 09/692,920 mailed Jun. 21, 2006.
U.S. Non-Final Office Action cited in U.S. Appl. No. 09/692,920 mailed Feb. 16, 2006.
U.S. Final Office Action cited in U.S. Appl. No. 09/692,920 mailed Jun. 17, 2005.
U.S. Non-Final Office Action cited in U.S. Appl. No. 09/692,920 mailed Nov. 18, 2004.
U.S. Final Office Action cited in U.S. Appl. No. 09/692,995 mailed Sep. 4, 2009.
U.S. Non-Final Office Action cited in U.S. Appl. No. 09/692,995 mailed Jan. 23, 2009.
U.S. Final Office Action cited in U.S. Appl. No. 09/692,995 mailed Sep. 8, 2006.
U.S. Non-Final Office Action cited in U.S. Appl. No. 09/692,995 mailed Mar. 27, 2006.
U.S. Final Office Action cited in U.S. Appl. No. 09/692,995 mailed Sep. 21, 2005.
U.S. Final Office Action cited in U.S. Appl. No. 09/692,995 mailed May 3, 2005.
U.S. Non-Final Office Action cited in U.S. Appl. No. 09/692,995 mailed Oct. 21, 2004.
U.S. Final Office Action cited in U.S. Appl. No. 09/692,995 mailed Apr. 26, 2004.
U.S. Non-Final Office Action cited in U.S. Appl. No. 09/692,995 mailed Dec. 5, 2003.
U.S. Final Office Action cited in U.S. Appl. No. 09/693,115 mailed Jan. 25, 2005.
U.S. Non-Final Office Action cited in U.S. Appl. No. 09/693,115 mailed Jun. 16, 2004.
U.S. Final Office Action cited in U.S. Appl. No. 09/693,115 mailed Feb. 9, 2004.
U.S. Non-Final Office Action cited in U.S. Appl. No. 09/693,115 mailed Sep. 26, 2003.
U.S. Final Office Action cited in U.S. Appl. No. 09/693,288 mailed Dec. 1, 2005.
U.S. Non-Final Office Action cited in U.S. Appl. No. 09/693,288 mailed Jul. 19, 2005.
U.S. Final Office Action cited in U.S. Appl. No. 09/693,288 mailed Feb. 10, 2005.
U.S. Non-Final Office Action cited in U.S. Appl. No. 09/693,288 mailed Jul. 15, 2004.
U.S. Final Office Action cited in U.S. Appl. No. 09/693,288 mailed Feb. 26, 2004.
U.S. Non-Final Office Action cited in U.S. Appl. No. 09/693,288 mailed Oct. 27, 2003.
U.S. Final Office Action cited in U.S. Appl. No. 09/693,790 mailed Jul. 25, 2008.
U.S. Non-Final Office Action cited in U.S. Appl. No. 09/693,790 mailed Jan. 15, 2008.
U.S. Final Office Action cited in U.S. Appl. No. 09/693,790 mailed Jun. 19, 2007.
U.S. Non-Final Office Action cited in U.S. Appl. No. 09/693,790 mailed Dec. 28, 2006.
U.S. Final Office Action cited in U.S. Appl. No. 09/693,790 mailed Jun. 16, 2006.
U.S. Non-Final Office Action cited in U.S. Appl. No. 09/693,790 mailed Dec. 28, 2005.
U.S. Final Office Action cited in U.S. Appl. No. 09/693,790 mailed Jun. 21, 2005.
U.S. Non-Final Office Action cited in U.S. Appl. No. 09/693,790 mailed Oct. 6, 2004.
U.S. Final Office Action cited in U.S. Appl. No. 09/881,516 mailed Jun. 3, 2005.
U.S. Non-Final Office Action cited in U.S. Appl. No. 09/881,516 mailed Dec. 29, 2004.
U.S. Final Office Action cited in U.S. Appl. No. 09/881,516 mailed Jul. 26, 2004.
U.S. Final Office Action cited in U.S. Appl. No. 09/881,516 mailed Apr. 21, 2004.
U.S. Non-Final Office Action cited in U.S. Appl. No. 09/881,516 mailed Oct. 28, 2003.
U.S. Non-Final Office Action cited in U.S. Appl. No. 09/896,231 mailed Nov. 17, 2009.
U.S. Final Office Action cited in U.S. Appl. No. 09/896,231 mailed Jun. 3, 2009.
U.S. Non-Final Office Action cited in U.S. Appl. No. 09/896,231 mailed Dec. 23, 2008.
U.S. Final Office Action cited in U.S. Appl. No. 09/896,231 mailed Dec. 29, 2005.
U.S. Non-Final Office Action cited in U.S. Appl. No. 09/896,231 mailed Jun. 23, 2005.
U.S. Final Office Action cited in U.S. Appl. No. 09/924,111 mailed Aug. 7, 2008.
U.S. Non-Final Office Action cited in U.S. Appl. No. 09/924,111 mailed Jan. 29, 2008.
U.S. Final Office Action cited in U.S. Appl. No. 09/924,111 mailed Oct. 5, 2007.
U.S. Non-Final Office Action cited in U.S. Appl. No. 09/924,111 mailed Apr. 19, 2007.
U.S. Final Office Action cited in U.S. Appl. No. 09/924,111 mailed Sep. 18, 2006.
U.S. Non-Final Office Action cited in U.S. Appl. No. 09/924,111 mailed Mar. 15, 2006.
U.S. Final Office Action cited in U.S. Appl. No. 09/947,890 mailed Nov. 24, 2009.
U.S. Non-Final Office Action cited in U.S. Appl. No. 09/947,890 mailed Apr. 10, 2009.
U.S. Final Office Action cited in U.S. Appl. No. 09/947,890 mailed Nov. 6, 2008.
U.S. Non-Final Office Action cited in U.S. Appl. No. 09/947,890 mailed Jun. 25, 2008.
U.S. Final Office Action cited in U.S. Appl. No. 10/740,138 mailed Jan. 15, 2010.
U.S. Non-Final Office Action cited in U.S. Appl. No. 10/740,138 mailed Sep. 3, 2009.
U.S. Final Office Action cited in U.S. Appl. No. 10/740,138 mailed Mar. 19, 2009.
U.S. Non-Final Office Action cited in U.S. Appl. No. 10/740,138 mailed Sep. 15, 2008.
U.S. Final Office Action cited in U.S. Appl. No. 10/740,138 mailed Jun. 11, 2008.
U.S. Non-Final Office Action cited in U.S. Appl. No. 10/740,138 mailed Oct. 2, 2007.

U.S. Non-Final Office Action cited in U.S. Appl. No. 10/761,777 mailed Jun. 11, 2009.
U.S. Final Office Action cited in U.S. Appl. No. 10/761,777 mailed Dec. 19, 2008.
U.S. Non-Final Office Action cited in U.S. Appl. No. 10/761,777 mailed Jul. 18, 2007.
U.S. Non-Final Office Action cited in U.S. Appl. No. 10/761,777 mailed Jan. 24, 2007.
U.S. Final Office Action cited in U.S. Appl. No. 10/778,494 mailed Jul. 25, 2008.
U.S. Non-Final Office Action cited in U.S. Appl. No. 10/778,494 mailed Jan. 16, 2008.
U.S. Final Office Action cited in U.S. Appl. No. 10/778,494 mailed May 22, 2007.
U.S. Non-Final Office Action cited in U.S. Appl. No. 10/778,494 mailed Feb. 2, 2007.
U.S. Final Office Action cited in U.S. Appl. No. 10/778,494 mailed Aug. 28, 2006.
U.S. Non-Final Office Action cited in U.S. Appl. No. 10/778,494 mailed Dec. 29, 2004.
U.S. Final Office Action cited in U.S. Appl. No. 10/783,235 mailed Oct. 2, 2008.
U.S. Non-Final Office Action cited in U.S. Appl. No. 10/783,235 mailed Feb. 25, 2008.
U.S. Final Office Action cited in U.S. Appl. No. 10/934,253 mailed Dec. 23, 2009.
U.S. Non-Final Office Action cited in U.S. Appl. No. 10/934,253 mailed Jun. 26, 2009.
U.S. Final Office Action cited in U.S. Appl. No. 10/934,253 mailed Dec. 26, 2008.
U.S. Non-Final Office Action cited in U.S. Appl. No. 10/934,253 mailed Jun. 17, 2008.
U.S. Final Office Action cited in U.S. Appl. No. 10/934,253 mailed Jul. 24, 2007.
U.S. Non-Final Office Action cited in U.S. Appl. No. 10/934,253 mailed Feb. 9, 2007.
U.S. Non-Final Office Action cited in U.S. Appl. No. 10/934,253 mailed Sep. 14, 2006.
U.S. Final Office Action cited in U.S. Appl. No. 10/957,849 mailed Aug. 8, 2008.
U.S. Non-Final Office Action cited in U.S. Appl. No. 10/957,849 mailed Apr. 30, 2008.
U.S. Non-Final Office Action cited in U.S. Appl. No. 10/957,854 mailed Sep. 28, 2009.
U.S. Final Office Action cited in U.S. Appl. No. 10/957,854 mailed Apr. 7, 2009.
U.S. Non-Final Office Action cited in U.S. Appl. No. 10/957,854 mailed Oct. 15, 2008.
U.S. Non-Final Office Action cited in U.S. Appl. No. 10/957,854 mailed Apr. 30, 2008.
U.S. Final Office Action cited in U.S. Appl. No. 10/957,942 mailed Jul. 28, 2009.
U.S. Non-Final Office Action cited in U.S. Appl. No. 10/957,942 mailed Jan. 14, 2009.
U.S. Final Office Action cited in U.S. Appl. No. 10/957,942 mailed Jul. 31, 2008.
U.S. Non-Final Office Action cited in U.S. Appl. No. 10/957,942 mailed May 1, 2008.
U.S. Non-Final Office Action cited in U.S. Appl. No. 10/981,053 mailed Apr. 15, 2009.
U.S. Final Office Action cited in U.S. Appl. No. 10/981,053 mailed Aug. 6, 2008.
U.S. Non-Final Office Action cited in U.S. Appl. No. 10/891,053 mailed Jan. 2, 2008.
U.S. Final Office Action cited in U.S. Appl. No. 10/994,599 mailed Dec. 1, 2006.
U.S. Non-Final Office Action cited in U.S. Appl. No. 10/994,599 mailed May 16, 2006.
U.S. Final Office Action cited in U.S. Appl. No. 10/994,599 mailed Jan. 26, 2006.
U.S. Non-Final Office Action cited in U.S. Appl. No. 10/994,599 mailed Aug. 23, 2005.
U.S. Non-Final Office Action cited in U.S. Appl. No. 11/162,345 mailed Aug. 21, 2009.
U.S. Final Office Action cited in U.S. Appl. No. 11/162,345 mailed Mar. 9, 2009.
U.S. Non-Final Office Action cited in U.S. Appl. No. 11/162,345 mailed Oct. 31, 2008.
U.S. Non-Final Office Action cited in U.S. Appl. No. 11/170,348 mailed Sep. 30, 2009.
U.S. Final Office Action cited in U.S. Appl. No. 11/170,348 mailed May 28, 2009.
U.S. Non-Final Office Action cited in U.S. Appl. No. 11/170,348 mailed Dec. 11, 2008.
U.S. Final Office Action cited in U.S. Appl. No. 11/208,387 mailed Dec. 22, 2008.
U.S. Non-Final Office Action cited in U.S. Appl. No. 11/208,387 mailed Jun. 12, 2008.
U.S. Final Office Action cited in U.S. Appl. No. 11/244,621 mailed Sep. 17, 2009.
U.S. Non-Final Office Action cited in U.S. Appl. No. 11/244,621 mailed Mar. 19, 2009.
U.S. Non-Final Office Action cited in U.S. Appl. No. 11/244,621 mailed Sep. 19, 2008.
U.S. Non-Final Office Action cited in U.S. Appl. No. 11/275,245 mailed Oct. 22, 2009.
U.S. Final Office Action cited in U.S. Appl. No. 11/275,245 mailed Jul. 29, 2009.
U.S. Non-Final Office Action cited in U.S. Appl. No. 11/275,245 mailed Sep. 22, 2008.
U.S. Non-Final Office Action cited in U.S. Appl. No. 11/460,516 mailed Jun. 26, 2009.
U.S. Final Office Action cited in U.S. Appl. No. 11/460,516 mailed Feb. 13, 2009.
U.S. Non-Final Office Action cited in U.S. Appl. No. 11/460,516 mailed Sep. 17, 2008.
U.S. Non-Final Office Action cited in U.S. Appl. No. 11/496,303 mailed Sep. 29, 2009.
U.S. Final Office Action cited in U.S. Appl. No. 11/496,303 mailed Apr. 1, 2009.
U.S. Non-Final Office Action cited in U.S. Appl. No. 11/496,303 mailed Sep. 18, 2008.
U.S. Final Office Action cited in U.S. Appl. No. 11/564,431 mailed Jan. 4, 2010.
U.S. Non-Final Office Action cited in U.S. Appl. No. 11/564,431 mailed Aug. 24, 2009.
U.S. Non-Final Office Action cited in U.S. Appl. No. 11/678,653 mailed Dec. 16, 2009.
U.S. Final Office Action cited in U.S. Appl. No. 12/127,968 mailed Dec. 1, 2009.
U.S. Non-Final Office Action cited in U.S. Appl. No. 12/127,968 mailed Apr. 30, 2009.
U.S. Non-Final Office Action cited in U.S. Appl. No. 12/179,752 mailed Dec. 23, 2009.
U.S. Non-Final Office Action cited in U.S. Appl. No. 12/372,887 mailed Oct. 16, 2009.
U.S. Non-Final Office Action cited in U.S. Appl. No. 12/372,894 mailed Oct. 27, 2009.
U.S. Non-Final Office Action cited in U.S. Appl. No. 12/372,917 mailed Oct. 26, 2009.
U.S. Non-Final Office Action cited in U.S. Appl. No. 12/388,139 mailed Dec. 15, 2009.
U.S. Non-Final Office Action cited in U.S. Appl. No. 12/389,564 mailed Nov. 10, 2009.
U.S. Non-Final Office Action cited in U.S. Appl. No. 12/413,686 mailed Nov. 30, 2009.
U.S. Appl. No. 09/330,792, filed Jun. 11, 1999, entitled "Series Reminders and Series Recording from an Interactive Television program Guide".
U.S. Appl. No. 09/378,533, filed Aug. 20, 1999, entitled "Electronic Program Guide with Advance Notification".
U.S. Appl. No. 09/518,041, filed Mar. 2, 2000, entitled "Apparatus and Method for Providing a Plurality of Interactive Program Guide Initial Arrangements".

U.S. Appl. No. 09/542,484, filed Apr. 3, 2000, entitled "System for Providing Alternative Services".
U.S. Appl. No. 09/590,434, filed Jun. 9, 2000, entitled "Video Promotional and Advertising Systems for Video on Demand System".
U.S. Appl. No. 09/590,488, filed Jun. 9, 2000, entitled "User Interface Navigational System with Parental Control for Video on Demand System".
U.S. Appl. No. 09/590,521, filed Jun. 9, 2000, entitled "Systems and Methods for Adaptive Scheduling and Dynamic Bandwidth Resource Allocation Management in a Digital Broadband Delivery System".
U.S. Appl. No. 09/590,904, filed Jun. 9, 2000, entitled "Program Information Searching System for Interactive Program Guide".
U.S. Appl. No. 09/591,356, filed Jun. 9, 2000, entitled "Future Program Options Menu System for Interactive Program Guide".
U.S. Appl. No. 09/692,920, filed Oct. 20, 2000, entitled "Media-on-Demand Title Indexing System".
U.S. Appl. No. 09/692,995, filed Oct. 20, 2000, entitled "Media-on-Demand Bookmark System".
U.S. Appl. No. 09/693,115, filed Oct. 20, 2000, entitled "Media Services Window Configuration System".
U.S. Appl. No. 09/693,288, filed Oct. 20, 2000, entitled "Media-on-Demand Rental Duration Management System".
U.S. Appl. No. 09/693,790, filed Oct. 20, 2000, entitled "Integrated Searching System for Interactive Media Guide".
U.S. Appl. No. 09/565,931, filed May 4, 2000, entitled "Navigation Paradigm for Access to Television Services".
U.S. Restriction Requirement cited in U.S. Appl. No. 11/162,345 mailed Jul. 3, 2008.
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).
Alberico, G. et al., "Satellite Interactive Multimedia: A New Opportunity for Broadcasters," *International Broadcasting Convention*, Conference Publication No. 447, pp. 18-23 (Sep. 12-16, 1997).
European Examination Report cited in Application No. 00 938 251.6 mailed Mar. 2, 2010.
European Examination Report cited in Application No. 01 937 209.3 mailed Mar. 16, 2010.
Japanese Office Action cited in Application No. 2001-581527 mailed Feb. 10, 2010.
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, pp. 91-97, XP010124402 ISBN: 978-0-7803-2076-5.
Rottentomatoes web archived site, http://web.archive.org/web/20000301122211/http://rottentomatoes.com, Mar. 1, 2000, pp. 1-2.
Supplementary European Search Report cited in European Application No. 02744705.1 mailed Feb. 19, 2010.
U.S. Non-Final Office Action cited in U.S. Appl. No. 10/761,777 mailed Jan. 21, 2010.
U.S. Final Office Action cited in U.S. Appl. No. 11/162,345 mailed Mar. 16, 2010.
U.S. Final Office Action cited in U.S. Appl. No. 11/170,348 mailed Feb. 1, 2010.
U.S. Non-Final Office Action cited in U.S. Appl. No. 11/244,621 mailed Feb. 5, 2010.
U.S. Final Office Action cited in U.S. Appl. No. 11/460,516 mailed Mar. 18, 2010.
U.S. Non-Final Office Action cited in U.S. Appl. No. 11/496,303 mailed Mar. 2, 2010.
U.S. Non-Final Office Action cited in U.S. Appl. No. 12/127,968 mailed Mar. 31, 2010.
U.S. Non-Final Office Action cited in U.S. Appl. No. 12/179,767 mailed Jan. 22, 2010.
U.S. Non-Final Office Action cited in U.S. Appl. No. 11/238,369 mailed Mar. 30, 2010.
U.S. Final Office Action cited in U.S. Appl. No. 10/957,854 mailed Apr. 1, 2010.
Canadian Office Action cited in Application No. 2,402,088 mailed Jun. 1, 2010.
Canadian Office Action cited in Application No. 2,405,491 mailed Jun. 9, 2010.
Summons to attend oral proceedings pursuant to Rule 115(1) EPC in European Application No. 02737593.0-1241 mailed May 28, 2010.
U.S. Non-Final Office Action cited in U.S. Appl. No. 09/693,288 mailed Jun. 21, 2010.
U.S. Final Office Action cited in U.S. Appl. No. 10/761,777 mailed Aug. 2, 2010.
U.S. Non-Final Office Action cited in U.S. Appl. No. 10/957,942 mailed Jun. 30, 2010.
U.S. Final Office Action cited in U.S. Appl. No. 11/496,303 mailed Jul. 22, 2010.
U.S. Non-Final Office Action cited in U.S. Appl. No. 11/564,431 mailed Jul. 20, 2010.
U.S. Final Office Action cited in U.S. Appl. No. 11/678,653 mailed Jun. 23, 2010.
U.S. Non-Final Office Action cited in U.S. Appl. No. 11/963,942 mailed Jun. 8, 2010.
U.S. Non-Final Office Action cited in U.S. Appl. No. 11/963,945 mailed Jul. 16, 2010.
U.S. Non-Final Office Action cited in U.S. Appl. No. 12/180,416 mailed Jun. 25, 2010.
U.S. Final Office Action cited in U.S. Appl. No. 12/388,139 mailed Jul. 6, 2010.
U.S. Non-Final Office Action cited in U.S. Appl. No. 12/389,128 mailed Jun. 2, 2010.
U.S. Final Office Action cited in U.S. Appl. No. 12/413,686 mailed Jun. 10, 2010.
Canadian Office Action cited in Application No. 2,408,289 mailed Sep. 2, 2010.
Canadian Office Action cited in Application No. 2,451,477 mailed Oct. 20, 2010.
U.S. Non-Final Office Action cited in U.S. Appl. No. 10/740,138 mailed Oct. 27, 2010.
U.S. Non-Final Office Action cited in U.S. Appl. No. 11/170,348 mailed Oct. 26, 2010.
U.S. Non-Final Office Action cited in U.S. Appl. No. 12/390,418 mailed Sep. 28, 2010.
U.S. Non-Final Office Action cited in U.S. Appl. No. 12/390,420 mailed Oct. 19, 2010.
U.S. Non-Final Office Action cited in U.S. Appl. No. 12/390,422 mailed Oct. 20, 2010.
U.S. Non-Final Office Action cited in U.S. Appl. No. 10/934,253 mailed Nov. 4, 2010.
U.S. Non-Final Office Action cited in U.S. Appl. No. 11/234,967 mailed Sep. 10, 2010.
U.S. Final Office Action cited in U.S. Appl. No. 11/238,369 mailed Aug. 31, 2010.
U.S. Final Office Action cited in U.S. Appl. No. 11/244,621 mailed Aug. 18, 2010.
U.S. Non-Final Office Action cited in U.S. Appl. No. 11/963,951 mailed Aug. 2, 2010.
U.S. Final Office Action cited in U.S. Appl. No. 12/127,968 mailed Sep. 14, 2010.
U.S. Final Office Action cited in U.S. Appl. No. 12/179,767 mailed Aug. 20, 2010.
U.S. Non-Final Office Action cited in U.S. Appl. No. 12/388,002 mailed Sep. 3, 2010.
U.S. Non-Final Office Action cited in U.S. Appl. No. 12/389,564 mailed Aug. 23, 2010.
Canadian Office Action cited in Application No. 2,554,208 mailed Apr. 1, 2010.
U.S. Non-Final Office Action cited in U.S. Appl. No. 10/934,253 mailed Apr. 27, 2010.
U.S. Non-Final Office Action cited in U.S. Appl. No. 11/275,245 mailed May 5, 2010.
U.S. Final Office Action cited in U.S. Appl. No. 12/372,887 mailed Apr. 14, 2010.

U.S. Final Office Action cited in U.S. Appl. No. 12/372,917 mailed May 17, 2010.
U.S. Final Office Action cited in U.S. Appl. No. 12/389,564 mailed Apr. 28, 2010.
U.S. Final Office Action cited in U.S. Appl. No. 09/896,231 mailed May 28, 2010.
Canadian Office Action cited in Application No. 2,456,318 mailed Nov. 17, 2010, 4 pages.
U.S. Non-Final Office Action cited in U.S. Appl. No. 12/179,763 mailed Jan. 4, 2011, 18 pages.
U.S. Final Office Action cited in U.S. Appl. No. 12/389,128 mailed Nov. 9, 2010, 50 pages.
U.S. Non-Final Office Action cited in U.S. Appl. No. 12/389,564 mailed Jan. 21, 2011, 13 pages.
U.S. Non-Final Office Action cited in U.S. Appl. No. 11/162,345 mailed Feb. 1, 2011, 33 pages.
U.S. Final Office Action cited in U.S. Appl. No. 09/693,288 mailed Feb. 8, 2011, 28 pages.
Canadian Office Action cited in Application No. 2,459,334 mailed Mar. 4, 2011, 3 pages.
Summons to attend oral proceedings in EP Application No. 01937209.3 mailed Mar. 21, 2011, 7 pages.
U.S. Non-Final Office Action cited in U.S. Appl. No. 12/413,686 mailed Mar. 17, 2011, 20 pages.
U.S. Non-Final Office Action cited in U.S. Appl. No. 10/761,777 mailed Apr. 12, 2011, 20 pages.

* cited by examiner

METHODS IN A MEDIA SERVICE SYSTEM FOR TRANSACTION PROCESSING

CROSS-REFERENCE TO RELATED APPLICATION

This application claims priority to U.S. provisional application Ser. No. 60/214,987, filed Jun. 29, 2000, which is entirely incorporated herein by reference.

TECHNICAL FIELD

The present invention is generally related to television systems, and, more particularly, to the field of transaction options.

BACKGROUND OF THE INVENTION

Media service systems have awakened, through advancements in transmission and communications technology, to provide subscribers with a plethora of media content never before possible. Along with the advent of a distribution of a wide variety of media content, comes a wide range of choices for the subscriber. Many advanced media service systems provide a programming guide to allow the subscriber to acquire information about the subscriber's media content choices.

A typical media service system involves a central headend unit distributing a plurality of instances of media content over a transmission system, usually a cable or satellite network, to a multitude of client devices, such as a settop, as one example among others. Each client device contains the necessary hardware and software to interpret a transmission from the network and provide that transmission to be presented by a presentation device, such as a television, among other examples. The client device is also enabled to accept commands from the subscriber regarding the display of certain choices of media content. Certain choices by the subscriber require the client device to communicate with the central headend to request desired services.

One type of media content choice by a subscriber involves renting a movie presentation. Many media service systems will allow a subscriber to rent a movie presentation to be displayed at a time provided by the system. The subscriber will view information concerning a desired movie and then proceed to enter a buy sequence. The buy sequence usually begins when the subscriber indicates a desire to purchase a particular movie. Next, the client device will enter a process by which the purchase is validated and confirmed. In this process, the client device will usually require the subscriber to confirm the purchase and enter authentication information, such as a Personal Identification Number (PIN). The client device may thus require the subscriber to complete multiple confirmations to confirm that the movie presentation purchase is truly desired before the purchase will be executed.

Although there may be a wide variety of various types of media content available, the buy sequence for different types of media content most often remains the same. Not only does the media content vary greatly, but the characteristics and desires of the subscribers using the system varies by an even greater degree. Despite the wide range of variances in types of product, people, and purchases, the sequence required to buy media content remains unadaptable.

Thus, a heretofore unaddressed need exists in the industry to address the aforementioned deficiencies and inadequacies.

SUMMARY OF THE INVENTION

In one embodiment of the present invention, a media service system provides at least one transaction configuration option that is enabled to be selected by a user. The media service system implements a transaction process in response to a user selection.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The accompanying drawings, incorporated in and forming a part of the specification, illustrate several aspects of the preferred embodiments of the present invention, and together with the description serve to explain the principles of the preferred embodiments of the invention. The components in the drawings are not necessarily to scale, emphasis instead being placed upon clearly illustrating the principles of the preferred embodiments of the present invention. Moreover, in the drawings, like reference numerals designate corresponding parts throughout the several views. The reference numbers in the drawings have at least three digits with the two rightmost digits being reference numbers within a figure. The digits to the left of those digits are the number of the figure in which the item identified by the reference number first appears. For example, an item with reference number 209 first appears in FIG. 2. In the drawings.

DETAILED DESCRIPTION OF THE PREFERRED EMBODIMENT

Figure 1:
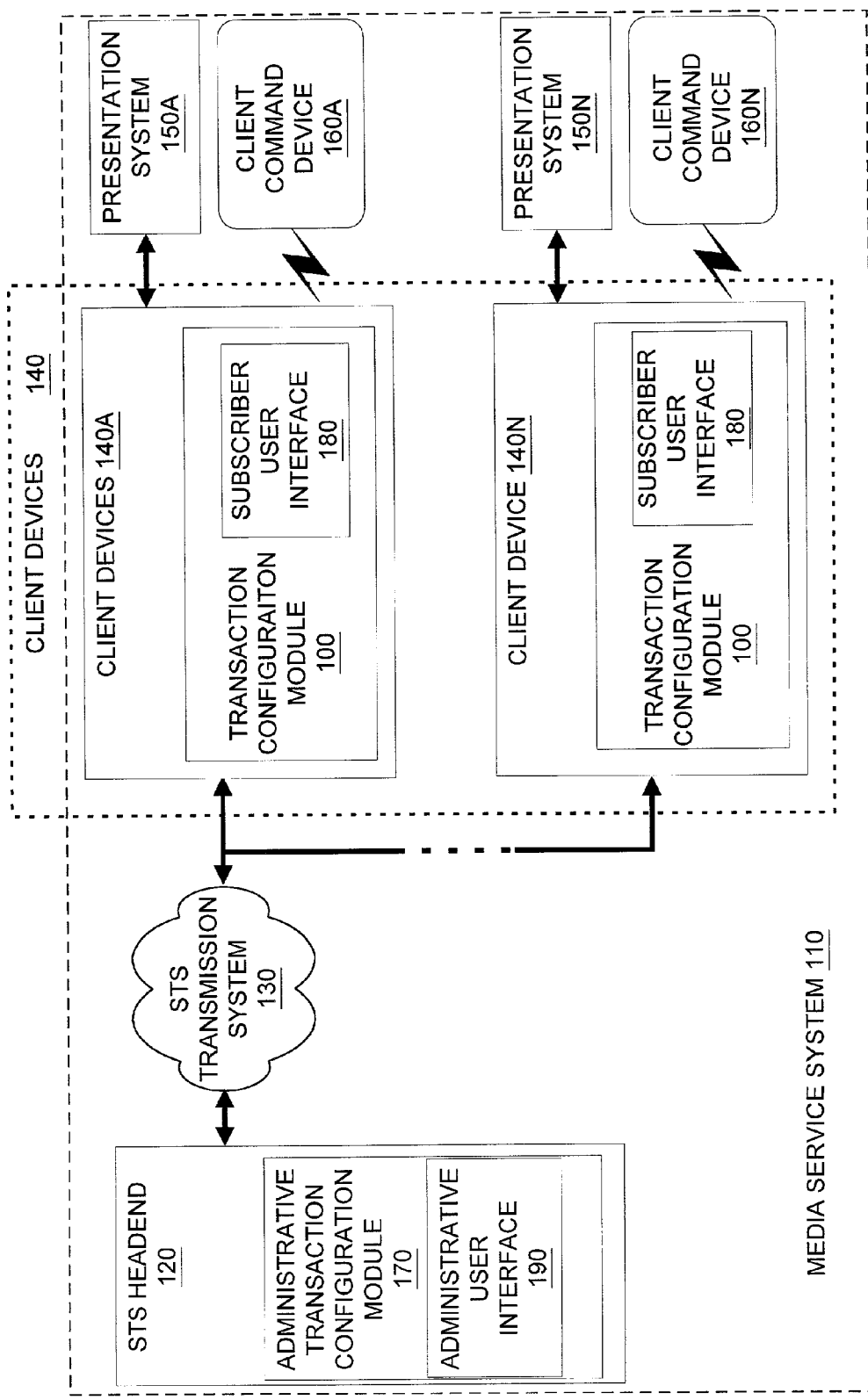
FIG. 1 is a block diagram of a high level view of the architecture of the media service system in accordance with one preferred embodiment of the present invention.

The preferred embodiment of the present invention provides transaction configuration options to the users of a media service system. An option will be understood to include an element, which will provide a certain feature when selected. In a non-limiting example, this feature could provide a benefit to the users of the system or method described herein. A transaction will be understood to mean the action that takes place during the purchase of an item or a sequence of actions that take place during the purchase of an item. A transaction configuration option is an option that determines the action or sequence of actions that take place during the purchase of an item. A transaction process is understood to mean a process that transpires prior to the consummation of a purchase and that is instantiated by a user exercising a step or set of steps comprised in one or many transaction configuration options that were selected to determine the action or actions that take place during the purchase of an item. A user is understood to be anyone who utilizes the system or method described herein and can be, in accordance with various embodiments, an administrator or a subscriber. An administrator is typically one who controls the system or method described herein, such as, for example, a system operator located at a system headend. A subscriber is typically a customer or local user of a client device in the system or method described herein. Selections are indications of choices made by a user. A purchase refers to the act of buying an item, such as, for example, an entity, media content, or event, the act of renting an item for a period, and/or the act of gaining the right to view an item for a period of time. The term media is used synonymously with the term media content and is herein used to describe any type of entertainment, news, event, etc. that can be presented to a person.

Reference will now be made in detail to the description of the preferred embodiments of the invention as illustrated in the drawings. While the various embodiments of the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims. All examples, embodiments, implementations, etc., are understood to be non-limiting and among others.

FIG. 1 depicts the general architecture of a media service system 110 in which a subscriber television system (STS) headend 120 provides media content over an STS transmission system 130 to numerous client devices 140. Each client device, such as client device 140A, interprets information received from the STS headend 120 via the STS transmission system 130 such that it can be provided to the presentation system 150A and then presented to the subscriber. The client command device 160A enables the subscriber to provide commands to the client device 140A. With the client command device 160A, the subscriber can enter input to effect the presentation that is to be displayed on the presentation system 150A.

The presentation system 150A can be any system that enables a user to experience a session provided by the client device 140A. The presentation system 150A can be, for example but not limited to, a television, a computer monitor, a projection unit, or a simulator providing visual and audible stimulation. The presentation system 150A processes information from the client device 140A. The presentation system 150A processes the information such that it can be viewed, heard or otherwise presented to the senses of the user. The user is able to perceive the information in the subscriber user interface 180 through the use of the presentation system 150A. Furthermore, the user can effect the information in the subscriber user interface 180 to be presented by the presentation system 150A by entering input with the client command device 160A. The user is able to give commands to client device 140A to interact with the transaction configuration module 100 with a client command device 160A. The client command device 160A can be any entity that relays user input to the client device 140A. Examples of the client command device 160A include, among others, a remote control, a wired or wireless keyboard, a mouse, and a voice command device. The commands given by the client command device 160A dictate, among other things, the execution of certain actions within the subscriber user interface 180. With the use of the client command device 160A and the presentation system 150A, the user can experience and interact with the subscriber user interface 180. In an alternate embodiment of the system depicted in FIG. 1, the client device 140A and the presentation system 150A can be implemented in the same device. In addition, the client command device 160A could be incorporated into an entity containing the client device 140A and/or the presentation system 150A.

The client command device 160A preferably allows the subscriber to utilize the functionality of the client device 140A. Using the client command device 160A, the subscriber can, among other things, navigate and scroll through media content guides and make selections. The media service system 110 enables the subscriber to interact with the system with regard to particular services. The media service system 110 provides programming that is accessible with interactive user inputs such as, for example but not limited to, broadcast pay-per view programming, and broadcast near video on demand (NVOD). Furthermore, the media service system 110 provides on demand programming that is also accessible with interactive user input such as, for example but not limited to, video on demand (VOD), internet applications, and/or interactive media guides (IMG). The subscriber may navigate different guides, information, and programs in a subscriber user interface 180 to gain information and to learn about available items. If the subscriber discovers an item of interest that requires or allows a purchase, then that subscriber may enter and complete a transaction for purchasing the item of interest. This transaction may involve one or more steps, execution of which is required to complete the purchase of the item desired.

With access to varied applications, including access to the internet, it is possible for a subscriber to complete purchases for many kinds of goods and services in addition to media content services. The discussion herein shall focus upon transactions for media content purchases, but the scope of the present invention is not limited thereto and extends to virtually all types of purchases.

In one embodiment of the current invention, the transaction configuration module 100 is enabled to configure transaction processes. The term "user" is used herein with reference to this embodiment to refer to administrators of the media service system 110, as well as subscribers of the media service system 110, and the configuration can be performed by either. The transaction configuration options module 100 is illustrated in FIG. 1 as an entity within client device 140A. It should be clear to one of ordinary skill in the art that the transaction configuration options module 100 could be implemented in various ways. Examples include, among others, an independent unit, a logic module within the client command device 160A, a software logic module within the STS headend 120, a module within the STS transmission system 130, or a logic module within any device in the media service system 110. Furthermore, a distributive transaction configuration module 100 could be implemented in various ways such as, for example but not limited to, part in the STS headend 120 and part in the client device 140A.

In one embodiment of the present invention, the administrator, or system operator, of the media service system 110 can determine what types of transaction options are provided to the subscriber by controlling the media service system 110 through the administrative transaction configuration module 170. In one implementation of this embodiment, the administrative user interface 170 provides the administrator with an interface from which the administrator can select transaction configuration options that configure the set of transaction configuration options that are available to the subscriber through the transaction configuration module 100. A transaction configuration option can constitute the inclusion of a step or steps in the sequence of steps required by a transaction process. Likewise, a transaction configuration option can constitute an omission of a step or steps in the sequence of steps required by a transaction process. In one implementation, as shall be described in greater detail below, the administrator can define certain transaction configuration options to be available to designated regions of the network and even to a particular one of the client devices 140.

In one implementation of this embodiment, the subscriber is able to access the transaction configuration module 100 through the subscriber user interface 180. Using the subscriber user interface 180, the subscriber may also determine the manner in which a transaction is completed for one or more future purchases. In one embodiment, the subscriber may enter selections with the client command device 160A of certain transaction configuration options made available by the administrator. By choosing among the options made available to that particular client device by the administrator, the subscriber determines the transaction process. In one embodiment, the transaction configuration module 100 creates a specified transaction process by implementing the options selected by the subscriber. In this manner, when a particular subscriber requests a certain type of item, then that subscriber will be required to complete the specified transaction process in order to purchase the chosen item.

In an example implementation, a global set of transaction configuration options could be provided by the administrative transaction configuration module 170 to the administrator. The administrator could select a subset of transaction configuration options, herein with reference to this implementation referred to as a client set, from among the global set of transaction configuration options. Thus, enabling only those transaction configurations options in the client set to be presented to the subscriber. Thereby, the subscriber could be provided with the client set of transaction configuration options by the transaction configuration module 100. The subscriber could then select the desired transaction configuration options. In addition, the subscriber can select to omit undesired transaction configuration options. Those options selected by the subscriber would be implemented as a transaction process. Therefore, the steps involved in the transaction process thereafter could be determined by the transaction configuration options selected by the subscriber. In a non-limiting example, this transaction process would then be executed by the client device 140A whenever the subscriber indicates a desire to purchase an item. In another non-limiting example, this transaction process might be associated with a particular type of purchasable item, such as a movie. In this example implementation, the subscriber would be required to complete the steps of this movie transaction process to complete a movie purchase.

In one embodiment of the invention, the administrator pre-configures a plurality of transaction processes, each transaction process comprising a respective set of steps required to be conducted during a purchase by the subscriber. Alternatively, the administrator can select a subset of transaction processes from a global set provided by the administrative transaction configuration module 170. Thereby, the subscriber selects one from a plurality of pre-configured transaction processes to be implemented as a transaction process for future transaction purchases.

In an alternate embodiment, the subscriber is allowed to deselect respective steps in a subscriber-selected pre-configured transaction process. Certain steps of a pre-configured transaction process may be de-selectable while others may not.

A first transaction process, be it either a subscriber-selected pre-configured transaction process or a subscriber-configured transaction process, may be configured to be associated with a first type of media content service. Thereafter, the first transaction process becomes active only during the purchase of a first type of media content service. A second transaction process may be configured to be associated with a second type of media content service and thus becomes active only during the purchase of a second type of media content service. A third transaction process may be configured to be associated with a plurality of types of media content services and thus becomes active only during the purchase of any of the respective types of media content services.

In one embodiment, the set of permissible associations between types of media content services and transaction processes that a subscriber can configure is designated a priori by the administrator. The administrator either selects and enables a plurality of types of media content services that can be associated with each respective transaction process, and/or a plurality of transaction processes that can be associated with each respective media content service.

Figure 2:
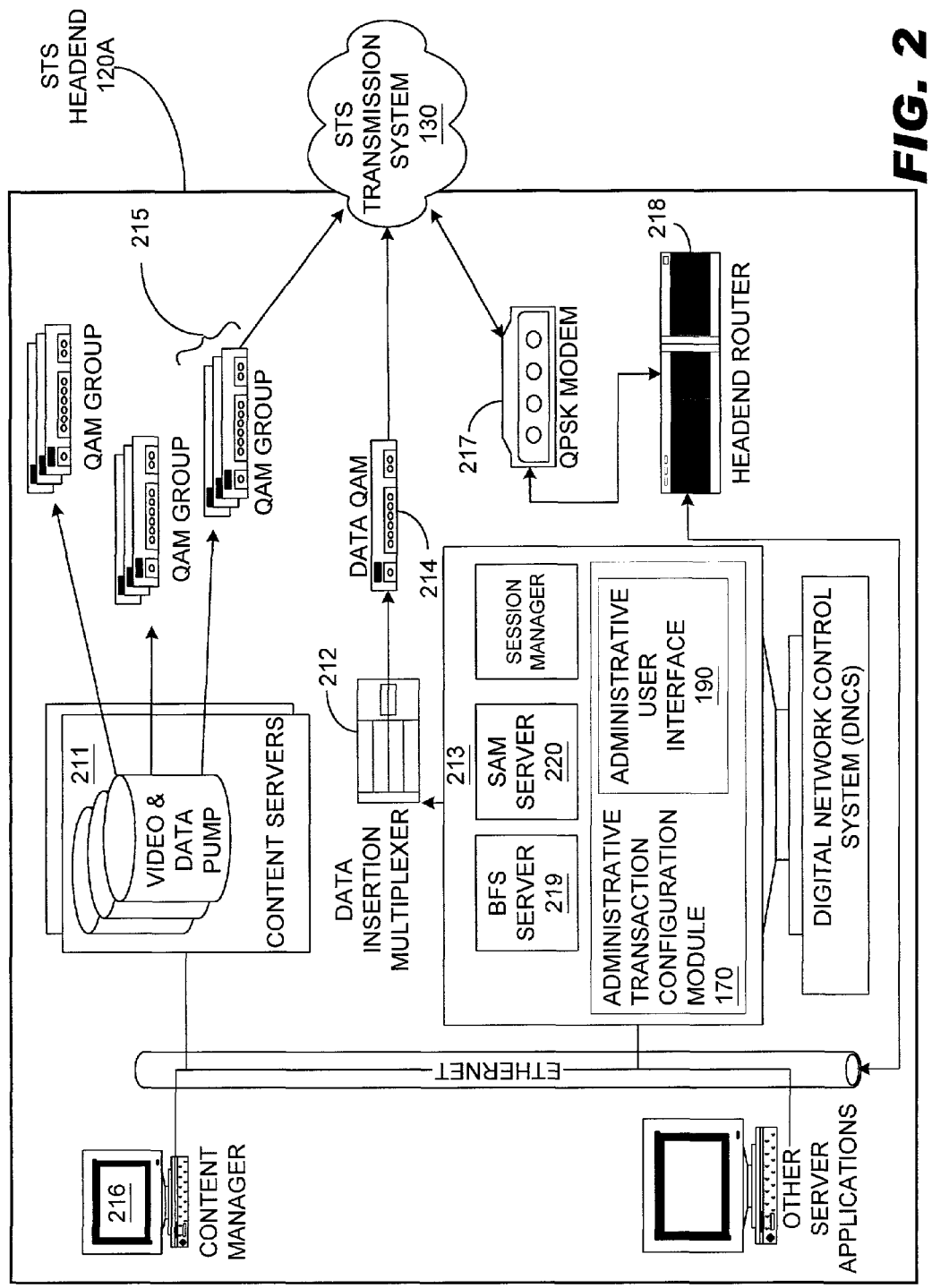
FIG. 2 is a block diagram illustrating the headend of the media service system of FIG. 1 in accordance with one preferred embodiment of the present invention.

FIG. 2 depicts an implementation of the STS headend 120A in accordance with one embodiment of the present invention. STS headend 120A is configured to provide numerous functionalities to the client devices 140 (FIG. 1). One of these functionalities is the media service system 110 (FIG. 1). In a non-limiting example, the media service system 110 (FIG. 1) is controlled from the headend by a computer shown as the digital network control system (DNCS) 213. The DNCS 213 includes an administrative transaction configuration module 170 that is responsible for reserving and configuring system resources needed to provide configuration and service data to the transaction configuration module 100 (FIG. 1). In an alternate implementation, the administrative transaction configuration module 170 exists separate from the DNCS 213.

The DNCS 213 provides complete management, monitoring, and control of the network's elements and broadcast services provided to users. The DNCS 213 controls the content servers 211 that drive the video & data pumps providing on demand media content to the STS transmission system 130 as well as the infrastructure for broadcast media services such as PPV and NVOD. In one implementation, the DNCS 213 uses a data insertion multiplexer 212 and a data QAM 214 to insert in-band broadcast file system (BFS) data in to a MPEG-2 transport stream that is broadcast over the STS transmission system 130 to the client devices 140 (FIG. 1). The content servers 211 house the video & data pumps which supply media content to the client devices 140 (FIG. 1) through the QAM group 215. The QPSK modem 217 can be utilized to transport the out-of-band datagram traffic between the STS headend 120A and the client devices 140 (FIG. 1). Through the use of the control and management devices in the STS headend 120A, an administrator can control the services provided by the system and more specifically the media service system 110 (FIG. 1).

Figure 3:
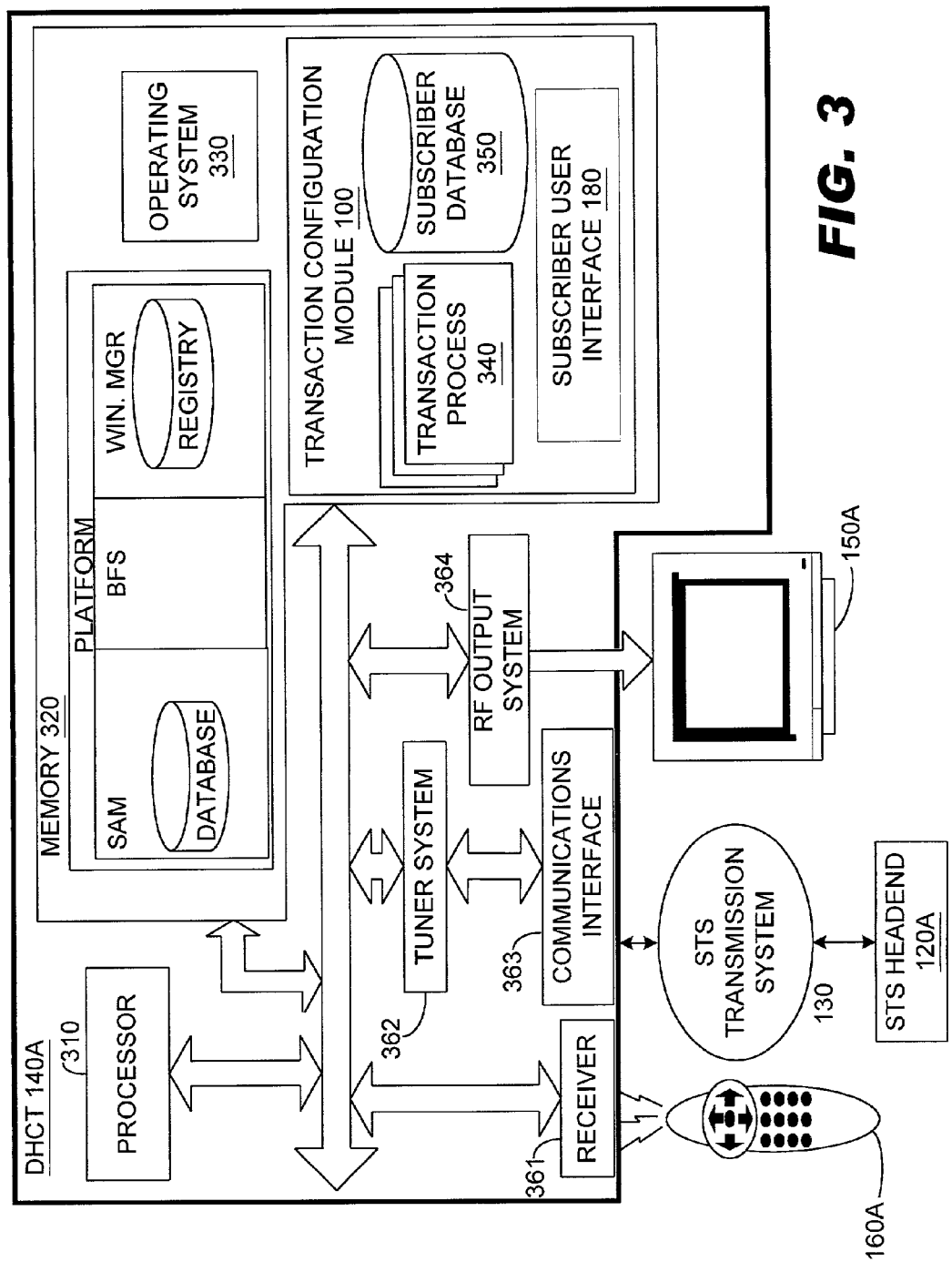
FIG. 3 is a block diagram illustrating the client device of the media service system of FIG. 1 in accordance with one preferred embodiment of the present invention.

A service application manager (SAM) server 220 is a server component of a client-server pair of components, with the client component being located at the digital home communications terminal (DHCT) 140A (FIG. 3). Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 140A (FIG. 3) as necessary. With the use of SAM Server 220 and the client-server SAM components, a subscriber's DHCT 140A (FIG. 3) is able to access services such as NVOD, VOD, pay-per view, electronic program guides (EPG), digital music, and media on demand (MOD).

Applications on both the STS headend 120A and the DHCT 140A (FIG. 3) can access the data stored in a broadcast file system (BFS) Server 219 in a similar manner to a file system found on operating systems. The BFS server 219 is a part of a broadcast file system that has a counterpart BFS client module in a DHCT 140A (FIG. 3) connected to the STS transmission system 130. The BFS server 219 repeatedly sends data for applications on a data carousel over a period of time in cyclical repeated fashion so that a DHCT 140A (FIG. 3) may read any particular data file or parts thereof, and receive it and store it in memory 320 (FIG. 3). Reception of such data may be a result of a subscriber request or instigated by one or more application or internal processes in DHCT 140A (FIG. 3). Data, such as transaction configuration options and transaction processes, is accessed from memory 320 (FIG. 3) and if necessary converted to a displayable format for inclusion as a part of the subscriber user interface 180 (FIG. 1).

The STS headend 120A depicted in FIG. 2 is merely provided as an example implementation. The STS headend 120A could be implemented in many other ways without many of the components depicted in FIG. 2 and with many more additional components.

FIG. 3 is a diagram depicting an implementation of one of the client devices 140 (FIG. 1) in accordance with one embodiment of the current invention. The device depicted in FIG. 3 is DHCT 140A, a specific implementation of one of the client devices 140 (FIG. 1). The DHCT 140A is typically situated within a residence or business of a user. It may be integrated into a device that has a display unit, such as a television set, or it may be a stand-alone unit that couples to an external display. The DHCT 140A includes a processor 310 for controlling operations of the DHCT 140A, a video output port such as an RF output system 364 for driving the presentation system 150A, and tuner system 362 for tuning into a particular television channel to be displayed for sending and receiving various types of data from the STS headend 120A. The tuner system 362 includes, in one implementation, an out-of-band tuner for bi-directional Quadrature Phase Shift Keying (QPSK) data communication and a Quadrature Amplitude Modulation (QAM) tuner for receiving television signals. Additionally, DHCT 140A includes a receiver for receiving externally generated information, such as user input from a client command device 160A. In this implementation shown in FIG. 3, the client command device 160A is a remote control. Other types of client command devices such as a keyboard, a mouse, or a voice command device may also provide the user inputs. The DHCT 140A may also include one or more wireless or wired communication interfaces, also called ports, for receiving and/or transmitting data to other devices.

Memory 320, such as non-volatile (i.e., SRAM or FLASH memory) and dynamic random access memory (DRAM), is coupled to the processor 310 and stores operation parameters, such as commands that are recognized by the processor 310. The most basic functionality of the DHCT 140A is provided by an operating system 330 that operates in memory 320. One or more programmed software applications, herein referred to as applications, are executed by utilizing the computing resources in the DHCT 140A. The application executable program stored in memory 320 is executed by processor 310 (e.g., a central processing unit or digital signal processor) under the auspices of the operating system 330. Data required as input by the application program is stored in memory 320 and read by processor 310 from memory 320 as need be during the course of application program execution. Input data may be data stored in memory 320 by a secondary application or other source, either internal or external to the DHCT 140A, or may have been created with the application program at the time it was generated as a software application program. Data may be received via any of the communication ports of the DHCT 140A, from the STS headend 120A via the DHCT's network interface (i.e., the QAM or out-of-band tuners) or as user input via receiver 361. In a non-limiting example, data in files that are broadcast from BFS server 219 can be received via the QAM and/or out-of-band tuners. Data generated by an application program is stored in memory 320 by processor 310 during the course of application program execution.

In accordance with the embodiment depicted in FIG. 3, the transaction configuration module 100 is responsible for executing most functionality regarding the implementation of transaction processes for the media service system 110 (FIG. 1) in relation to DHCT 140A. The transaction configuration module 100 is enabled to execute in accordance with the aforementioned interactions with, among other things, the memory 320, the processor 310, and the operating system 330. The requests made by the user via the client command device 160A are interpreted by the receiver 361, stored in memory 320, and assigned to the transaction configuration module 100 by the operating system 330. The transaction configuration module 100 executes, on the processor 310, the commands provided by the user in addition to those received through the communications interface 363 provided by the STS headend 120A. In addition to the received commands, the transaction configuration module 100 can also require that certain application specific stored information be executed by the processor 310. A non-limiting example is illustrated by the transaction process 340 stored as part of the configuration module 100. In one implementation, a transaction process 340 is a transaction process that was implemented by the transaction configuration module 100 based on selections by a subscriber among available transaction configuration options. Thereby, in this implementation the transaction process 340 could be executed in processor 310 in the DHCT 140A when the subscriber requested a purchase to be made. The DHCT 140A would require the subscriber to satisfy the steps of the transaction process 340 to fulfill the purchase. In other embodiments, there are no separate transaction processes and transaction processes proceed as a function of applications, such as, for example, video on demand. The transaction process could be dictated by the STS headend 120 or DHCT 140A as a bit setting in the memory sequence for an application, such as, for example, video on demand. Thereby, the specific transaction process could be, in one implementation, a setting in the memory for the video on demand application to not require a PIN entry. The transaction process could be other than a process as commonly understood, thus the transaction process could simply be a setting in an application.

The subscriber database 350 depicted in FIG. 3 can be utilized to store information relating to the subscribers who use the DHCT 140A. The subscriber database 350 depicted in FIG. 3 comprises of structured data such as a database, table of multiple fields, or data organized in memory 320 for purposes of retaining information pertinent to the transaction configuration module 100. Herein, database will refer to a database, structured data, or other data structures well known to those of ordinary skill in the art. As a non-limiting example, subscriber database 350 includes subscriber personal information, subscriber registration, subscriber-selectable transaction configuration options, subscriber-selectable transaction processes, and subscriber-configured transaction processes, including associations between transaction processes and types of media content services. In one implementation, the subscriber database 350 is a designated area in memory 320 in which the transaction configuration module 100 can direct the information gathered about the subscriber to be stored for future use. In addition, the subscriber database 350 could further be utilized to store information concerning multiple subscribers using the DHCT 140A. In one implementation, the subscriber specific information could be employed for use in conjunction with a subscriber login option. The subscriber login option will be described in detail below.

In an example embodiment, the subscriber database 350 provides a designated area in memory 320 to store information necessary to complete a single execution transaction. A single execution transaction is one in which the user can initiate and complete an entire transaction to purchase an item with one execution. In a non-limiting example, when a subscriber finds a item that the subscriber would like to purchase, the subscriber can do so by executing a single step. Examples of this execution include, among others, a click of a mouse, a keystroke, a depression of a button on a remote, a tap of a touch screen, and a voice command. In one embodiment, the single execution transaction is made possible by accessing pre-stored information that is important in completing a purchase and for billing purposes. In a non-limiting example, the pre-stored information could be the subscriber's name, address, and billing information. In one implementation, this information could be stored in the subscriber database 350 and accessed by the DHCT 140A when a subscriber executes a single execution transaction. Alternatively, such information could also be stored and accessed at the STS headend 120A since the subscriber already has a subscription with the STS headend 120A provider.

The transaction configuration module 100 contains one or more transaction processes configured and activated by one or more subscribers that use DHCT 140A. In one embodiment, each stored transaction process contains information as to which media content service it is associated.

The DHCT 140A depicted in FIG. 3 is merely provided as an example implementation of one of the client devices 140 (FIG. 1). The client devices 140 (FIG. 1) could be implemented in many other ways without many of the components depicted in FIG. 3 and with many more additional components.

Figure 4:
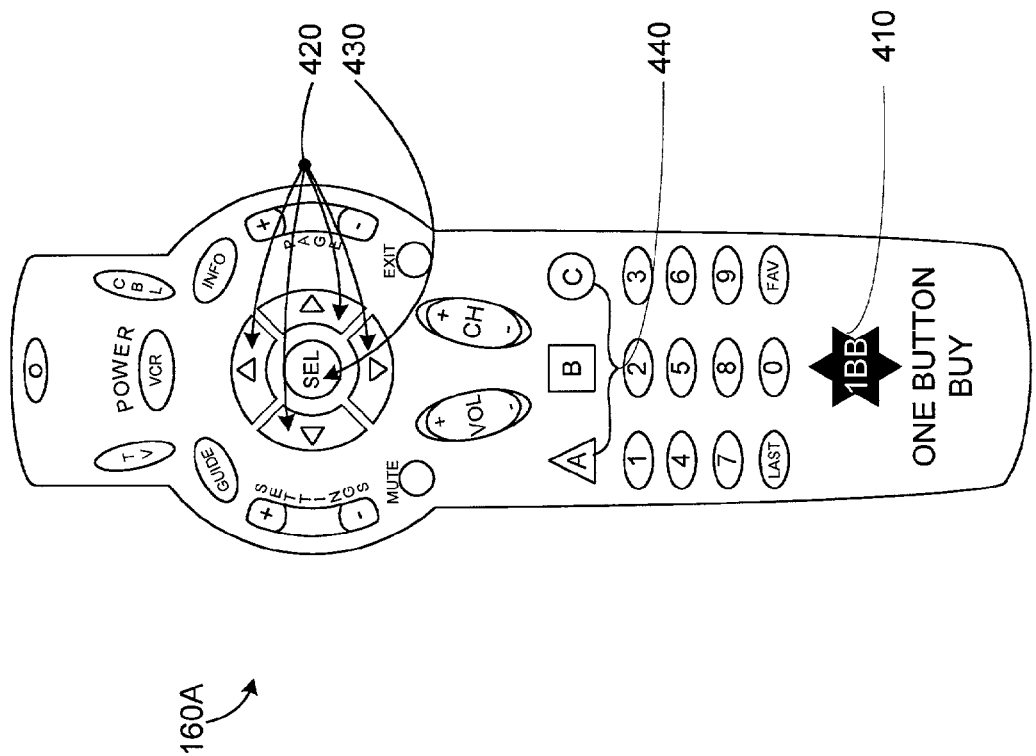
FIG. 4 is a block diagram illustrating the client command device of the media service system of FIG. 1 in accordance with one preferred embodiment of the present invention.

FIG. 4 is a diagram depicting an example of a client command device 160A in accordance with one embodiment of the current invention. Certain keys on the client command device 160A are utilized in many implementations of the subscriber user interface 180 (FIG. 1). In one implementation, the navigation pad 420 allows the subscriber to browse the subscriber user interface 180 (FIG. 1). In a non-limiting example, a free floating arrow, similar to a conventional personal computer mouse pointer, could be displayed and controlled by the navigation pad 420 on the client command device 160A. In another example, the arrows on the navigation pad 420 could enable the subscriber to cycle through selectable elements. In one implementation, pressing the right arrow on the navigation pad 420 causes the next selectable element on the screen to be highlighted or come into focus. When the element is shown as highlighted or in focus, then that element is currently active. In most implementations, the subscriber can perform a function on an element when it is active. In one implementation, when the subscriber strikes the select button 430 key, then the active element is selected. The select button 430 can be used for a variety of functions, examples including, among others, enabling a certain transaction configuration option, disabling a certain transaction configuration option, and maneuvering to different screens in the interface. In addition to the select button 430, there are other keys on the client command device 160A termed function keys 440. The function keys are used, among other things, for performing functions on non-highlighted elements. In one implementation, the "C" button of the function keys 440 can be pressed to exit from a particular screen.

A one button buy 410 key shown on the client command device 160A illustrates one implementation of a special key used in conjunction with the transaction configuration module 100, though not present in all embodiments of the present invention. In an example embodiment, the one button buy 410 could be utilized by the subscriber when completing a single execution transaction. As mentioned above, the single execution transaction allows the user to initiate and complete a desired purchase with one execution. In the implementation depicted in FIG. 4, pressing the one button buy 410 key is the single execution of the single execution transaction. In a non-limiting example, the subscriber could enable single execution transactions through the use of the transaction configuration module 100. Once enabled, the subscriber can search for items to purchase and when a desired item is found, that subscriber can purchase the item simply by pressing the one button buy 410 key. In an alternate implementation, the one button buy 410 key could be enabled under limited circumstances, for example, in association with the purchase of certain items, when a certain user is logged in, or when the price of an item is below a set value.

In alternate embodiment, one button buy 410 is not an actual button but a slide switch on the right or left side of the top view client command device 160A requiring activation with a push towards the front or rear of client command device 160A. This slide switch could be used, among other things, to avoid accidental presses.

In another embodiment, the client command device 160A is implemented without the one button buy 410 key. In a non-limiting example, the client command device 160A could be a standard TV remote control.

In some of the discussion below, reference is made to numerous diagrams depicting screen shots of the subscriber user interface 180 (FIG. 1). These screen shots depict different implementations of the subscriber user interface 180 (FIG. 1). The screen shots do not represent a flow of configuration screens in the subscriber user interface 180 (FIG. 1). The screens displayed are independent implementations unless otherwise stated in the description below, and these screens may be accessed in a variety of ways, examples including, among others, from a general settings menu or from within a particular application. In one implementation, the subscriber could make a selection within a particular application, such as video on demand, to go to a transaction configuration screen.

It should be understood that when the title of a particular subscriber user interface 180 (FIG. 1) screen is referenced, all the elements in the screen or portion of the screen associated with that title are being referenced. One of ordinary skill in the art should recognize that the subscriber user interface 180 (FIG. 1) could be implemented in a variety of different manners instead of or in addition to those shown in the figures.

Figure 5:
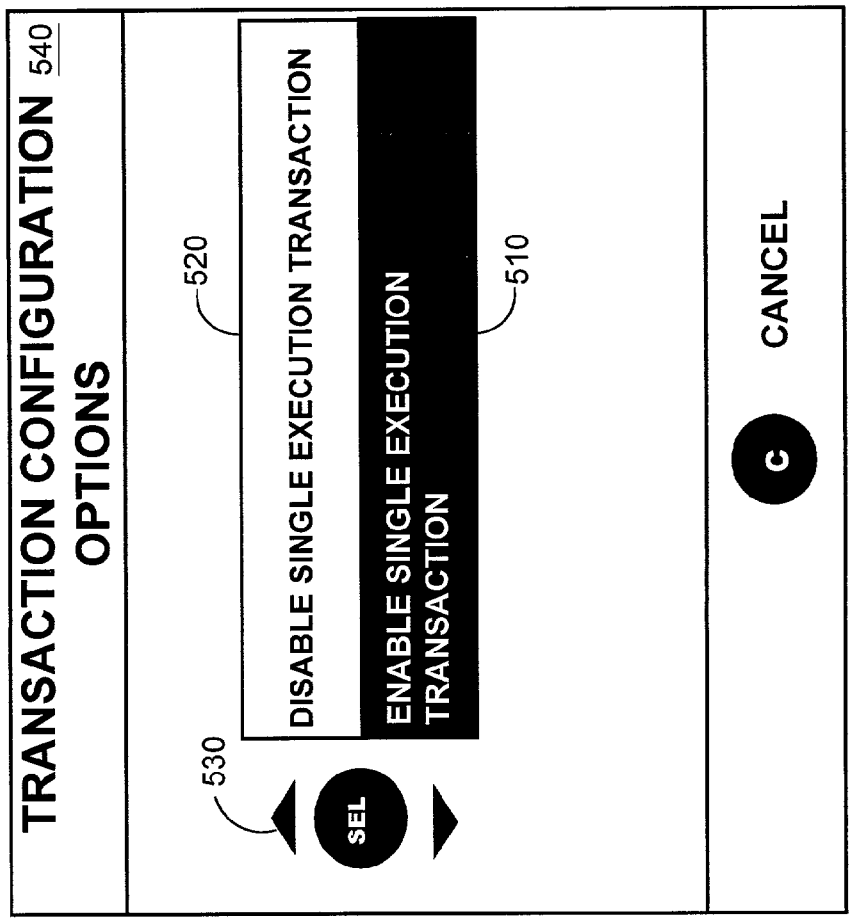
FIG. 5 is a diagram depicting an example of a transaction configuration options screen enabled by the transaction configuration module of FIG. 1 in accordance with one preferred embodiment of the present invention.

FIG. 5 is a diagram of subscriber user interface 180A, an example implementation of subscriber user interface 180 (FIG. 1), depicting a transaction configuration options 540 screen. This implementation illustrates one manner in which the transaction configuration module 100 may be configured. In one implementation, the administrator can allow the subscribers in the system access to only this option. Thereby, the administrator can dictate, preferably through the administrative user interface 190 (FIG. 1), that the transaction configuration module 100 (FIG. 1) enable this screen of the subscriber user interface 180 (FIG. 1) to be displayed when the subscriber accesses the subscriber user interface 180 (FIG. 1), such as via a general settings menu or other path. In an alternate implementation, the screen depicted in FIG. 5 could be one of many presented to a subscriber upon accessing the subscriber user interface 180 (FIG. 1).

The subscriber has two choices in the implementation shown in FIG. 5. The subscriber can use the client command device 160A (FIG. 4) to manipulate the up and down arrows on the navigation pad 420 (FIG. 4) to toggle between the two available selections. If the subscriber highlights the disable single execution transaction 520 option and presses the select button 430 (FIG. 4), then the subscriber will not be able to complete a purchase using a single execution transaction. If the subscriber highlights the enable single execution transaction 510 and presses the select button 430 (FIG. 4), then the subscriber will be able to complete a single execution transaction and thereby initiate and complete an entire purchase simply by executing one step. In FIG. 5, the enable single execution transaction 510 option has been highlighted and selected, thus the subscriber will have the ability to initiate and complete a purchase in a single execution. In a non-limiting example, the subscriber might desire to purchase a NVOD movie. If the enable single execution transaction 510 option has been selected by the subscriber to be implemented as that subscriber's transaction process, then the subscriber would be able to merely press a single button on the client command device 160A (FIG. 1) in order to initiate and complete a NVOD movie purchase. In one implementation, this button could be the one buy button 410 shown in FIG. 4. The transaction process in this implementation involves one execution, the pressing of a button on a remote. It is expressly noted that an execution is an action instigated by a subscriber and should not be confused with an execution by a device. The client device 140A would not prompt the subscriber for any other actions, as it would if the disable single execution transaction 520 option is selected, such as a screen requesting confirmation of the desire to purchase, the entering of a PIN and/or username info, etc. Instead, the process would complete the purchase and would allow access to the desired NVOD movie at the prescribed time.

A single execution transaction could be very advantageous to certain types of customers. The transaction processes of the systems in the prior art could prove quite tedious to a person living in a single adult household. Prior art systems might require an adult living alone to enter an authentication PIN and confirm every purchase. The requirements exist despite the fact that they are likely to be the only subscriber making such requests from the client device 140A (FIG. 1) of that subscriber. In the embodiment of the present invention illustrated in FIG. 5 and described above, the single adult could configure the single adult's client device 140A (FIG. 1) to initiate and complete a purchase based on one execution, a single execution transaction. In the environment of a single adult home, the likelihood of an unauthorized person making such purchases is quite remote. The ease of use for such customers is a great advantage that comes with little or no risk of unauthorized purchases. If any user, however, is unable to control such functionality, the STS headend 120 (FIG. 1) can terminate this functionality.

Figure 6:
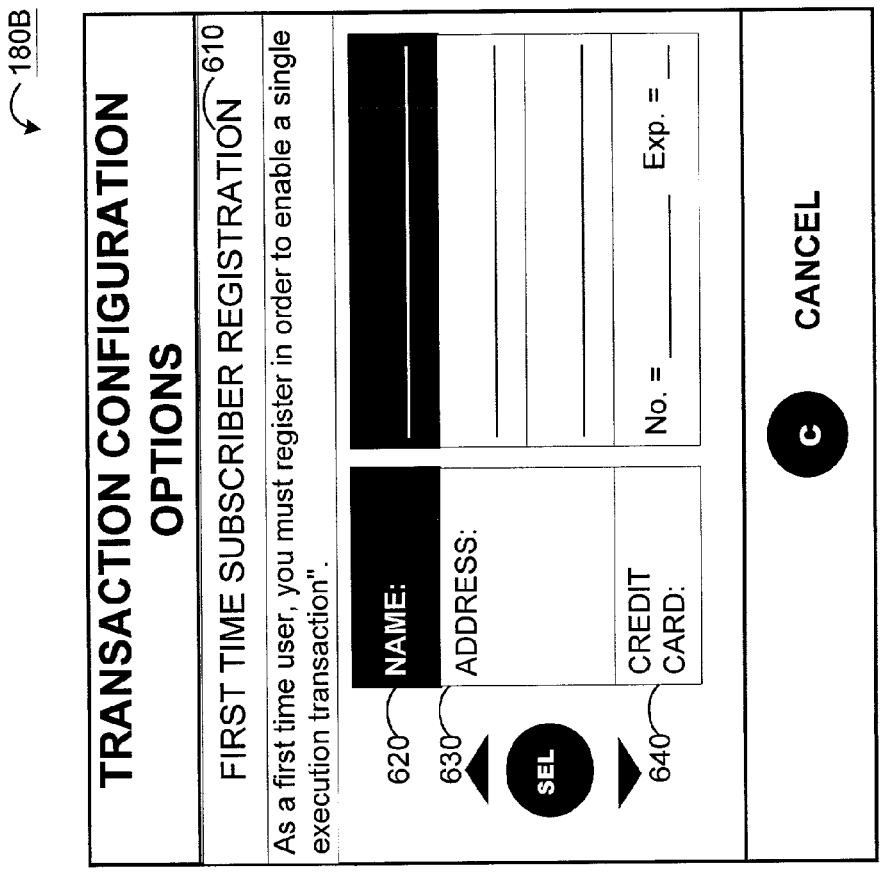
FIG. 6 is a diagram depicting an example of a first time subscriber registration screen enabled by the transaction configuration module of FIG. 1 in accordance with one preferred embodiment of the present invention.

In an alternate embodiment, the screenshot depicted in FIG. 5 could be a transaction configuration options 540 screen for a particular type of item of the various available items. In a non-limiting example, a subscriber might select the enable single execution transaction 510 option for video on demand movies. The same subscriber might select the disable single execution transaction 520 option for pay-per view events. This would allow the subscriber to have quick and easy access to purchases of low cost video on demand movies and more complicated and secure access to purchases of higher cost pay-per view events. Therefore, in this embodiment the selection of enabling or disabling a single execution transaction would be associated with a particular type of media content service, such as, for example, video on demand FIG. 6 is a diagram of subscriber user interface 180B, an example implementation of subscriber user interface 180 (FIG. 1), depicting a first time subscriber registration 610 screen. In one embodiment, this diagram illustrates a screen that would be encountered by a subscriber after the first time that the subscriber selects the enable single execution transaction 510 option in FIG. 5. In order for the media service system 110 to process a request by the subscriber pursuant to one execution, the system might require stored information about the subscriber. In a non-limiting example, if the subscriber orders a movie, then the media service system 110 (FIG. 1) may need to have the name of the subscriber, the subscriber's address, and billing information such as, for example, an account number. The screenshot in FIG. 6 illustrates a first time subscriber registration 610 screen. As denoted in FIG. 6, subscriber user interface 180B is presented the first time a subscriber enables a single execution transaction. The subscriber user interface 180B enables the subscriber to enter subscriber information, such as, for example, a name 620, address 630, and, if applicable, credit card 640. In one implementation, a subscriber is given the choice to bill purchased media services to the account of the subscriber or to charge them to a credit card of the subscriber.

In one implementation, information entered by the subscriber is stored in memory 320 (FIG. 3) and backed up at the STS headend 120 (FIG. 1). The copy stored at the STS headend 120 (FIG. 1) serves to restore the information in the event of power outage to client device 140A (FIG. 1). In an alternate implementation, this information is stored at the client device 140A (FIG. 1) in non-volatile read-write memory, either included as part of memory 320 (FIG. 3) or as separate independent memory, thus allowing for recovery in the event of a power outage. An alternative is presented when the client device 140A (FIG. 1) includes a connected storage device, either internally or externally connected to the client device 140A through a communication or peripheral port, to store information entered by the subscriber. Regardless of where the configuration information resides and where it is backed up, the subscriber data is accessed in some implementations when a single execution transaction is enabled. The subscriber data acquired through the subscriber user interface 180 screen shown in FIG. 6 enables the media service system 110 to initiate and complete a purchase based on a single execution by the subscriber. In a non-limiting example, when the subscriber presses the buy button on the remote after selecting the enable single execution transaction 510 (FIG. 5), the purchase can be completed without requesting any additional input from the subscriber. In one implementation, the subscriber could be required to enter the information via subscriber user interface 180B only one time. Thereby, the subscriber could enable the single execution transaction option without reentering information. The transaction configuration module 100 could pull the necessary information from a record stored elsewhere in memory 320 (FIG. 3), non-volatile memory, or a in a storage device connected to client device 140A (FIG. 1). The subscriber would not have to enter the personal information unless the subscriber desired to update that information. In a non-limiting example, the administrator could implement single execution transactions simply based upon the same information used in providing standard service. Other embodiments include never accessing such information or requiring it to be entered by the subscriber, instead simply applying the purchase to a subscriber record based upon other identification of the subscriber.

Figure 7:
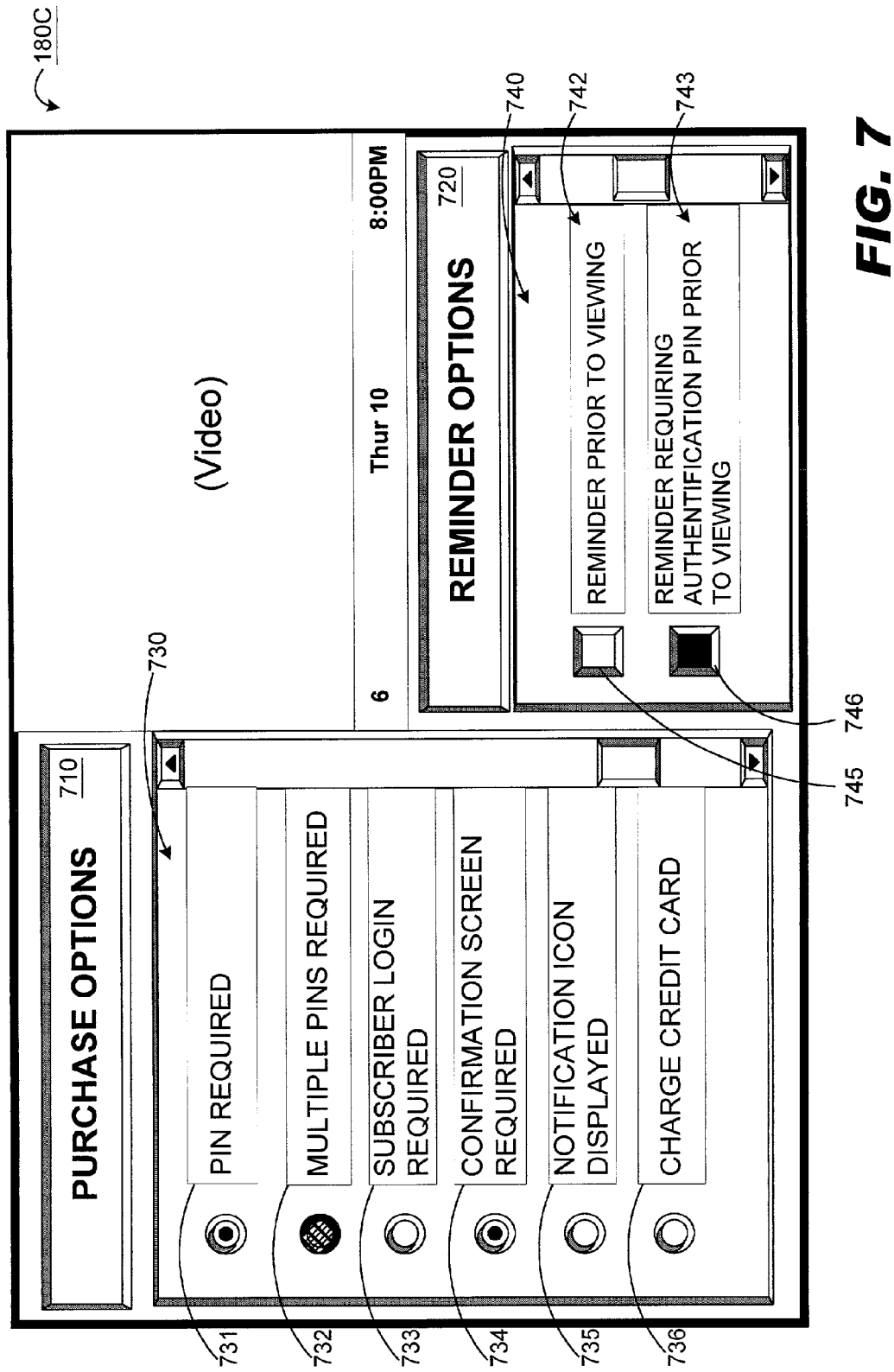
FIG. 7 is a diagram depicting an example of a purchase options and reminder options screen enabled by the transaction configuration module of FIG. 1 in accordance with one preferred embodiment of the present invention.

FIG. 7 is a diagram of subscriber user interface 180C, an example implementation of subscriber user interface 180 (FIG. 1), depicting a purchase options 710 and reminder options 720 screen. This implementation of the subscriber user interface 180C allows the subscriber to choose from among available options under purchase options 710 and options under reminder options 720. After the subscriber chooses the desired options, the transaction configuration module 100 can implement those chosen options to create a transaction process or set of transaction processes.

In one implementation of this embodiment, the administrator can designate in the administrative user interface 190 what options are available to the subscriber, using an interface (not shown) resembling that of FIG. 7, as would be understood by the reasonably skilled. As illustrated in FIG. 7, the purchase options are grouped into a scrolling window 730. The administrator can determine the options that are seen by the subscriber in the scrolling window 730. As will be described further below, the administrator can select from a set of possible options and decide which options are to be made available. The same functions could be performed on the set of reminder options 720 that are made available to the subscriber.

When the subscriber enters the subscriber user interface 180C depicted in FIG. 7, that subscriber may choose those options which best suit the subscriber's desires for a transaction process. The first scrolling window 730 displays the available purchase options 710. In one implementation, the purchase options 710 determine what takes place when a purchase is initially conducted, and the reminder options 720 determine events subsequent to the initial transaction and/or prior to the commencement of the purchased item. As a non-limiting example, reminder options 720 are useful when a subscriber purchases a media content service or item to be received by the subscriber at a future time. The first of the purchase options 710 is the PIN required 731 option. When the PIN required 731 option is selected, the implemented transaction process will include a PIN entry request. This PIN entry request will prompt the subscriber for a secure set of numbers, characters, or combination thereof. In a non-limiting example, the subscriber could request a pizza to be delivered, and the media service system 110 would prompt the subscriber to enter an authentication PIN to ensure that the subscriber is authorized for such activities. If the PIN required 731 option is unselected, then it will not be included in the transaction process implemented by the transaction configuration module 100. This is true for many of the available options in FIG. 7.

In an alternate embodiment, the PIN required 731 option could be specific to a particular subscriber or specific level of authorization. Thereby, the client device 140A (FIG. 1) would keep track of more than one PIN for different subscribers and different levels of authorization. In one implementation, a master PIN could be assigned to an individual subscriber, such as, for example, the head of the household. Another PIN could be a limited PIN assigned to another individual subscriber, such as, for example, the child in the family. Certain purchases could be placed using the limited PIN and certain purchases would required the master PIN. In another example implementation, a PIN could be used, not to authenticate a purchase, but to authenticate a block of a purchase. A blocking PIN could be enabled to block all or certain purchases made by the client device 140A (FIG. 1).

When the subscriber selects the multiple PINs required 732 option, the transaction process will be implemented to include a multiple PIN entry request. Upon making a request for purchase, the subscriber will be required to enter multiple PINs before the transaction process will proceed. Similar to the PIN required 731 option, this adds even more security to the transaction process. The multiple PINs required 732 option enhances that security by requiring that the subscriber be aware of at least two authorization PINs. Entering multiple PINs may be frustrating to some subscribers, especially those living at home. In this embodiment, the number of PINs needed for the multiple PINs required 732 option is configured by the administrator. In an alternate embodiment, the administrator could configure a range for the number of multiple PINs required and then allow the subscriber to choose from that range. The multiple PINs required 732 option is mutually exclusive with the PIN required 731 option, and this is indicated by the crosshatching of multiple PINs required 732 option's activation button.

The subscriber login required 733 option adds a subscriber login to the transaction process. If the subscriber selects this option of the purchase options 710, then that subscriber will be required to enter a subscriber login consisting of a user name and password in order for a transaction process to proceed. As will be discussed below, the subscriber login can be used for a variety of different applications, such as authentication and subscriber identification for subscriber specific services.

The confirmation screen required 734 option can be selected by the subscriber when it is desired that a purchase request be followed by a confirmation screen. Pursuant to selecting this confirmation screen required 734 option, a transaction process could include the presentation of a screen that prompts the subscriber to confirm that the subscriber intends for a purchase to be made and is aware that the transaction process is underway.

The notification icon displayed 735 option can be selected by a subscriber to provide a notification when certain transaction processes are activated by the transaction configuration module 100. In a non-limiting example, the subscriber might have chosen the PIN required 731 option to be implemented as a transaction process. Therefore, this subscriber might want a notifier to be displayed by the Presentation System 150A to indicate that a purchase can be completed by entering only one PIN. In an example situation, the subscriber might be cognizant that other subscribers in the household, although not authorized to make purchases, are aware of this PIN. Thus, the subscriber would want to be notified of the unauthorized subscriber's ability to complete purchases. This notifier option shall be described in further detail below.

The charge credit card 736 option can be selected by the user to be implemented as part of the transaction process. When activated, the charge credit card 736 option will stipulate the billing method by which the purchase is processed. If selected, then the associated charges could be billed to a credit card, rather than the subscriber access bill, such as a cable TV bill as one example.

The next section of options depicted in the screenshot of FIG. 7, are the reminder options 720. These options pertain to settings regarding reminders that are prompted by the media service system 110 to be displayed to the subscriber. The reminder prior to viewing 742 option will require the system to prompt the subscriber with a reminder prior to the viewing of a purchased item. The crosshatched filling in selection box 746 indicates to the subscriber this reminder option may be selected to the exclusion of selection box 745. The second reminder option depicted in FIG. 7 is reminder requiring authentication PIN prior to viewing 743, and it activates a reminder requiring a PIN entry by the subscriber. In an non-limiting example, if the subscriber were to purchase a pay-per view event two weeks in advance, then the system would prompt that subscriber at some point, prior to viewing, with a reminder. That reminder would require the subscriber to enter a PIN for authentication purposes. If that PIN was not entered or entered incorrectly, the transaction process may provide the subscriber a subsequent chance to enter a PIN, or after exhausting one or few additional chances to enter a PIN, the purchase may be abandoned and the purchase may become void. Herein, an incorrect PIN entry should be assumed to include the exhaustion of a number of additional attempts to provide a subscriber a chance to enter a correct PIN. More reminder options may be available to the subscriber and can be accessed by scrolling down in the reminder options 720 window 740.

Figure 8:
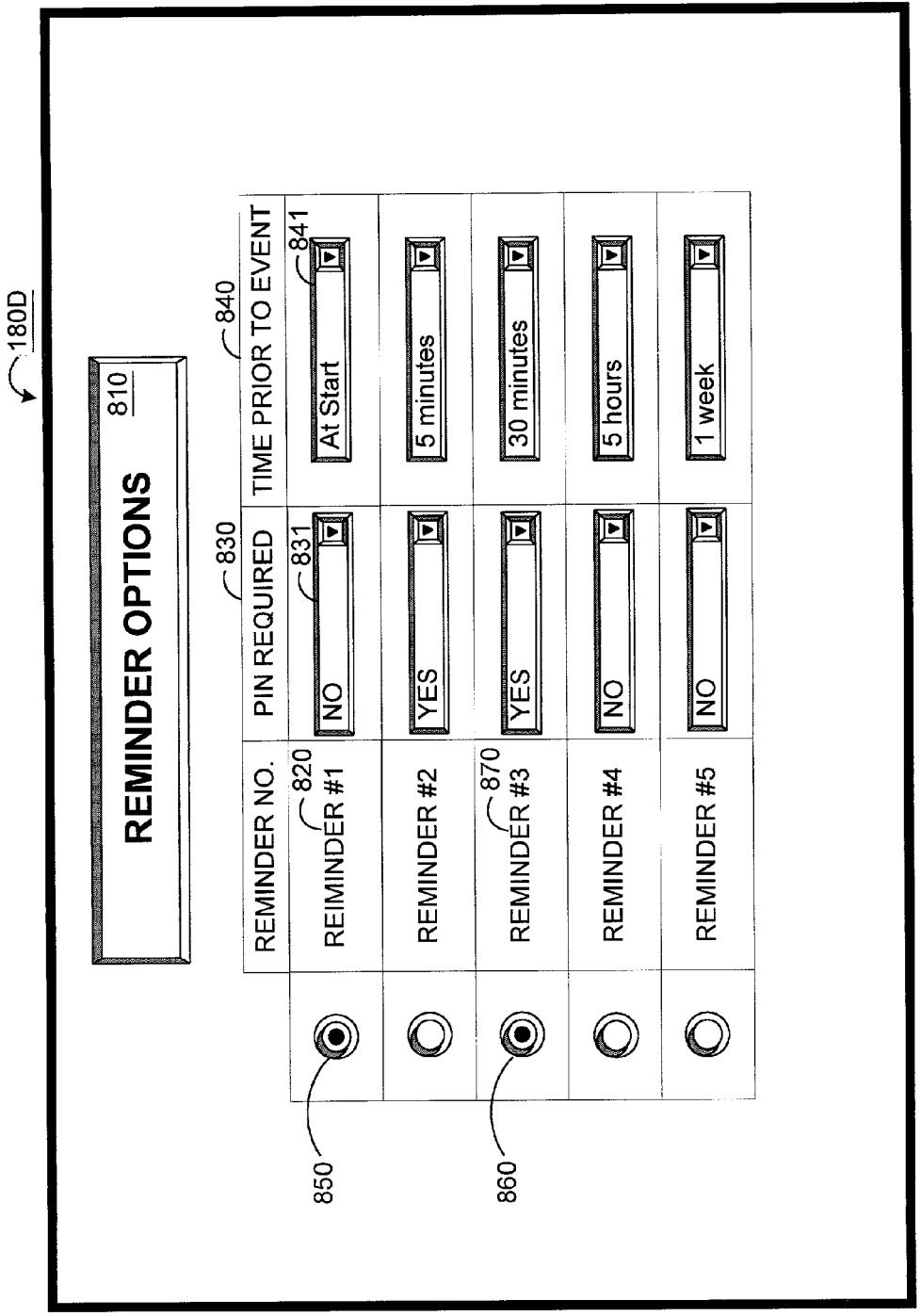
FIG. 8 is a diagram depicting an example of a reminder options screen enabled by the transaction configuration module of FIG. 1 in accordance with one preferred embodiment of the present invention.

FIG. 8 is a diagram of subscriber user interface 180D, an example implementation of subscriber user interface 180 (FIG. 1), depicting a reminder options 810 screen. This implementation of a reminder options 810 screen differs from the one depicted in FIG. 7 and potentially could be associated with different implementations of the media service system 110 (FIG. 1) or its applications. In this implementation, the user, either the administrator or the subscriber, is able to choose among available reminder options 810. The reminder options 810 screen shown in this figure allows the user to set five reminders. A reminder is activated by selecting its associated activation button, such as reminder #1 820 and activation button 850. If all are unselected, then no reminders will be provided to the subscriber regarding a purchase. In an example implementation, all reminders could be unselected when the subscriber is presented with the reminder options 810 screen for the first time. If the subscriber desired a reminder to be activated, then that subscriber could select the activation button associated with that reminder, such as activation button 850 associated with reminder #1 820. After enabling reminder #1 820 by selecting activation button 850, the subscriber can further define the reminder feature via the PIN required 830 field 831 and the time prior to event 840 field 841. In a non-limited example, the subscriber could dictate that reminder #1 820 have a PIN requirement by selecting the 831 field and toggling the response to YES. When the subscriber is subsequently prompted by the client device 140A (FIG. 1) with a reminder about a purchase, then that reminder will require the user to enter a PIN. If the subscriber enters the correct PIN, then the purchase process continues. If the PIN is incorrect, then the purchase may be voided and subscriber may not receive the item desired. In addition to setting a PIN requirement, the subscriber can also dictate or configure at what time a reminder is shown relative to the start time of a media content service or relative to the time that the purchase transaction was completed. In a non-limiting example, the subscriber can determine that reminder #1 820 require a reminder be shown to the subscriber at the start of the viewing of the requested media content, or in other words immediately prior to the start of the requested media content. The subscriber can change the time at which the reminder is shown by selecting the time prior to event 840 field 841 that is associated with reminder #1 820. The settings for time prior to event 840 range in this implementation from "At Start" to "1 week". When a reminder is activated, it is assigned a default value for time prior to event 840. In one implementation, the administrator configures the default value and the range of available settings for time prior to event 840.

The subscriber can set up to five reminders in the implementation of the subscriber user interface 180C shown in FIG. 8. If the subscriber accepts the settings shown in FIG. 8, then that subscriber would be prompted by the two reminders associated with selected activation buttons 850 and 860. After requesting a purchase, the client device 140A (FIG. 1) would prompt the user with a reminder notice thirty minutes before the event, in association with reminder #3 870, and this reminder notice would require the subscriber to enter a PIN. Secondly, the client device 140A (FIG. 1) would prompt the subscriber with another reminder notice, associated with reminder #1 820, at the start of the event, and this reminder notice would not require a PIN entry.

In one implementation the reminders activated in the reminder options 810 screen could be associated with all purchases. Therefore, a subscriber could be prompted with the activated reminders whenever the subscriber purchased any kind of item. In another implementation, the settings for reminder options 810 shown in FIG. 8 could apply only to a specific purchase. In a non-limited example, the reminder #1 850 and reminder #3 860 shown as activated in FIG. 8, would be prompted to the subscriber when a pre-determined item was purchased such as, for example, a NVOD, VOD, or pay-per view event.

Figure 9:
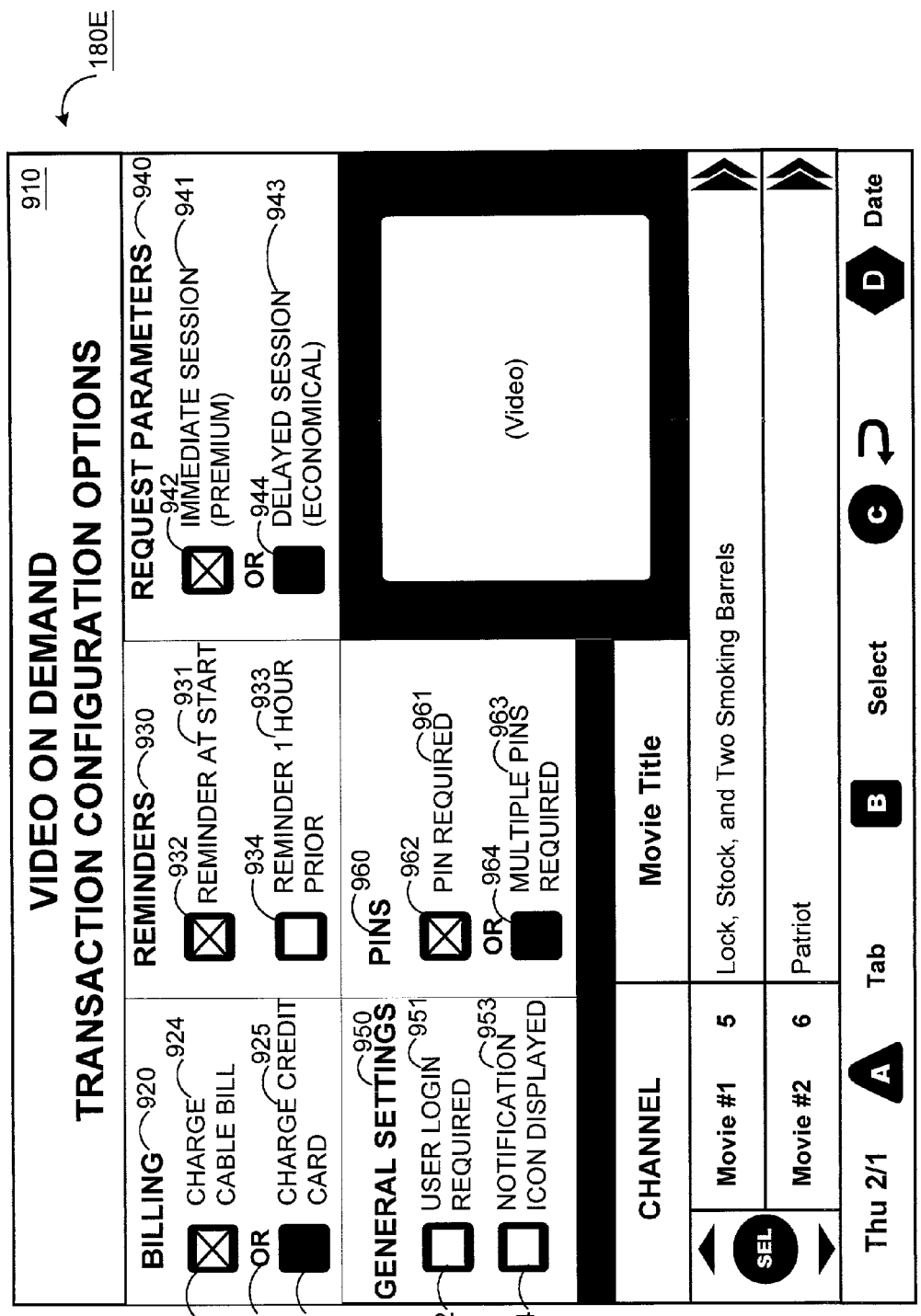
FIG. 9 is a diagram depicting an example of a video on demand transaction configuration options screen enabled by the transaction configuration module of FIG. 1 in accordance with one preferred embodiment of the present invention.

FIG. 9 is a diagram of subscriber user interface 180E, an example implementation of subscriber user interface 180 (FIG. 1), depicting a video on demand transaction configuration options 910 screen. This diagram depicts an interface where transaction configuration options are defined in association with a specific application within the media service system 110 (FIG. 1). FIG. 9 is a depiction of an interface where a subscriber can choose among the options shown in subscriber user interface 180E. It should be apparent to one of ordinary skill in the art that the application specific interface of FIG. 9 could similarly be provided for any application in the media service system 110 (FIG. 1), not just video on demand.

Use of the configuration tools in FIG. 9 allows the subscriber to choose certain transaction configuration options for video on demand purchases. Therefore, in one implementation the transaction configuration options selected in the video on demand transaction configuration options 910 screen can apply to all video on demand purchases. The first set of transaction configuration options presented to the subscriber in the video on demand transaction configuration options 910 screen regards billing preferences. The option selected by the user for billing 920 will dictate the manner in which charges associated with video on demand purchases will be billed to the subscriber. The transaction configuration options provided in billing 920 are mutually exclusive options. With mutually exclusive options, the OR 922 indicates that either the charge cable bill 924 option can be selected or the charge credit card 925 option can be selected. Both options may not be selected at the same time. Therefore, when the subscriber selects the charge cable bill 924 selection box 921, the charge credit card 925 selection box 923 will be shown as filled with crosshatching as depicted in FIG. 9. The crosshatching shown over the selection box 922 illustrates that the charge credit card 925 option has not been selected. If the subscriber desires for a video on demand purchase to be billed to a credit card, then that subscriber can select the 923 selection box. This new selection would cause the charge cable bill 924 selection box 921 to be filled with the crosshatching, indicating an unselected state.

The second set of transaction configuration options presented to the subscriber in the video on demand transaction configuration options 910 screen regards reminders. The reminders 930 area of the interface presents two transaction configuration options to the subscriber. Unlike the billing 920 options, the reminders 930 options are not mutually exclusive; therefore, both options can be activated at the same time. The subscriber can select the reminder at start 931 selection box 932 if it is desired that a reminder be presented at the start of the event. Similarly, the subscriber can select the reminder following purchase 933 selection box 934 to activate this reminder. Such a selection would require a reminder to be shown to the subscriber immediately following a video on demand purchase.

The third set of transaction configuration options presented to the subscriber in the video on demand transaction configuration options 910 screen regards request parameters. This set of transaction configuration options illustrates a significant advantage enabled by the transaction configuration module 100 (FIG. 1). By offering application specific transaction configuration options, both the provider and the subscriber of the media service system 110 can benefit from very specific transaction processes. Transaction processes where the subscriber can configure the subscriber's preferences in accordance with the options made available by the administrator. The request parameters 940 options are options that are specifically associated with video on demand purchases. In one implementation, the administrator could offer a cost savings to those subscribers who are willing to purchase a video on demand and wait a period of time until traffic on the STS transmission system 130 (FIG. 1) is reduced. The administrator could provide this delayed session at a lower cost based on bandwidth efficiencies, thus charge the subscriber a lower cost. In one implementation, the subscriber could enable these cheaper purchases by selecting the delayed session (economical) 943 selection box 944. If the subscriber was unwilling to accept such delayed sessions, then that subscriber could mandate that all video on demand purchases be immediate and without a potential discount. This could be done by selecting the immediate session (premium) 941 selection box 942. The request parameters 940 options are mutually exclusive such that one is selected at the exclusion of another. The settings illustrated in FIG. 9 show the immediate session (premium) 941 option as selected and the delayed session (economical) 943 as unselected. The crosshatching filling selection box 944 indicates that the delayed session (economical) 943 is unselected.

In another embodiment, the request parameters 940 can also include a threshold field for which a subscriber enters a dollar amount that serves as a threshold for the maximum purchase price. When invoking a transaction, such as a single execution transaction, the subscriber's transaction process proceeds when the intended purchase price is less than the threshold. In the event that the purchase price exceeds the threshold, a barker is displayed expressing that the threshold value has been exceeded and subscriber input is requested to complete the purchase.

The fourth set of transaction configuration options presented to the subscriber in the video on demand transaction configuration options 910 screen regards general settings 950. The general settings 950 transaction configuration options allow the user to enable a subscriber login required 951 option and a notification icon displayed 953 option. Both of these options can be enabled at the same time. The subscriber will be required to login to complete a video on demand purchase if the subscriber login required 951 selection box 952 is selected. The subscriber login option will be described in further detail below. If the subscriber selects the notification icon displayed 953 selection box 954, a notification icon will be provided to a subscriber considering a video on demand purchase. The notification icon option will be described in further detail below.

The fifth set of transaction configuration options presented to the subscriber in the video on demand transaction configuration options 910 screen regards PINs. As previously mentioned, the subscriber is required to enter an authentication sequence of number, characters, or combination thereof when a PIN option is enabled. If the PIN is entered incorrectly then the purchase can be voided. The options in the PINs 960 section are mutually exclusive. The PIN required 961 option can be selected at the exclusion of the multiple PINs required 963 option. If the PIN required 961 option is selected, then the subscriber will have to enter one PIN to complete a video on demand purchase. If the multiple PINs required 963 option is selected, then the subscriber will be required to enter multiple authentication PINs to complete a video on demand purchase. In one implementation, the administrator determines the number of PINs required when the multiple PINs required 963 option is selected. In another implementation, the subscriber could subsequently configure the number of PINs required for the multiple PINs required 963 option.

As previously described, a transaction process can be implemented for all purchases or it can be implemented for specific kinds of purchases. In an implementation involving the video on demand transaction configuration options 910, a transaction process is implemented specifically for VOD purchases. When the subscriber accepts the selections shown in FIG. 9 for the video on demand transaction configuration options 910, a transaction process is then generated for VOD purchases. Given the selections shown in FIG. 9, the transaction process could dictate that a VOD purchase be billed to the cable bill, prompt the subscriber with a reminder at the start of the VOD, accept only immediate VOD sessions, and require the subscriber to enter a PIN when requesting the VOD purchase. In one implementation, this transaction process could be assigned to all subscribers purchasing VODs on a particular one of the client devices 140 (FIG. 1). In another implementation, this transaction process could be assigned to an individual subscriber of one of the client devices 140 (FIG. 1) and be activated when that subscriber logs in.

In an example embodiment, the subscriber can be enabled to make the selections described above, in relation to the video on demand transaction configuration options 910, through the use of the client command device 160A (FIG. 1). In a manner previously described, the subscriber user interface 180 (FIG. 1) could provide a free floating arrow to select objects or could allow the subscriber to press an arrow key to cycle through the selectable objects.

Figure 10B:
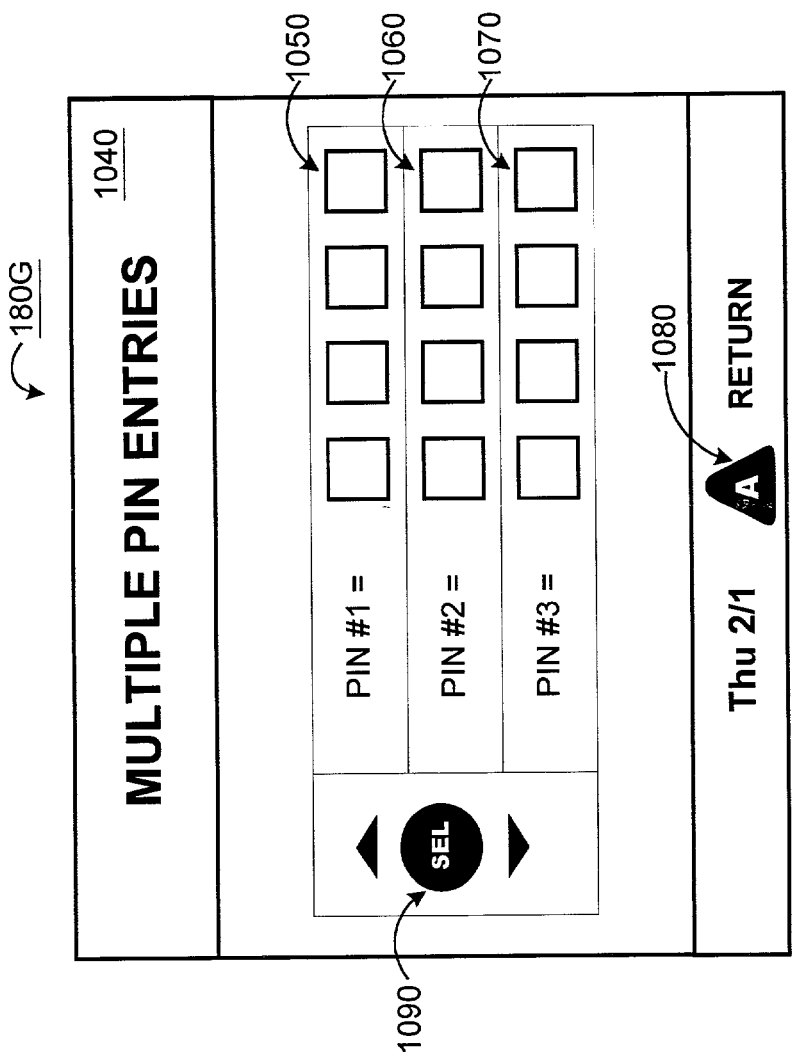
FIG. 10B is a diagram depicting an example of a multiple PIN entries screen enabled by the transaction configuration module of FIG. 1 in accordance with one preferred embodiment of the present invention.
Figure 10A:
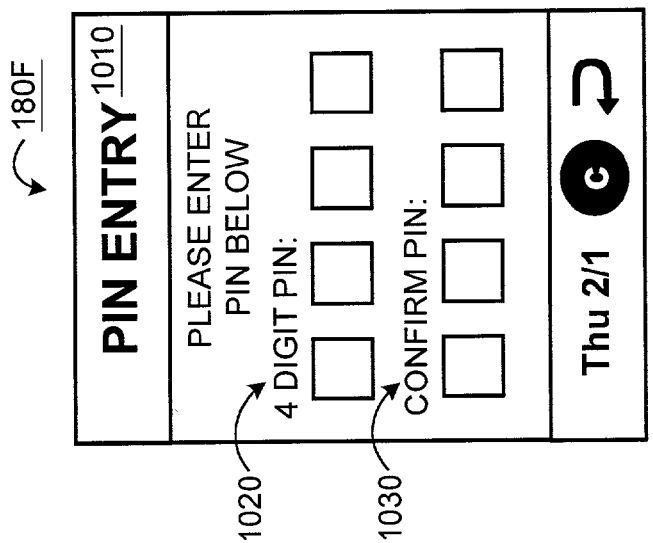
FIG. 10A is a diagram depicting an example of a PIN entry screen enabled by the transaction configuration module of FIG. 1 in accordance with one preferred embodiment of the present invention.

FIG. 10A is a diagram of subscriber user interface 180F, an example implementation of subscriber user interface 180 (FIG. 1), depicting a PIN entry 1010 screen. In one embodiment, the screen depicted in FIG. 10A could be presented to the subscriber when that subscriber enabled a PIN entry option. In a non-limiting example, the subscriber could select the activation button for the PIN required 731 (FIG. 7) option supplied as one of the purchase options 710 (FIG. 7) depicted in FIG. 7. If this was the first time the subscriber had enabled the PIN required 731 (FIG. 7) option, then the media service system 110 (FIG. 1) might have to establish a secure PIN sequence. Thereby, the transaction configuration module 100 (FIG. 1) could prompt the subscriber with the PIN Entry 1010 screen depicted in FIG. 10A. From the PIN Entry 1010 screen, the subscriber could enter a 4 digit PIN 1020 made up of characters, numbers, or a combination thereof. After entering the 4 digit PIN 1020, the subscriber could confirm the PIN by re-entering it into the confirm PIN 1030 boxes. Once an acceptable 4 digit PIN 1020 was entered, the media service system 110 (FIG. 1) could store the PIN in order to authenticate purchases in the future. In one implementation, the media service system 110 (FIG. 1) could store the PIN in memory 320 (FIG. 3) in the DHCT 140A (FIG. 3). In an alternate implementation, the media service system (FIG. 1) could store the PIN in the administrative transaction configuration module 170 (FIG. 1) in the STS headend 120 (FIG. 1). In addition to prompting the user with the PIN entry 1010 screen the first time a PIN option is enabled, the media service system might also be configured, by administrator or subscriber, to require a new PIN entry 1010 screen to be presented every time the PIN entry option is re-enabled.

FIG. 10B is a diagram of subscriber user interface 180G, an example implementation of subscriber user interface 180 (FIG. 1), depicting a multiple PIN entries 1040 screen. The multiple PIN entries 1040 screen allows the subscriber to create the necessary PINs when a multiple PIN entry has been enabled. In one example implementation, the subscriber could enable the multiple PINs required 963 (FIG. 9) option in the video on demand transaction configuration options 910 (FIG. 9) interface screen depicted in FIG. 9. To implement this option, the media service system 110 (FIG. 1) might need to acquire the PINs from the user through the multiple PIN entries 1040 interface screen. When prompted with the multiple PIN entries 1040 screen, the subscriber could enter the desired authentication sequences into the prescribed areas for PIN #1 1050, PIN #2 1060, and PIN #3 1070. Once the subscriber had successfully entered the PINs into the appropriate areas, the subscriber could store those PINs in the media service system 110 (FIG. 1) by selecting the "A" 1080 key. In one implementation this "A" 1080 key could be one of the function keys 440 (FIG. 4) on client command device 160A (FIG. 4). Furthermore, the subscriber could use the client command device 160A (FIG. 4) select button 430 (FIG. 4) to activate the "SEL" 1090 icon and the navigation pad 420 (FIG. 4) to toggle between PINs for entry.

The methods of PIN entry depicted in FIG. 10A and 10B are provided as examples of different means by which the media service system 110 (FIG. 1) can acquire a PIN from the subscriber. One of ordinary skill in the art will recognize that many other methods could be employed to implement a PIN option, examples including, among others, providing an administrator configured PIN or subscriber submission of a PIN via mail or fax.

Figure 11:
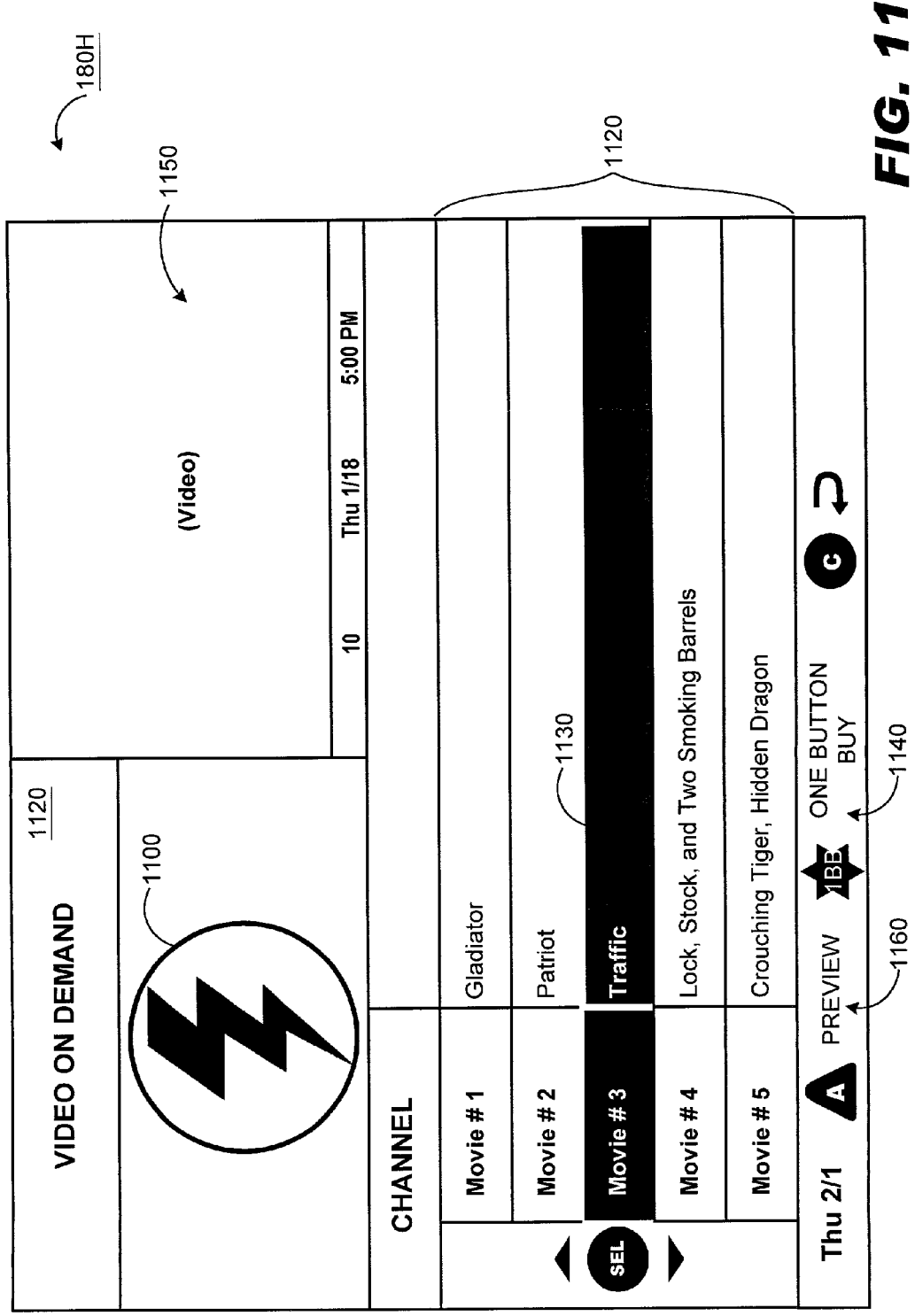
FIG. 11 is a diagram depicting an example of a video on demand screen illustrating a notification icon enabled by the transaction configuration module of FIG. 1 in accordance with one preferred embodiment of the present invention.

FIG. 11 is a diagram of subscriber user interface 180H, an example implementation of subscriber user interface 180 (FIG. 1), depicting a video on demand 1120 screen. This implementation of the subscriber user interface 180 (FIG. 1) illustrates an example implementation of the notifier option provided by the media service system 110 (FIG. 1). As previously mentioned, the media service system 110 (FIG. 1) may provide to the subscriber a notifier option such as the Notification Icon Displayed 736 option shown in FIG. 7. The notifier option can be utilized to notify the subscriber of a particular transaction process that is currently enabled.

In a non-limiting example, the subscriber may have enabled a single execution transaction option. As previously described, a single execution transaction allows the subscriber to initiate and complete a purchase of an item by simply executing one action. This option provides a powerful tool for the subscriber, but in some instances, it may incur a risk of inadvertent purchases. To avoid such inadvertent purchases, the subscriber may choose to enable a notifier option. In one implementation, once the subscriber has enabled a notifier option, a notification will be displayed to that subscriber whenever a single execution transaction can be completed. The video on demand 1110 screen demonstrates a non-limiting example of the notifier option. It can be assumed for this example that the subscriber has previously enabled single execution transactions for VOD purchases. Thus, a notification icon 1100 is displayed when the subscriber is viewing the video on demand 1110 purchase screen depicted in FIG. 11. In this video on demand 1110 screen, the subscriber can browse through a list of available movies 1120. In one implementation, the subscriber could browse through the available movies by pressing the up and down arrows on the navigation pad 420 (FIG. 4) on the client command device 160A (FIG. 4). The subscriber could select a movie by pressing the select button 430 (FIG. 4). The subscriber could watch a preview of the movie in the video display area 1150 of FIG. 11 by selecting the "A" 1160 key on the client command device 160A (FIG. 4). A selected movie, such as Traffic 1130, could be purchased by the subscriber simply by pressing the one buy button 1140. The notification icon 1100 warns the subscriber that a purchase can be initiated and completed just by selecting the one buy button 1140. Thereby, the subscriber will be warned of the ramifications of selecting the one buy button 1140 whenever the subscriber sees an encircled lighting bolt, the notification icon 1100.

It should be noted that one of ordinary skill in art would recognize that a notification icon could be any type of icon used to indicate not only single execution transactions, but also any type of transaction process. In an alternate implementation, a notification icon can be used to indicate that a PIN will be required, a credit card will be charged, or a user login will be required to complete a purchase.

Figure 12:
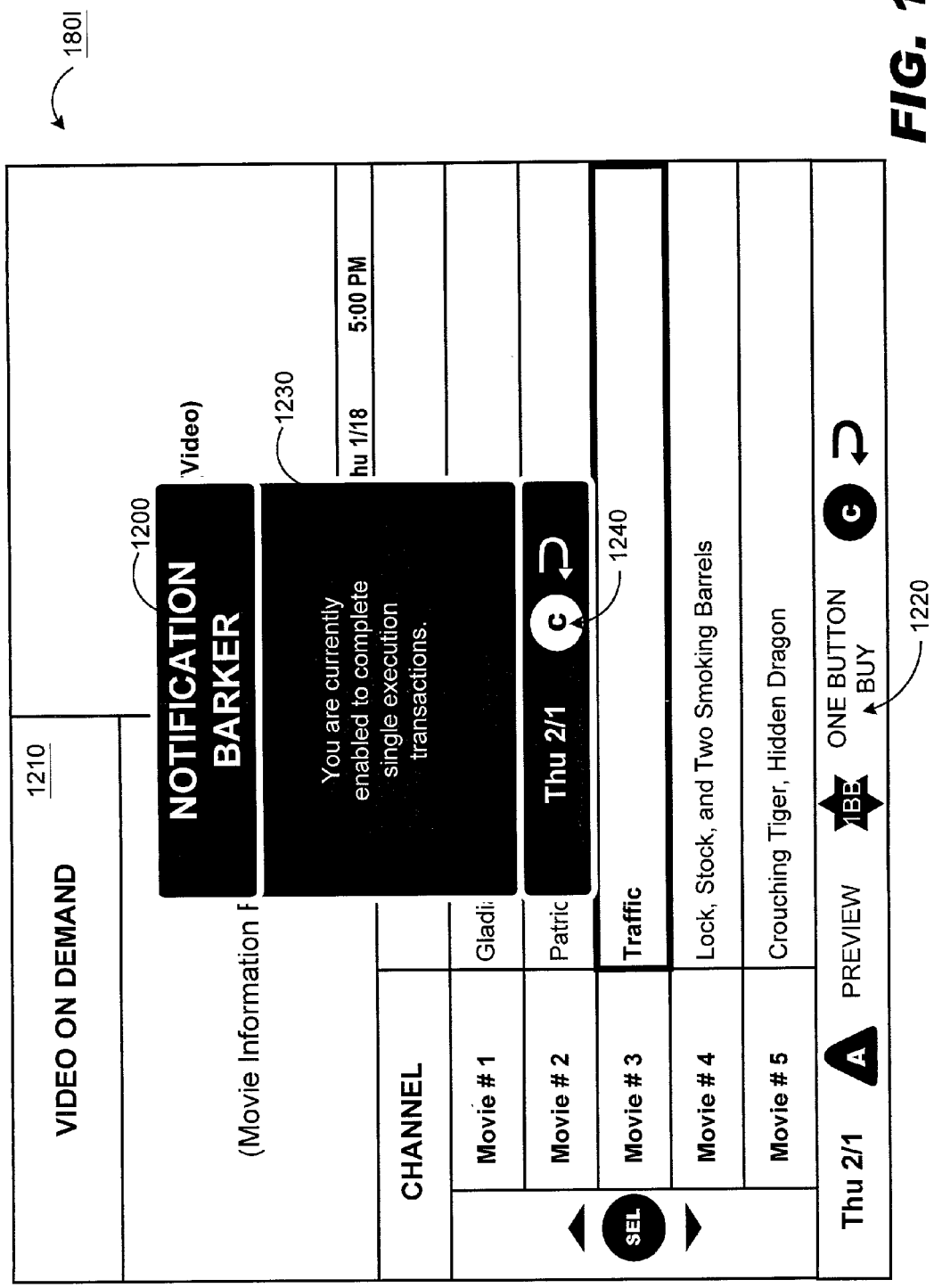
FIG. 12 is a diagram depicting an example of a video on demand screen illustrating a notification barker enabled by the transaction configuration module of FIG. 1 in accordance with one preferred embodiment of the present invention.

FIG. 12 is a diagram of subscriber user interface 180I, an example implementation of subscriber user interface 180 (FIG. 1), depicting a notification barker 1200 screen. In this example embodiment, the notifier option is not a notification icon but a notification barker. For this example embodiment, it is assumed that the subscriber has previously enabled a single execution transaction option. The single execution transaction option can be completed in the video on demand 1210 purchase interface screen by selecting the one buy button 1220. In this implementation, the subscriber is warned that single execution transactions are enabled in the video on demand 1210 screen by the notification barker 1200. This notification barker 1200 is a separate screen implemented by the subscriber user interface 180I to be displayed upon entry into the video on demand 1210 screen. The text area 1230 in the middle of the notification barker 1200 specifies the particular warning that is being supplied to the subscriber. The text area 1230 for the notification barker 1200 depicted in FIG. 12 indicates to the subscriber that single execution transactions have been enabled. Thereby, the subscriber is made aware of the ramifications of inadvertently selecting the one buy button 1220. In one implementation, the subscriber can dismiss the notification barker 1200 by selecting the clear key, "C" 1240. In a non-limiting example the "C" 1240 key is one of the function keys 440 (FIG. 4) on the client command device 160A (FIG. 4).

In manner similar to the notification icon, the notification barker 1200 can be used to indicate numerous enabled transaction processes in addition to single execution transactions. In an alternate implementation, the text area 1230 of the notification barker 1200 could be used to described the transaction process currently enabled by the media service system 110 (FIG. 1) for that subscriber. In a non-limiting example, the transaction process specifically associated with VOD purchases could be described in the text area 1230 of the notification barker 1200. In this manner, when the subscriber entered the video on demand 1210 purchase screen, that subscriber might be aware of the requirements for completing a VOD purchase.

Figure 13:
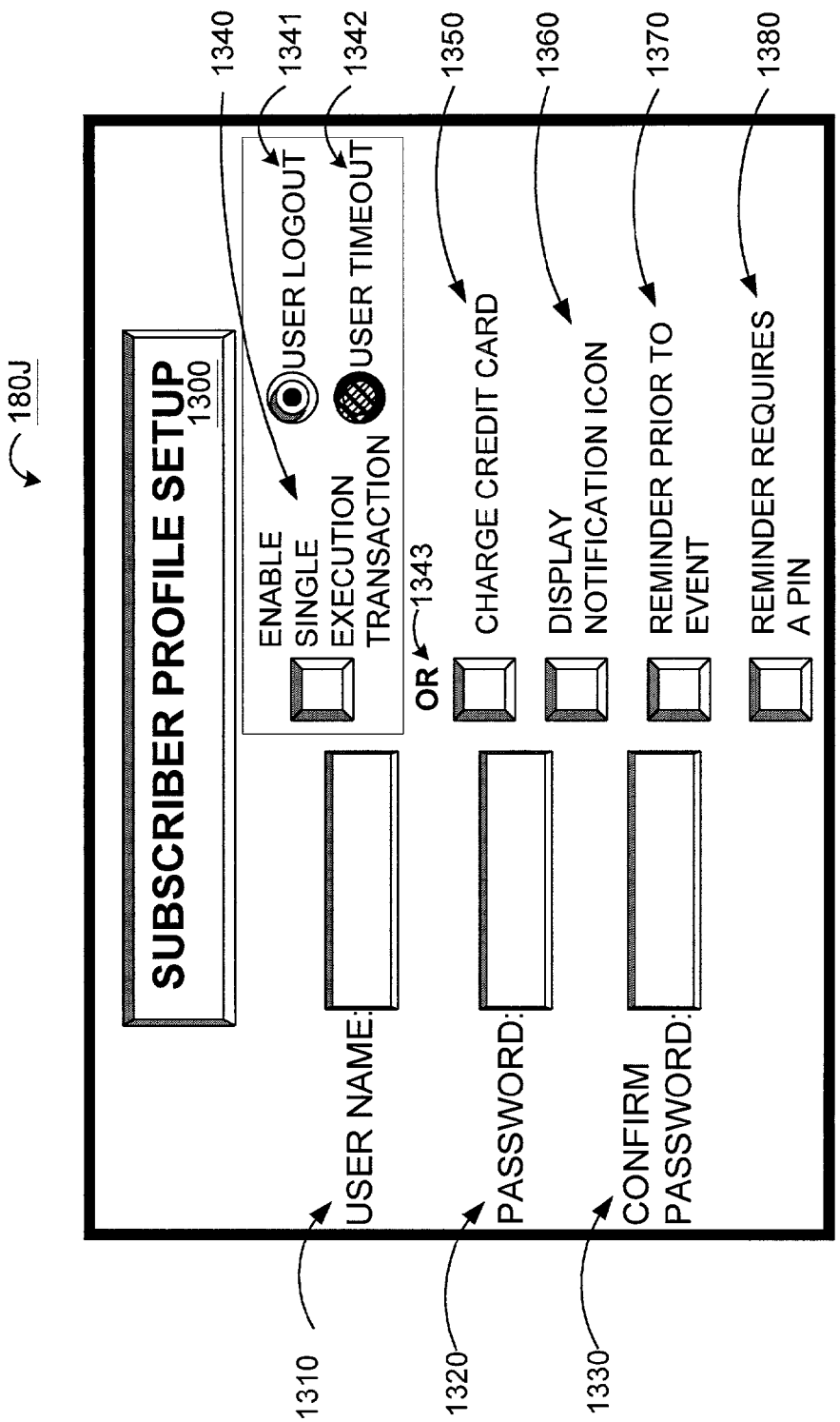
FIG. 13 is a diagram depicting an example of a subscriber profile setup screen enabled by the transaction configuration module of FIG. 1 in accordance with one preferred embodiment of the present invention.

FIG. 13 is a diagram of subscriber user interface 180J, an example implementation of subscriber user interface 180 (FIG. 1), depicting a subscriber profile setup 1300 screen. The subscriber profile setup 1300 is utilized to enable a subscriber login option. A subscriber login option allows a particular subscriber to login to the media service system 110 (FIG. 1) such that features individual to that subscriber may be enabled. In a non-limiting example, a subscriber login may enable a transaction process or set of transaction processes configured by an individual subscriber. The aforementioned examples of transaction processes can be associated with a particular subscriber login. The subscriber profile setup 1300 enables the subscriber to initialize this subscriber login option. A subscriber could be prompted by the subscriber profile setup 1300 the first time that subscriber enables a subscriber login option. The subscriber can enter a desired user name in the corresponding user name 1310 box. In addition, the subscriber can create a password 1320 for this user name 1310 and confirm this password sequence in the confirm password 1330 box. The subscriber logins created in the subscriber profile setup 1300 can be used for individual subscribers or groups of subscribers, such as the adults or the children in a household.

The subscriber profile setup 1300 also enables the subscriber to configure certain general settings to be associated with the newly created subscriber login. In one implementation, the transaction configuration options given here are general settings. As mentioned above, the subscriber logins can enable specific transaction processes or sets of transaction processes. In one implementation, the transaction configuration options enabled under the subscriber profile setup 1300 could be implemented as a default transaction process. This default transaction process could be activated whenever no other transaction processes were provided. Therefore, if the subscriber enabled a different set of transaction configuration options in another interface, then the subsequent transaction process could override the default transaction process. In addition, if the subscriber selects a certain set of options for a particular kind of purchase, such as a VOD, then the associated transaction process could be implemented instead of the default transaction process for that particular kind of purchase.

The first transaction configuration option under the subscriber profile setup 1300 is the enable single execution transaction 1340 option. Selecting the option will enable a single execution transaction as previously described in detail above. In this implementation, the enable single execution transaction 1340 option is mutually exclusive with the respect to the other options provided in the subscriber profile setup 1300 interface screen. The OR 1343 depicted in FIG. 13 implies that the subscriber can select either the enable single execution transaction 1340 option or any other option provided. When the enable single execution transaction 1340 option is selected then the subscriber's default transaction process, when logged in, can allow the purchase of an item with one execution. The subscriber further has the ability to determine how long the enable single execution transaction 1340 option is activated. If the subscriber selects the until logout 1341 option, then that subscriber will be allowed to purchase with single execution transactions until that subscriber logs out of the media service system 110 (FIG. 1). Alternatively, the subscriber can select the until timeout 1342 option to allow single execution transactions until a timeout period expires. In one implementation, the timeout period is configurable by the administrator. In another implementation, the timeout period is configurable by the subscriber. The activation button for the until timeout 1342 option is filled with crosshatching in FIG. 13 to indicate that it is a mutually exclusive option with respect to the until logout 1341 option and is therefore unselected. In other embodiments, the period of activation can be implemented to depend on numerous other parameters besides a logout or timeout, examples including, among others, the activation of another transaction process, the completion of a certain number of purchases, and exiting from a particular application. In a non-limiting example, the enable single execution transaction 1340 option may be configured to activate when the subscriber enters the VOD purchase interface and deactivate when that subscriber exits the VOD purchase interface. This might prove advantageous when the subscriber wants to logon to the VOD purchase interface, make numerous single execution transactions for the different VOD items, and then logout.

In one embodiment, the period of activation for the enable single execution transaction 1340 option can be extended by the subscriber prior to expiration by entering additional information causing an activation period extension. As a non-limiting example, the user may enter a PIN or a password upon the request of an extension to the activation period with a remote key or by a selection within the subscriber user interface 180 (FIG. 1). Alternatively, after the expiration of the activation period, the subscriber may be queried to enter a PIN or password to extend the single execution transaction period.

The second option provided is the charge credit card 1350 option. The subscriber can select this option if that subscriber desires their purchases to be billed to a credit card. The third option, display notification icon 1360, enables the notifier option as previously described in detail above. In one implementation, the selection of the display notification icon could cause a notifier icon, similar to the one depicted in FIG. 11, to be displayed by the subscriber user interface 180 (FIG. 1) when a specific transaction process is enabled. The subscriber can select the reminder prior to event 1370 option if that subscriber desires this to be a step in the default transaction process. Furthermore, the subscriber can select the reminder requires a PIN 1380 option if the subscriber desires for an authentication PIN to be required as part of a reminder to complete a purchase. It should be clear to one of ordinary skill in the art that the transaction configuration options shown in the subscriber profile setup 1300 could contain numerous other options not depicted.

Figure 14:
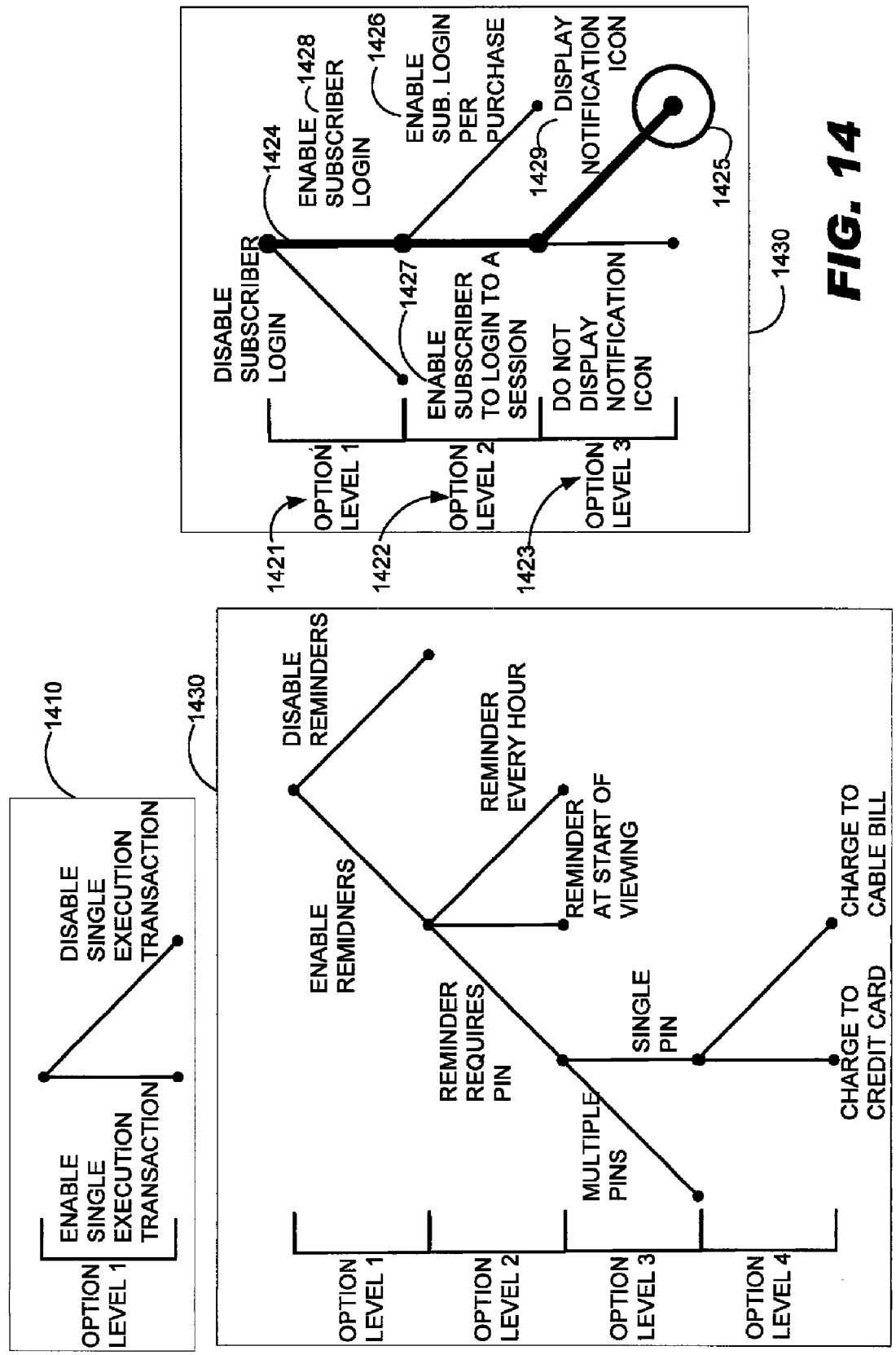
FIG. 14 is a diagram depicting an example of administrative configuration settings enabled by the administrative transaction configuration module of FIG. 1 in accordance with one preferred embodiment of the present invention.

FIG. 14 is a diagram depicting a graphical tree model as a non-limiting example of administrative configuration settings provided by the administrative transaction configuration module 170 (FIG. 1). As previously described, the administrator of the media service system can configure the transaction configuration options that are available to the subscriber. The administrator is enabled to perform this task through the use of administrative user interface 190 (FIG. 1) and thereby the administrative transaction configuration module 170 (FIG. 1). The administrative configuration settings depicted in FIG. 14, 1410, 1420, and 1430, are graphical representations of data stored in the administrative transaction configuration module 170 (FIG. 1). The administrative user interface allows the administrator to either make the options available for configuration by the subscriber or make transaction processes implemented from selections of the possible options available to the subscriber.

The first administrative configuration settings model 1410 is a very simplistic. Under this model the administrator can make option level 1 1411 available to the subscriber, or the administrator can dictate that the client device of the subscriber implement a transaction process based on a selection in option level 1 1411. Therefore, the administrator can give the subscriber the ability to choose to enable or disable single execution transactions or the administrator can dictate that the subscriber's client device either performs or does not perform single execution transactions.

The second administrative configuration settings model 1420 has three levels of options. Option level 1 1421 concerns subscriber logins, option level 2 1422 concerns the scope of a subscriber login, and option level 3 1423 concerns a notifier option. This administrative configuration settings model 1420 illustrates an implementation where an administrator chooses a particular transaction process to be provided to the client devices 140 (FIG. 1). The darkened line 1424 outlines the options selected to create the transaction process, terminating with the circled end node 1425. This transaction process will enable a subscriber to login 1428, enable subscriber to login to a session 1427, and display a notification icon 1429 in association with the activated transaction process.

The third administrative configuration settings 1430 model has four option levels. The administrator has the ability to provide these option levels to the subscriber. If the administrator provides these options, then the subscriber can choose among them and subsequently have transaction processes implemented based on those choices.

In one example embodiment, the administrative configuration settings, such as 1430, are provided to the administrator by the administrative user interface 190 (FIG. 1) in a format similar to their graphical representation in FIG. 14. In another implementation, the administrative user interface 190 (FIG. 1) is a command line interface where the administrator configures the available options and/or transaction process through the entry of certain commands. One of ordinary skill in the art will recognize that there are a variety of different methods by which to implement the functionality provided by administrative user interface 190 (FIG. 1).

Figure 15:
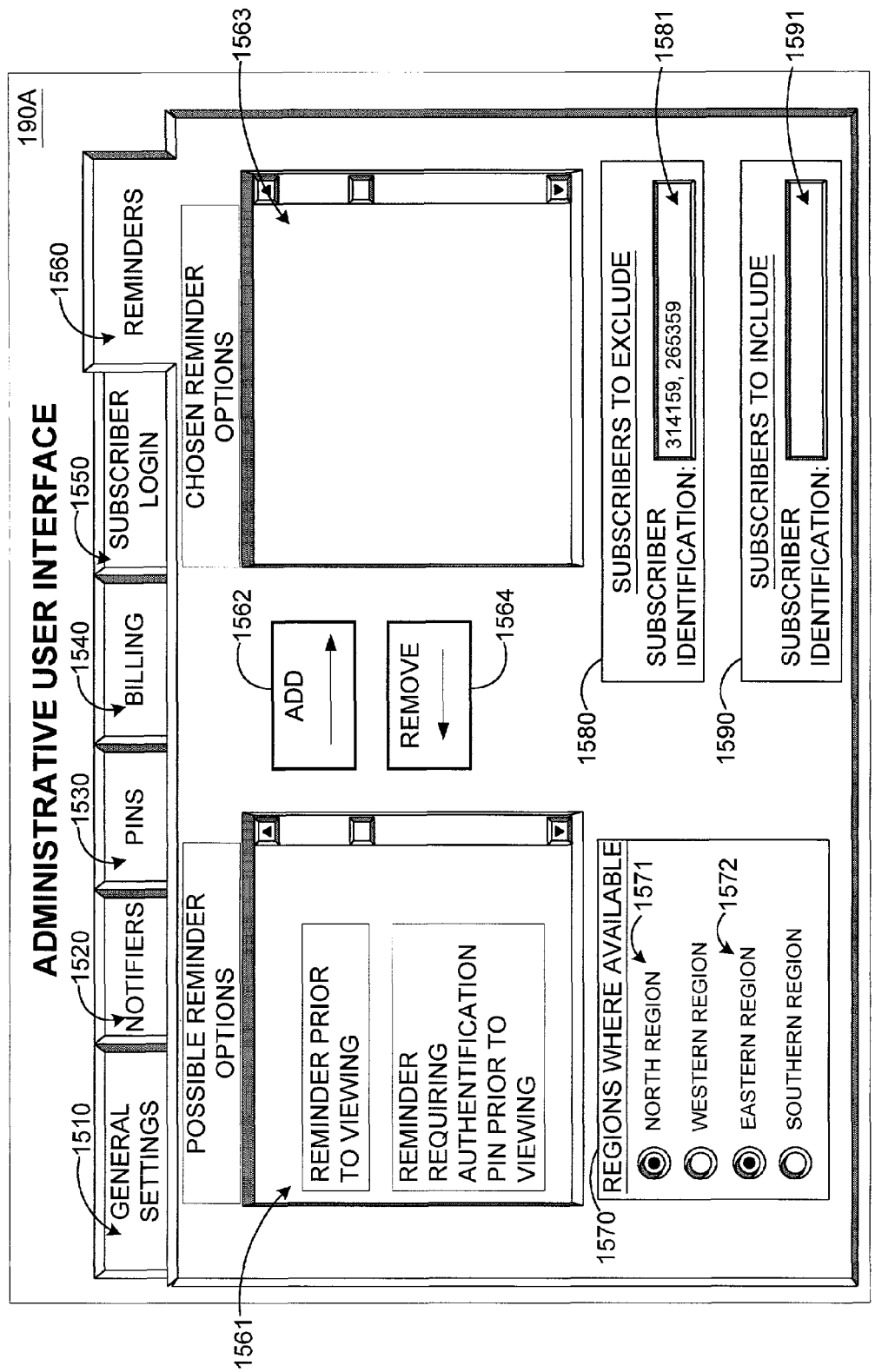
FIG. 15 is a diagram depicting an example of administrator user interface enabled by the administrative transaction configuration module of FIG. 1 in accordance with one preferred embodiment of the present invention.

FIG. 15 is a diagram that depicts the administrative user interface 190A, an example embodiment, enabled by the administrative transaction configuration module 170. The administrative user interface 190A enables the administrator to determine what options are available and to whom they are distributed. The administrative user interface 190A provides an interface screen to configure allowable general settings 1510, notifiers 1520, PINs 1530, billing 1540, subscriber login 1550, and reminders 1560 options. In one implementation, the administrator can configure what reminders 1560 options are available and to whom they are available. After selecting the reminders 1560 tab, the administrator will be presented with the possible reminder options window 1561. The administrator can choose from among the possible reminder options window 1561 those options to be made available to the subscriber. In a non-limiting example, the administrator can add the options to the chosen reminder options window 1563 by selecting an option in the possible reminder options window 1561 and then selecting the ADD 1562 button. Once an option has been added to chosen reminder options window 1563, it can be removed by selecting the option and then selecting the remove 1564 button. In one implementation, those options that are placed into the chosen reminders options window 1563 are subsequently provided to the subscriber where they can be chosen and then implemented as transaction processes.

Not only does the administrative user interface 190A enable the administrator to determine what options are available to the subscriber, it also enables the administrator to determine which subscribers are provided with the chosen options. In a non-limiting, example the administrator can dictate what regions of the media service system 110 (FIG. 1) are provided with the chosen options by making selections in the regions where available window 1570. In the implementation depicted in FIG. 15, the north region 1571 and the eastern region 1572 have been selected to receive the chosen options. In this implementation, the media service system 1570 has been broken into four regions and only the client devices 140 (FIG. 1) in those regions whose activation buttons are selected by the administrator will receive the chosen options. In addition to defining the areas of distribution of chosen transaction configuration options to regions, the administrator can restrict and permit distribution of these options to particular client devices. The subscribers to exclude 1580 window enables the administrator to restrict options from being provided to particular subscribers by entering the subscriber identification number in the subscriber identification box 1581. In one implementation, multiple subscriber identification numbers could be entered separated by commas. This implementation provides the administrator with many features. In a non-limiting example, the administrator might desire to deny delinquent customers or customers with bad credit from gaining access to certain options. In a non-limiting example, delinquent customers may not be provided the option to charge to a credit card. In addition, the administrator could deny those customers with a history of making numerous inadvertent purchases the ability to enable single execution transactions. Not only can the administrator deny particular subscribers, but the administrator may also include particular subscribers by using the subscribers to include window 1590. The subscriber identifications entered in the subscriber identification box 1591 will have access to the chosen options although their region has been excluded. In this manner, the administrator could give preferential treatment to subscribers with exceptional credit or good payment histories. In a non-limited example, the administrator might want to deny single execution purchases to specific areas of the media service system 110 (FIG. 1) but singularly allow them to the good customers in that same area.

In one embodiment, the subscriber identification numbers could relate to particular subscribers using a subscriber login to access the media service system 110 (FIG. 1) through one of the client devices 140 (FIG. 1). In an alternate embodiment, the subscriber identification number could correspond to a particular one of the client devices 140 (FIG. 1). In a non-limiting example, the subscriber identification could be implemented like a unique hardware address within the client device.

It should be noted that one of ordinary skill in the art would recognize that the regions where available window 1570, the subscribers to exclude window 1580, and the subscribers to include window 1590 could apply specifically to the reminders 1560 options or more generally to all the options as a whole. Furthermore, the embodiment depicted in FIG. 15 is merely one example of the variety of ways in which the administrative user interface 170 (FIG. 1) could be provided.

Figure 16:
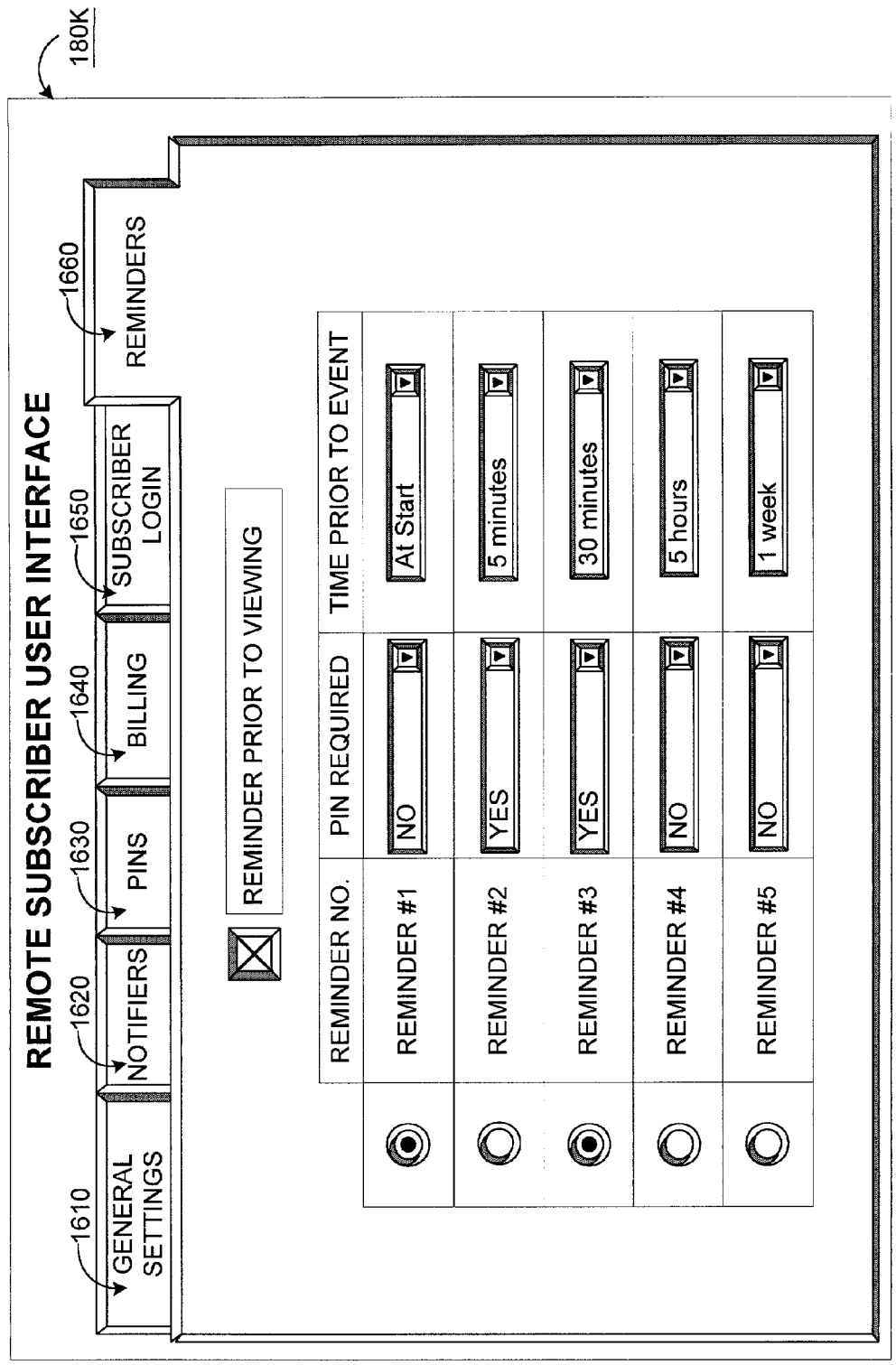
FIG. 16 is a diagram depicting an example of a remote subscriber user interface screen illustrating one implementation of the subscriber user interface of FIG. 1 in accordance with one preferred embodiment of the present invention.

FIG. 16 is a diagram of subscriber user interface 180K, an example implementation of subscriber user interface 180 (FIG. 1), depicting a remote subscriber user interface 1600 screen. In one implementation, the subscriber might be able to access the remote subscriber user interface 1600 via the internet. Thereby, a subscriber could select among the available transaction configuration options and have these selections implemented as transaction processes in that subscriber's client device. The subscriber could select from the given tabs to set general settings 1610, notifiers 1620, PINs 1630, billing 1640, subscriber login 1650, and reminders 1660 options. The interface layout depicted in FIG. 16 is similar to the subscriber user interfaces previously described. The reminders 1660 options section depicted allows the subscriber to enable reminders and configure the parameters associated with those reminders. In a non-limiting example, the subscriber could access the remote subscriber user interface 1600 in an ordinary internet browser and select the desired transaction configuration options. The next time that subscriber used the subscriber's client device, the prescribed options would be implemented in the appropriate transaction processes when making purchases using the media service system 110 (FIG. 1).

In addition to the subscriber user interface 1600 variation shown in FIG. 16, many other variations are possible. In a non-limiting example, the subscriber user interface 180 (FIG. 1) could be implemented as voice command software. The voice command software could be a component within the client device 140A (FIG. 1) or a device coupled to the client device 140A (FIG. 1) over a communications link. The voice command software could enable the user to give voice commands regarding choices of available transaction configuration options. After commencing a voice command session of the subscriber user interface 180 (FIG. 1), the client device 140A (FIG. 1) could implement the appropriate transaction processes.

The media service system 110 (FIG. 1) utilizes standard encryption techniques to protect the sensitive subscriber information requested in the subscriber user interface 180 (FIG. 1). The embodiments described above, in many cases, will increase the security of subscriber transactions by requiring less repetitive entries of sensitive information. In addition, the subscriber user interface 180 (FIG. 1) may show only partial amounts of sensitive information when used for verification purposes.

The transaction configuration module of the present invention can be implemented in hardware, software, firmware, or a combination thereof. In addition, the transaction configuration module can be implemented in a distributed fashion in more than one device in the system. In the preferred embodiment(s), the transaction configuration module is implemented in software or firmware that is stored in a memory and that is executed by a suitable instruction execution system. If implemented in hardware, as in an alternative embodiment, transaction configuration module can be implemented with any combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The transaction configuration module, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In concluding the detailed description, it should be noted that it will be clear to those skilled in the art that many variations and modifications can be made to the preferred embodiments without substantially departing from the principles of the present invention. All such variations are intended to be included herein within the scope of the present invention, as set forth in the following claims.

Therefore, having thus described the invention, at least the following is claimed:

1. A method in a media service system for transaction configuration, the method comprising:
   receiving at a server device a first set of inputs corresponding to selection by an administrator of one or more preconfigured options associated with each of a plurality of transaction configuration options, the selected one or more preconfigured options each corresponding to a future prompted user action associated with the respective transaction configuration option available to a user during a first type of rental purchase transaction for on-demand type of media content, the selected one or more preconfigured options collectively comprising a first purchase sequence associated with the rental purchase transaction;
   receiving at the server device information corresponding to selection by the user of a subset of the one or more selected preconfigured options among the transaction configuration options, the selected subset collectively comprising a second purchase sequence associated with the first type of rental purchase transaction, the second purchase sequence collectively comprising a total required number of prompted user actions to be taken by the user to complete the first type of rental purchase transaction for the on-demand type of media content, the second purchase sequence comprising fewer steps than the first purchase sequence;
   subsequent to receiving the first set of inputs and receiving the information, receiving at the server device second information corresponding to selection by the user of a first on-demand content during a first rental purchase transaction corresponding to the first type;
   implementing the second purchase sequence responsive to receiving the second information; and
   delivering the first on-demand content to a client device subsequent to completion of the implementation of the second purchase sequence.

2. The method of claim 1, wherein receiving the information comprises receiving a signal corresponding to user deletion of the one or more preconfigured options.

3. The method of claim 1, wherein one of the plurality of transaction configuration options is a PIN option, wherein the one or more preconfigured options, associated with the first set of inputs and corresponding to the PIN option comprises a PIN required option and a multiple PIN required option.

4. The method of claim 3, wherein receiving the information comprises receiving a signal corresponding to user selection of the PIN required option to the exclusion of the multiple PIN required option, the prompted user action during the second purchase sequence based on the PIN required option.

5. The method of claim 3, wherein receiving the information comprises receiving a signal corresponding to user selection of the multiple PIN required option to the exclusion of the PIN required option, the prompted user action during the second purchase sequence based on the multiple PIN required option.

6. The method of claim 5, wherein the multiple PIN required option requires multiple user PIN entries.

7. The method of claim 3, wherein the multiple PIN required option comprises a range of numbers of PIN entries that is selectable by the user.

8. The method of claim 3, wherein one of the plurality of transaction configuration options is a general settings option, wherein the one or more preconfigured options, associated with the first set of inputs and corresponding to the general settings option, comprises a subscriber login option.

9. The method of claim 8, wherein receiving the information comprises receiving a signal corresponding to user selection of the subscriber login option, the prompted user action during the second purchase sequence based on the subscriber login option, the prompted user action for the subscriber login option comprising user entry of a user name and password.

10. The method of claim 8, wherein the subscriber login option requires at least one subscriber login, the at least one subscriber login being specific to an individual subscriber, the at least one subscriber login of the individual subscriber activating at least one particular transaction process associated with the individual subscriber.

11. The method of claim 8, wherein the subscriber login option enables a plurality of subscriber logins, each of the plurality of subscriber logins allowing a particular subscriber to activate at least one particular transaction process associated with the particular subscriber.

12. The method of claim 11, wherein a first of the plurality of subscriber logins is for use by an adult subscriber and a second of the plurality of subscriber logins is for use by a child subscriber.

13. The method of claim 8, wherein the subscriber login option enables the at least one transaction process for an active period.

14. The method of claim 13, wherein the active period exists until the user deactivates the at least one transaction process.

15. The method of claim 13, wherein the active period expires after a time value, the time value being equal to an amount configured by the user.

16. The method of claim 1, wherein one of the plurality of transaction configuration options is a reminder option, wherein the one or more preconfigured options, associated with the first set of inputs and corresponding to the reminder option, comprises a reminder at the start option and a reminder prior option.

17. The method of claim 16, wherein receiving the information comprises receiving a signal corresponding to either user selection of the reminder prior option or the reminder at the start option, the reminder prior option being presented at commencement of a reminder period before the event.

18. The method of claim 17, wherein the reminder period is a time period, the time period being equal to a value configured by the user.

19. The method of claim 16, wherein either of the reminder options requires at least one reminder to be presented to a subscriber, the at least one reminder requiring a subscriber authentication to be entered by the subscriber to complete a transaction.

20. The method of claim 19, wherein the subscriber authentication comprises a PIN entry.

21. The method of claim 1, wherein one of the plurality of transaction configuration options is a general settings option, wherein the one or more preconfigured options, associated with the first set of inputs and corresponding to the general settings option, comprises a notifier option.

22. The method of claim 21, wherein the notifier option requires a notification icon to be presented to a subscriber, the notification icon being associated with a particular transaction process, and the notification icon indicating the particular transaction process is currently enabled.

23. The method of claim 22, wherein the particular transaction process comprises a single execution transaction option.

24. The method of claim 21, wherein the notifier option requires a notification barker be presented to a subscriber to indicate a particular transaction process is currently enabled, the notification barker comprising an interface screen to be presented to the subscriber.

25. The method of claim 1, wherein one of the plurality of transaction configuration options is a billing preference option, wherein the one or more preconfigured options, associated with the first set of inputs and corresponding to the billing preference option, comprises either a charge cable bill option to the exclusion of a charge credit card option or a charge credit card option to the exclusion of a charge cable bill option.

26. The method of claim 25, wherein receiving the information comprises receiving a signal corresponding to user selection of the charge cable bill option, the prompted user action during the second purchase sequence based on the charge cable bill option, selection of the charge cable bill option enabling the user to have the charge for the first on-demand content applied to a cable bill.

27. The method of claim 25, wherein receiving the information comprises receiving a signal corresponding to user selection of the charge credit card option, the prompted user action during the second purchase sequence based on the charge credit card option, selection of the charge credit card option enabling the user to have the charge for the first on-demand content applied to a credit card.

28. The method of claim 1, wherein implementing the second purchase sequence comprises prompting inputs from the user limited to the subset of the preconfigured options.

29. The method of claim 28, further comprising receiving the first set of inputs, receiving the information and the second information, implementing, and delivering in association with a second subset corresponding to a third purchase sequence, the third purchase sequence involving a second type of rental purchase transaction, the second type of rental purchase transaction for media content different than on-demand type of media content.

30. The method of claim 1, wherein the on-demand content comprises video-on-demand.

31. A method in a media service system for transaction configuration, the method comprising:

receiving at a server device a first set of inputs corresponding to selection by an administrator of a plurality of transaction configuration options, the selected plurality of transaction configuration options configured to prompt a first plurality of user actions involving the media service system and associated with a rental purchase transaction;

receiving at the server device information corresponding to selection by the user of a subset of the selected plurality of transaction configuration options, the selected subset collectively comprising a purchase sequence associated with the rental purchase transaction, the purchase sequence collectively comprising a maximum required number of prompted user actions to be taken in cooperation with the media service system by the user to complete the rental purchase transaction, the maximum required number fewer in number than the first plurality of user actions;

subsequent to receiving the first set of inputs and receiving the information, receiving at the server device second information corresponding to selection by the user of video-on-demand content to commence the rental purchase transaction; and implementing at the server device the purchase sequence responsive to receiving the second information, the purchase sequence involving the maximum number of prompted user actions; and transmitting the video-on-demand content to a client device subsequent to completion of the implementation of the second purchase sequence.

32. The method of claim 31, wherein receiving the first set of inputs comprises receiving the first set of inputs corresponding to selection by the administrator of one or more reminder options corresponding to the plurality of transaction configuration options, wherein fewer than the administrator-selected reminder options is presented to the user responsive to completion of the second purchase sequence.

33. The method of claim 31, wherein receiving the first set of inputs comprises receiving the first set of inputs corresponding to selection by the administrator of one or more reminder options corresponding to the plurality of transaction configuration options, wherein the same one or more reminder options is presented to the user responsive to completion of the second purchase sequence.

* * * * *

UNITED STATES PATENT AND TRADEMARK OFFICE
CERTIFICATE OF CORRECTION

| | | |
|---|---|---|
| PATENT NO. | : 7,962,370 B2 | Page 1 of 1 |
| APPLICATION NO. | : 09/894508 | |
| DATED | : June 14, 2011 | |
| INVENTOR(S) | : Rodriguez et al. | |

It is certified that error appears in the above-identified patent and that said Letters Patent is hereby corrected as shown below:

Front page, Item (54) & Col. 1 line 1-2, title: "METHODS IN A MEDIA SERVICE SYSTEM FOR TRANSACTION PROCESSING" should read --CONFIGURATION OPTIONS FOR TRANSACTION PROCESSING--

Signed and Sealed this

Thirteenth Day of September, 2011

David J. Kappos
*Director of the United States Patent and Trademark Office*